(12) United States Patent
Williams et al.

(10) Patent No.: US 11,169,538 B2
(45) Date of Patent: Nov. 9, 2021

(54) TRANSPORTATION SYSTEM

(71) Applicant: Glydways, Inc., South San Francisco, CA (US)

(72) Inventors: Peter Robert Williams, Belmont, CA (US); Patrick Kessler, San Francisco, CA (US); Lars Herold, Singapore (SG)

(73) Assignee: Glydways, Inc., South San Francisco, CA (US)

( * ) Notice: Subject to any disclaimer, the term of this patent is extended or adjusted under 35 U.S.C. 154(b) by 0 days.

(21) Appl. No.: 16/517,048

(22) Filed: Jul. 19, 2019

(65) Prior Publication Data

US 2019/0339712 A1 Nov. 7, 2019

Related U.S. Application Data

(63) Continuation of application No. 15/908,406, filed on Feb. 28, 2018, now Pat. No. 10,359,783.
(Continued)

(51) Int. Cl.
*G05D 1/02* (2020.01)
*G06Q 50/30* (2012.01)
(Continued)

(52) U.S. Cl.
CPC ......... *G05D 1/0293* (2013.01); *G01C 21/005* (2013.01); *G01C 21/32* (2013.01);
(Continued)

(58) Field of Classification Search
None
See application file for complete search history.

(56) References Cited

U.S. PATENT DOCUMENTS 6,169,954 B1 1/2001 McCrary
6,810,817 B1 11/2004 James
(Continued)

FOREIGN PATENT DOCUMENTS

CN 101395647 3/2009
CN 103309350 9/2013
(Continued)

OTHER PUBLICATIONS

International Search Report and Written Opinion for International Patent Application No. PCT/US2018/036685 dated Oct. 1, 2018.
(Continued)

*Primary Examiner* — Richard M Camby
(74) *Attorney, Agent, or Firm* — Brownstein Hyatt Farber Schreck, LLP

(57) ABSTRACT

A system includes at least partially autonomous vehicles, at least partially separated interconnected roadways, and a management system. Each of the vehicles is configured to cooperate with another vehicle or an area controller. The management system is configured to receive requests to transport, which may have respective start points and respective destinations. Additionally, the management system is configured, responsive to receiving the request, to assign a vehicle to fulfill the request. The assigned vehicle is configured to transport a person from the respective start point, at least in part via the interconnected roadways, to the respective destination.

20 Claims, 22 Drawing Sheets

Related U.S. Application Data

(60) Provisional application No. 62/465,088, filed on Feb. 28, 2017, provisional application No. 62/517,607, filed on Jun. 9, 2017.

(51) Int. Cl.

| | | |
|---|---|---|
| *G05D 1/00* | (2006.01) | |
| *G01C 21/00* | (2006.01) | |
| *G01C 21/34* | (2006.01) | |
| *G01C 21/36* | (2006.01) | |
| *G06F 16/29* | (2019.01) | |
| *G08G 1/00* | (2006.01) | |
| *G01C 21/32* | (2006.01) | |
| *G08G 1/07* | (2006.01) | |
| *G01C 21/30* | (2006.01) | |

(52) U.S. Cl.
CPC ..... *G01C 21/3492* (2013.01); *G01C 21/3664* (2013.01); *G01C 21/3691* (2013.01); *G05D 1/0027* (2013.01); *G05D 1/0088* (2013.01); *G05D 1/0276* (2013.01); *G05D 1/0297* (2013.01); *G06F 16/29* (2019.01); *G06Q 50/30* (2013.01); *G08G 1/202* (2013.01); *G08G 1/22* (2013.01); *G01C 21/30* (2013.01); *G05D 1/0246* (2013.01); *G05D 1/0257* (2013.01); *G05D 2201/0212* (2013.01); *G08G 1/07* (2013.01)

(56) References Cited

U.S. PATENT DOCUMENTS

| | | | |
|---|---|---|---|
| 8,483,895 B1 * | 7/2013 | Beregi | B61L 3/24 |
| | | | 701/20 |
| 8,682,511 B2 | 3/2014 | Andreasson | |
| 8,720,345 B1 | 5/2014 | English | |
| 8,825,255 B2 | 9/2014 | Boss et al. | |
| 9,087,314 B2 * | 7/2015 | Hoffman | G05B 19/41895 |
| 9,552,564 B1 | 1/2017 | Martenis | |
| 9,715,233 B1 * | 7/2017 | Mandeville-Clarke | |
| | | | H04L 67/20 |
| 9,799,221 B2 | 10/2017 | Baller | |
| 2001/0037174 A1 | 11/2001 | Dickerson | |
| 2003/0236598 A1 | 12/2003 | Villarreal et al. | |
| 2004/0011242 A1 | 1/2004 | Roane | |
| 2004/0225421 A1 | 11/2004 | Wu | |
| 2005/0107954 A1 | 5/2005 | Nahla | |
| 2007/0027825 A1 | 2/2007 | Pearce et al. | |
| 2008/0119965 A1 | 5/2008 | McCrary | |
| 2013/0048795 A1 | 2/2013 | Cross | |
| 2013/0073327 A1 | 3/2013 | Edelberg | |
| 2013/0125778 A1 | 5/2013 | LaCabe | |
| 2014/0088872 A1 | 3/2014 | Linde et al. | |
| 2014/0104081 A1 | 4/2014 | Cross et al. | |
| 2014/0288821 A1 | 9/2014 | Modica | |
| 2015/0123823 A1 | 5/2015 | Barnes | |
| 2015/0339928 A1 | 11/2015 | Ramanujam | |
| 2016/0116293 A1 | 4/2016 | Grover et al. | |
| 2016/0189067 A1 | 6/2016 | Law et al. | |
| 2016/0189098 A1 | 6/2016 | Beaurepaire et al. | |
| 2016/0334236 A1 * | 11/2016 | Mason | G01C 21/3492 |
| 2016/0370194 A1 | 12/2016 | Colijn et al. | |
| 2017/0300049 A1 | 10/2017 | Seally | |
| 2018/0075738 A1 * | 3/2018 | Van Egmond | G05D 1/0214 |
| 2018/0136655 A1 * | 5/2018 | Kim | B60N 2/002 |

FOREIGN PATENT DOCUMENTS

| | | |
|---|---|---|
| CN | 103492968 | 1/2014 |
| CN | 104007764 | 8/2014 |
| CN | 105446343 | 3/2016 |
| EP | 2942250 | 11/2015 |
| WO | WO 2016-183525 | 11/2016 |

OTHER PUBLICATIONS

International Search Report and Written Opinion for International Patent Application No. PCT/CN2017/080591 dated Jul. 11, 2017.
Serban et al., "A security analysis of the ETSI ITS vehicular communications", Radboud University, Nijmegen, 2018.
"Arlington to Roll Out Milo Autonomous Shuttle Pilot Program" by Susan Schrock, posted Aug. 11, 2017.
Auto Connected Car News, posted Lynn Walford, posted Sep. 2014.
"Automated Road Vehicles", presented by R.E. Johnson Consulting.
"Chevrolet's Shanghai EN-V 2.0 Carsharing Program is a Hit", May 24, 2017, by Steve Hanley.
"Can Frisco's new fleet of autonomous vehicles help people get used to idea of a driverless future?", Melissa Repko.
EasyMile EZ1, from Wikipedia.
Evaluation of Automated Vehicle Technology for Transit—2016 Update, Final Report, Apr. 2016.
Nrel, "Automated Vehicles in Public Transit Service", 5th Automated Vehicles Symposium Transit and Shared Mobility Breakout Session, Stanley E. Young & Peter Muller Jul. 17, 2016.
"What is Autotren?", http://www.modutram.com/eng/.
7Starlake, Driverless Shuttle, EZ10, May 12, 2017.
AT @ MCS @ TU/e, overview of automotive technology (AT) activities within the department of Mathematics:and Computer Science (MCS) of the Endhoven University of Technology.
CYBERCARS2 Project—Contract No. 028062, Information Society Technology, Feb. 22, 2009.
Amditis, Automated Road Transport Systems in CityMobil2 project, "Cities demonstrating cybernetic mobility", www.citymobil2.eu, Oct. 2016.
International Search Report and Written Opinion for International Patent Application No. PCT/US18/20266 dated Jun. 11, 2018.

* cited by examiner

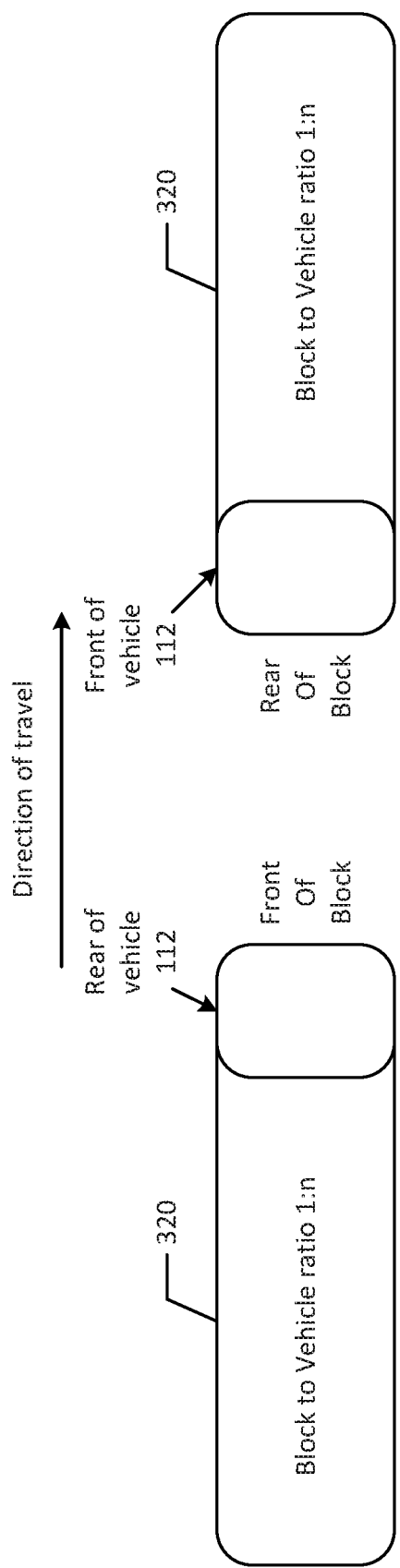
FIG. 8A  FIG. 8B  FIG. 8C  FIG. 8D

TRANSPORTATION SYSTEM

PRIORITY CLAIM

This application is a continuation of U.S. patent application Ser. No. 15/908,406 filed on Feb. 28, 2018, entitled: "Transportation System" which claims priority to and the benefit as a non-provisional application of U.S. Provisional Patent Application Ser. No. 62/465,088, entitled "Transportation System", filed Feb. 28, 2017, and U.S. Provisional Patent Application Ser. No. 62/517,607, entitled "Autonomous Vehicle System Employing Time Domain Dynamic Buffers When Matching Passengers and Vehicles", filed Jun. 9, 2017. The entire contents of each application are hereby incorporated by reference and relied upon.

FIELD OF THE INVENTION

The present disclosure is generally directed to a transportation system and associated methods of operation, and more particularly to a system employing individually routed vehicles sharing an at least partially grade separated roadway.

BACKGROUND

Autonomous vehicles, such as personalized autonomous automobiles are advancing rapidly. However, in highly congested urban areas such vehicles may make at most limited improvements in transportation because of the overall congestion, particularly when there are highly congested chokepoints such as bridges, tunnels, and areas with extremely high congestion and large numbers of people arriving or departing at similar times in a small geographic area, such as rush hour in busy business district, sporting or entertainment events, etc. Conventional mass transit systems such as commuter rail and subway systems provide high capacity on planned routes but have extremely high infrastructure costs, and provide limited flexibility. Light rail and similar systems provide a solution for some contexts, but may not have high enough capacity to address demand in extremely congested areas. Accordingly, Applicants have identified a need for an urban mass transportation solution that combines advantages of these different types of systems, while ameliorating their disadvantages. Some example systems described in the current disclosure addresses the unmet demand of cities for flexible high density transit with a minimal invasive footprint and at an affordable cost.

SUMMARY

In one example, a system includes one or more at least partially autonomous vehicles, one or more at least partially separated interconnected roadways, and a management system. Each of the one or more at least partially autonomous vehicles is configured to cooperate with at least one of another vehicle and an area controller. The management system is configured to receive requests to transport, which may have respective start points and respective destinations. Additionally, the management system is configured, responsive to receiving the request, to assign one of the autonomous vehicles to fulfill the request and inform the assigned autonomous vehicle of an assignment. The assigned autonomous vehicle is configured to transport, responsive to the assignment, at least one person from the respective start point, at least in part via the one or more at least partially separated interconnected roadways, to the respective destination.

In another example, the one or more partially separated interconnected roadways include a dedicated grade separated roadway.

In another example, the system further includes at least two nearby cooperative vehicles. The assigned autonomous vehicle is configured to cooperate with nearby cooperative vehicles. The at least two nearby vehicles are configured to cooperate. Additionally, operation of at least one of the at least two cooperating vehicles may be altered in order to change at least one of a separation between the at least two cooperating vehicles, vehicle velocity, and vehicle headway in response to an information set received by the assigned autonomous vehicle.

In another example, the assigned autonomous vehicle is configured to receive the information set from a management system.

In another example, the assigned autonomous vehicle is configured to receive the information set from another vehicle.

In another example, the information set may include traffic flow, trip time, system capacity, wait time, or a combination thereof.

In another example, the assigned autonomous vehicle is configured to adjust at least one of vehicle velocity and vehicle headway in response to receiving an information set from one of the management system or another vehicle.

In another example, based at least in part on the requests to transport received, the management system is further configured to adjust at least one of an operating status of the one or more at least partially autonomous vehicles, a quantity of vehicles on the one or more roadways and a quantity of passengers at a boarding zone.

In another example, the one or more at least partially autonomous vehicles is configured so a set of vehicles traveling at the same time along a common sub-route cooperate as cooperating vehicles, and at least one of the cooperating vehicles in the set operates in response to traffic flow information, received by at least one of the cooperating vehicles, while traveling on the sub-route.

In another example, at least a subset of the interconnected roadways have sufficient width to allow multiple vehicles to travel in parallel in the same direction. Additionally, at least some of the set of vehicles are configured to travel in parallel at approximately the same cruising velocity on the subset of the interconnected roadway.

In another example, the set of vehicles, traveling at the same time along a common sub-route, are configured to travel in a shoal having reduced space separations between the vehicles.

In another example, each of vehicles in the shoal is configured to adjust space separations between the vehicles in the shoal to create additional space in a trunk line for another vehicle to join the trunk line.

In another example, the set of vehicles, traveling at the same time along a common sub-route, are configured to travel in a first shoal and a second shoal, one or more vehicles in the first shoal are configured to adjust space separations between one or more of the vehicles in the second shoal to create additional space in a trunk line for another vehicle to join the trunk line.

In another example, responsive to receiving the request, the management system is configured to provide to the assigned vehicle, at least one approximate target route, from the respective start point to the respective destination. Additionally, the assigned vehicle is configured to select, by default, one of the at least one approximate target routes and is further configured to travel along the selected approximate target route from the start point to the destination.

In another example, the at least one approximate target route includes at least one of start, merge, cruise, demerge, and stop segments, and the management system is configured to provide at least one of a vehicle profile, parameters, and properties to the assigned vehicle for the at least one segment.

In another example, the management system includes a plurality of area controllers each having an assigned and/or associated geographic area of the system. Additionally, a first one of the plurality of the area controllers may be configured to sense a road condition and relay information corresponding to the road condition to a vehicle traveling in the first area controller's respectively assigned and/or associated geographic area.

In another example, a first area controller of the plurality of area controllers is configured to relay information corresponding to the road condition to at least one other area controller.

In another example, at least two of the respective assigned and/or associated geographic areas overlap.

In another example, the vehicles are configured to maintain continuous flow on the roadways based at least in part on the information relayed from the at least one of the plurality of the area controllers.

In another example, at least some of the area controllers are configured to provide control targets to the vehicles to coordinate a continuous flow of vehicles into and out of an inter vehicle gap in the continuous flow.

In another example, one or more of the roadways is marked with machine readable information associated with the roadway. Additionally, the vehicles may include at least one sensor that is configured to read the information, and the vehicles may be configured to make an autonomous decision, based at least in part on information from the at least one sensor.

In another example, assigning one of the autonomous vehicles to fulfil the request is at least partially based on minimizing a wait time of a passenger at the start point associated with the request to transport.

In another example, a vehicle is configured to receive an approximate target route from the management system, and the vehicle is configured to determine an actual route at least partially based on the approximate target route associated with the request to transport.

In another example, the management system is configured to assign one of the autonomous vehicles to fulfil the request based at least partially on at least one of a vehicle attribute and a passenger attribute.

In another example, a vehicle has an interior width and an exterior width, the interior width is at least as wide as a wheelchair, and the exterior width is at most as wide as one half of a standard road lane.

In another example, the one or more at least partially autonomous vehicles is configured to travel with a following distance of less than two seconds between the vehicles.

In another example, the system further includes a reservation system configured to receive the requests to transport from at least one user and send the requests to transport to the management system. Additionally, the requests may include payload information.

In another example, the assigned autonomous vehicle is configured to transport a payload from the respective start point, at least in part via the one or more separated roadways, to the respective destination. Additionally, the payload may be either a passenger or cargo.

In another example, the one or more at least partially autonomous vehicles is configured to sense a road condition and relay information corresponding to the road condition to a second vehicle and/or one or more management systems.

In another example, informing the assigned autonomous vehicle of the assignment includes providing an information set to the assigned autonomous vehicle.

In a second example, a method includes receiving, by a management system, a request to transport from a user. Additionally, the method includes assigning, by the management system, an at least partially autonomous vehicle from one or more at least partially autonomous vehicles to fulfil the request. Each of the one or more at least partially autonomous vehicles may configured to cooperate with one of another vehicle and an area controller. The management system also informs the assigned vehicle of the assignment, and provides an information set to the assigned vehicle related to the request. The assigned vehicle may operate on one or more at least partially separated interconnected roadways according to the information set.

In another example, the assigned vehicle cooperates with nearby cooperative vehicles. Operation of at least one of the at least two cooperating vehicles may be altered in order to change a separation between the at least two cooperating vehicles, vehicle velocity, vehicle headway, or a combination thereof in response to the information set received by the vehicle.

In another example, the method further includes receiving, by the vehicle, an information set from the management system.

In another example, the method further includes receiving, by the vehicle, an information set from another vehicle.

In another example, the information set includes traffic flow, trip time, system capacity, wait time, or a combination thereof.

In another example, the method further includes adjusting, by the vehicle, at least one of vehicle velocity and vehicle headway.

In another example, the method further includes adjusting, by the management system, at least one of an operating status of the one or more at least partially autonomous vehicles, a quantity of vehicles on the one or more roadways, and a quantity of passengers at a boarding zone based at least in part on the requests to transport received.

In another example, the method further includes, responsive to receiving the request, providing, by the management system, at least one approximate target route to the target vehicle. The method also includes selecting by default, by the assigned vehicle, one of the at least one approximate target routes. Additionally, the assigned vehicle is configured to travel along the selected approximate target route from a start point to a destination associated with the request to transport.

In another example, the at least one approximate target route includes start, merge, cruise, demerge, and/or stop segments. Additionally, the management system is configured to provide a vehicle profile, parameters, and/or properties to the assigned vehicle for the at least one segment.

In another example, the management system includes a plurality of area controllers each having an assigned and/or associated geographic area of the system.

In another example, the method includes sensing, by at least one of the plurality of the area controllers, a road condition. Additionally, the method includes relaying, by the at least one of the plurality of area controllers, information corresponding to the road condition to a vehicle traveling in the respectively assigned and/or associated geographic area.

In another example, at least two of the respective assigned and/or associated geographic areas overlap.

In another example, the method further includes, making an autonomous decision, by the one or more vehicles, based at least in part on information read from a sensor included on the one or more vehicles, wherein one or more of the roadways is marked with machine readable information associated with the roadway, the sensor is configured to read the information.

In another example, assigning one of the autonomous vehicles to fulfil the request is at least partially based on minimizing a wait time of a passenger at the start point associated with the request to transport.

In another example, the method further includes receiving, by a reservation system, a plurality of requests to transport from at least one user, and sending, by the reservation system, the request to transport to the management system. Additionally, the requests may include payload information.

In a third example, a system includes a means for receiving a request to transport from a user and a means for assigning an at least partially autonomous vehicle from one or more at least partially autonomous vehicles to fulfill the request. Each of the one or more at least partially autonomous vehicles is configured to cooperate with one of another vehicle and an area controller. The system also includes a means for informing the assigned vehicle of an assignment and a means for providing an information set to the assigned vehicle related to the request. The assigned vehicle operates on one or more at least partially separated interconnected roadways according to the information set.

In another example, the system further includes a means for receiving the information set from the management system, wherein the information set includes traffic flow, trip time, system capacity, and/or wait time.

In another example, the system further includes a means for receiving the information set from another vehicle, wherein the information set includes traffic flow, trip time, system capacity, and/or wait time.

In another example, the system further includes a means for adjusting vehicle velocity and/or vehicle headway in response to receiving the information set from one of the management system or another vehicle.

In another example, the system further includes a means for adjusting an operating status of the one or more at least partially autonomous vehicles, a quantity of vehicles on the one or more roadways, and/or a quantity of passengers at a boarding zone based at least in part on the requests to transport received.

In another example, the system further includes a second means for providing at least one approximate target route to the target vehicle. Additionally, the system includes a means for selecting one of the at least one approximate target routes. The assigned vehicle is configured to travel along the selected approximate target route from a start point to a destination associated with the request to transport.

In another example, the at least one approximate target route includes at least one of start, merge, cruise, demerge, and stop segments, and the management system is configured to provide at least one of a vehicle profile, parameters, and properties to the assigned vehicle for the at least one segment.

In another example, the system further includes a means for sensing a road condition and a means for relaying information corresponding to the road condition to a vehicle traveling in a geographic area associated with the means for sensing.

In a fourth example, a non-transitory machine-readable medium stores code, which when executed by at least one processor, is configured to receive a request to transport from a user and assign an at least partially autonomous vehicle from one or more at least partially autonomous vehicles to fulfill the request. Each of the one or more at least partially autonomous vehicles is configured to cooperate with one of another vehicle and an area controller. Additionally, the processor is configured to inform the assigned vehicle of the assignment and provide an information set to the assigned vehicle related to the request. The assigned vehicle operates on one or more at least partially separated interconnected roadways according to the information set.

In another example, the at least one processor is further configured to adjust at least one of an operating status of the one or more at least partially autonomous vehicles, a quantity of vehicles on the one or more roadways, and a quantity of passengers at a boarding zone based at least in part on the requests to transport received.

In another example, the at least one processor is further configured to responsive to receiving the request, provide an approximate target route(s) to the target vehicle. Additionally, the at least one processor is further configured to select by default one of the at least one approximate target routes. The assigned vehicle is configured to travel along the selected approximate target route from a start point to a destination associated with the request to transport.

In another example, the at least one processor is further configured to sense a road condition and relay information corresponding to the road condition to a vehicle traveling in an associated geographic area of the area controller.

In a fifth example, a system includes one or more at least partially autonomous transportation vehicles, one or more partially separated interconnected roadways, and a plurality of cooperative controllers in communication with each other. The plurality of cooperative controllers are configured to provide an information set to at least one of the autonomous vehicles operating on the roadway.

In another example, the plurality of controllers includes at least a master controller and an area controller.

In another example, the vehicle control system associated with the at least one autonomous vehicle receives an area-specific information set from the at least one area controller.

In another example, the at least one area controller includes a first area controller and a second area controller. The first area controller may provide a first information set according to a first control paradigm and the second area controller may provide a second information set according to a second control paradigm.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter

BRIEF DESCRIPTION OF THE DRAWINGS

FIGS. 8A, 8B, 8C and 8D illustrate relationships between a vehicle and a block, showing a block fully occupied, and a vehicle entering and leaving a block.

DETAILED DESCRIPTION OF EXAMPLE EMBODIMENTS

Figure 1A:
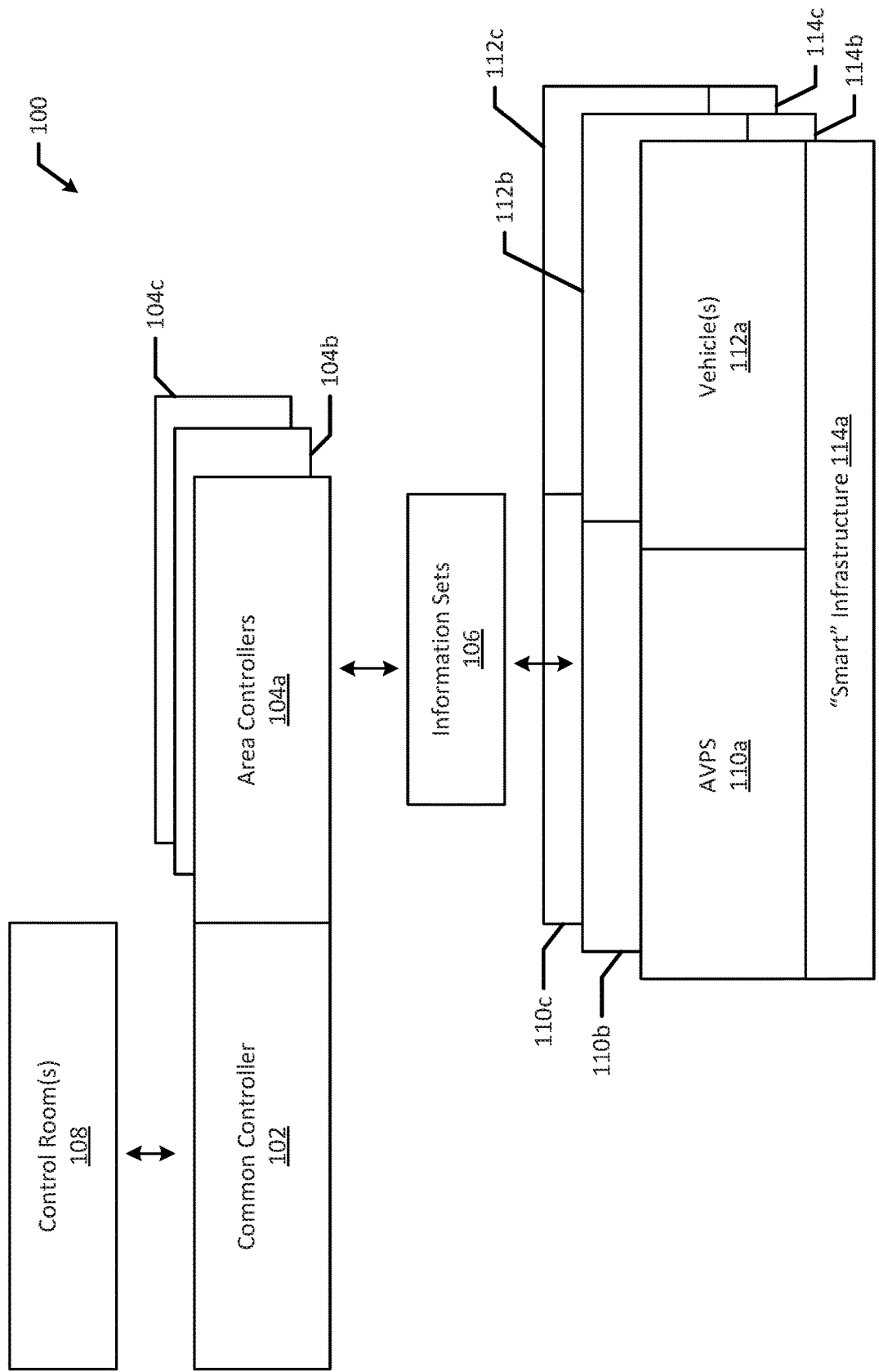
FIG. 1A illustrates an architectural diagram for an example transportation system, according to an example embodiment of the present disclosure.

The disclosed improved transportation system provides numerous improvements over the operation of existing mass transit and personalized transport systems such as a fleet of independent autonomous peer-to-peer ridesharing vehicles. These improvements include the reduction of passenger wait time, increased vehicle availability, and reduction of operating cost per unit of passenger distance travelled by a reduction in operating costs from optimizations of vehicle assignments, and are enabled by various combinations of the technologies and operating methods described herein.

In some example embodiments, vehicles travel over at least partially separated interconnected roadways made up of a plurality of roadway segments of differing types.

Some example embodiments described in the present disclosure include a transportation system for the general public with electrically powered vehicles configured to partially operate on at least a separated roadway where such cooperating vehicles have right of way. A separated roadway may include roadway segments that are grade separated or logically separated. A grade separated roadway may include roadway segments that provide at least one form of physical isolation from the surrounding area sufficient to prevent and/or deter other vehicles, people, animals (for example dogs, cats and similar sized wildlife), detritus, balls or toys and the like form entering the roadway. A logically separated roadway may provide roadway segments where there is an identified separation, but where the separation does not impose at least one form of physical isolation from surrounding areas. For example, a logically separated roadway may include specific roadway segments that are designated for a use by the system such as a dedicated lane on a multi-lane roadway, or a repurposed bike lane. Roadway segments may be further characterized by their function and use, e.g. functional characterizations of trunk, distributor, and boarding zone roadway segments, and use-based characterizations (dedicated or integrated) that describe the types of vehicles permitted to operate on the roadway segment, e.g. a roadway segment may permit only transportation system specific vehicles (such as cooperative or gauge limited vehicles) on dedicated segments, or transportation system specific vehicles may intermingle with general vehicle traffic on integrated and shared roadway segments. Integrated roadways are comprised of roadway segments that are associated with at least one area controller, and have mixed traffic between transportation system specific vehicles and general vehicle traffic. For example, an integrated roadway may include roadway sensors and/or area controllers that communicate with transportation system specific vehicles. A shared roadway is a roadway segment for which there is no associated area controller and/or management system. For example, a shared roadway may include roadway segments that may be used by mixed traffic (e.g., transportation system specific vehicles and general vehicle traffic) without the presence of roadway sensors and/or area controllers. Sets of roadway segments may be referred to as a "line", e.g. a trunk line.

Roadway segments may be organized such that they are interconnected to form linear, branching, network, or mesh roadway topologies.

Example vehicles, when in transit, may be continuously moving in normal operations using a combination of trunk, distributor and boarding zone roadway segments to move passengers from their selected origin to their destination. Trunk roadway segments are typically characterized as having higher capacity, generally providing higher throughput and vehicle velocities than distributor roadway segments. Distributor roadway segments typically provide lower capacity, throughput and vehicle velocities. Boarding zone segments typically provide the locations called slots where passengers may embark and disembark vehicles.

One example transportation system may include cooperative autonomous vehicles, infrastructure elements, and sets of control system components and their associated management systems. Each of these parts may further include components that perform specific tasks in support of operating the described transportation system.

An example transport system is capable of offering door to door personal vehicles that operate in a high throughput continuous manner with path isolation over a partially separated roadway using vehicles that may be sized so as to transport at least one person. Recognizing that single person trips typically make up the vast majority of trips in many congested mass transit environments, one example small vehicle may be sufficiently wide to accommodate at least one person, with a second person sitting in-line (behind or in front) of the first passenger. It will be appreciated that larger vehicles may also be provided. Example vehicles may employ electric propulsion on a chassis. A common chassis may be adapted to passenger and/or freight operations, as well as providing for specialist tasks, such as maintenance, snow removal, letter or other package delivery and the like.

Example embodiments described in the present disclosure may provide:

Vehicle sizing—matching the size of the vehicle to payload type (passenger or freight);

Continuous Flow—once a passenger journey has commenced, a vehicle may, under normal operation, continue moving until the journey is complete;

Decentralized offline boarding zones—making use of existing city environments and infrastructure without the need for large and expensive boarding areas similar to a station;

Flexible and scalable at low cost—each vehicle roadway occupies a minimal amount of geographic space and may incorporate multiple vehicle flows that may be aggregated for higher capacity;

On demand—each journey may be pre-scheduled by a user on an on-demand basis

Some example embodiments described in the present disclosure may provide the capacity demanded by large cities meeting a demand that is not currently addressed by other autonomous and conventional systems at a fraction of the capital and operating costs of current rail-based approaches, whilst meeting the customers' demand for personalized, on demand transit with fast and efficient journey times.

Some example embodiments described in the present disclosure may provide an integrated set of capabilities, which create a solution to the current high density urban transport dilemma facing cities today, in part through a substantial reduction in capital and operating expenses, achieved through less interventionist and expensive infrastructure with autonomous vehicles and associated technologies to deliver the capacity that cities require, whilst providing a personalized experience that passengers desire.

The example transportation systems may include, but are not limited to, one or more controllers and/or controller-associated management systems that implement:

Reservation and scheduling systems
Event monitoring and operating evaluation systems
Exception management systems
Operating synchronization and management system
Load balancing and optimization systems
Power and power consumption management systems
Integration with the physical system infrastructure and associated sensors
Payments and billing systems
Security and identity management systems
Communications, messaging and integration protocols
Passenger management and personalization systems
Distributed storage and power charging systems
Retail, warehousing and other pick pack and ship integration systems
Customer interaction systems, including authentication and authorization
Reconfigurable vehicle platforms
Freight handling and management systems When used without further distinction (e.g. an area controller and its associated management system for a boarding zone is called a boarding zone management system (BMS) to distinguish it from an area controller and its associated management system that manages a trunk segment called a Trunk Management System (TMS)), the term management system comprises a system made up of the common controller, area controllers, an autonomous vehicle pilot system (AVPS), and their associated controller-specific management systems as described herein).

It should be noted that any specific controller-specific management system may be implemented as a module within specific controller hardware, as an external subsystem that is in direct communication with the controller, and/or as a stand-alone external subsystem that communicates with the control system as a whole. In some example embodiments, the common controller, and/or an associated management system for a deployment of an example transportation system may additionally include, but is not limited to, any of the systems listed below, in addition to those listed above:

Capacity and route planning (predictive/current/historical) system
Distributed storage and power management systems
Power and power (distribution and consumption) management systems
Resource management and allocation systems
Communications backbone, protocols, messaging and integrations Example transportation systems may be integrated with a range of external systems which include:

Payment and billing
Applications for accessing and using vehicles
Finance and leasing systems
Retail, warehousing and other pick, pack and ship integrations
Vehicle scheduling and reservation systems
Fleet management and deployment systems
Mapping systems (including updates and real time)
Freight and package management and handling solutions Ancillary systems may include several capabilities that support the passengers and their personal contexts, including:

Passenger, identity and security
Passenger recognition (e.g. Face, body, movement, biometrics and the like)
Passenger fare/transaction attribution (for example multiple passengers one of whom booked and transacted/paid for one or more journeys)
Vehicle personalization
Social network enablement
Passenger management
Passenger contextual information systems
Passenger reservation and scheduling systems
  Passenger behavior analytics (individual, group and aggregate-including anonymized and individual)
Passenger communications Safety, assurance and redundancy systems employed by the example system may include:

Interlocking radio, RF ID, messaging, communications, navigation, positioning, mapping and other infrastructure systems involving both passive and active elements configured for redundant operations.

Collision avoidance and mitigation systems

Route protection and separation infrastructure

Vehicle rescue capabilities

Graceful failover, (such that an individual vehicle can roll to a stop)

Passenger protection systems (including "slowflate"—large airbag with incremental inflation based on deceleration and other information sets providing forewarning of collision)

Operations state management (exception management at common, area, vehicle and infrastructure level)

Vehicle security and identity management systems (security and cryptographically bound identity of vehicle and component sub systems)

Vehicle integrity monitoring 1.1 Example Architecture

In some embodiments, there are three types of control system components for an example control system, common controller components, area controller components and AVPS. Each of these may have dedicated functionality and may interoperate with each other to provide an integrated transportation control system.

The control system components can be integrated with management systems and on-vehicle controllers (for example those controlling the rolling chassis), infrastructure elements, and external integrated systems to create an overall system deployment.

Each of the individual control system components may create and retain one or more audit trails as a record of their activity, which in some embodiments may be evaluated by one or more machine learning algorithms to further develop appropriate optimizations, comparisons between multiple example systems deployed in different geographical locations, passenger behavior characteristics and the like.

FIG. 1A illustrates an architectural diagram for an example system 100, according to an example embodiment of the present disclosure. A common controller 102 may control the transportation system as a whole, with some management operations supported by the associated management system, the Common Management System (CMS). The common controller 102 may be associated with a control room 108. The system 100 may be in communication with one or more area controllers (e.g., area controllers 104a-c, referred to generally as area controller(s) 104) that are associated with a particular geographic or functional area of the system, and provide various information sets 106 supporting operational controls over the associated particular geographic or functional areas of the system, e.g., a particular roadway segment or segments in proximity with each other, particular sets of roadway segments that make up trunk routes, etc. The area controllers 104 may provide local general control to an AVPS (e.g., AVPS 110a-c, referred to generally as AVPS 110) associated with individual vehicles (e.g., vehicles 112a-c, referred to generally as vehicles 112), which may also communicate directly with local "smart infrastructure" 114a-c deployed throughout the system. The area controllers 104 may be connected with one or more sensors or sensor arrays associated with the associated particular geographic or functional area, such as cameras, RADAR, and/or LIDAR sensors positioned to observe some or all of roadway segment, and one or more software programs to read information from the sensors and store and/or forward the sensor information to one or more other area controllers, AVPS, and/or a common controller. The area controller may further have one or more programs that read the sensor information, interpret the sensed information in order to determine one or more aspects of the roadway segment and/or vehicles travelling on that segment, create one or more information sets comprising information based, at least in part, upon the sensed information, and then transmit the information set to one or more AVPS 110, area controllers 104, and/or a common controller 102. For example, the area controller 104 may read sensor information from a connected camera, process the image to determine one or more of whether the roadway is blocked, there is current traffic on the roadway and its velocity, whether the roadway may be affected by the weather (e.g. the roadway is wet, the roadway is snow covered). The area controller 104 may communicate with other area controllers 104, the common controller 102, and AVPS's 110 using an I/O device, a wired or wireless network, or wireless radio communications interface.

Area controllers 104, common controllers 102, and AVPS 110 may further comprise one or more management system programs, which may manage one or more aspects of the transportation system. In an alternative embodiment, the area controllers, common controller, and/or AVPS may be associated with one or more management systems and communicate with those management systems using one or more communications interfaces using wired or wireless networks and an appropriate network interface. In another alternative embodiment, the area controllers, common controller, and/or AVPS may communicate with external management services using an I/O device, a wired or wireless network, or a wireless radio communications interface.

Figure 1B:
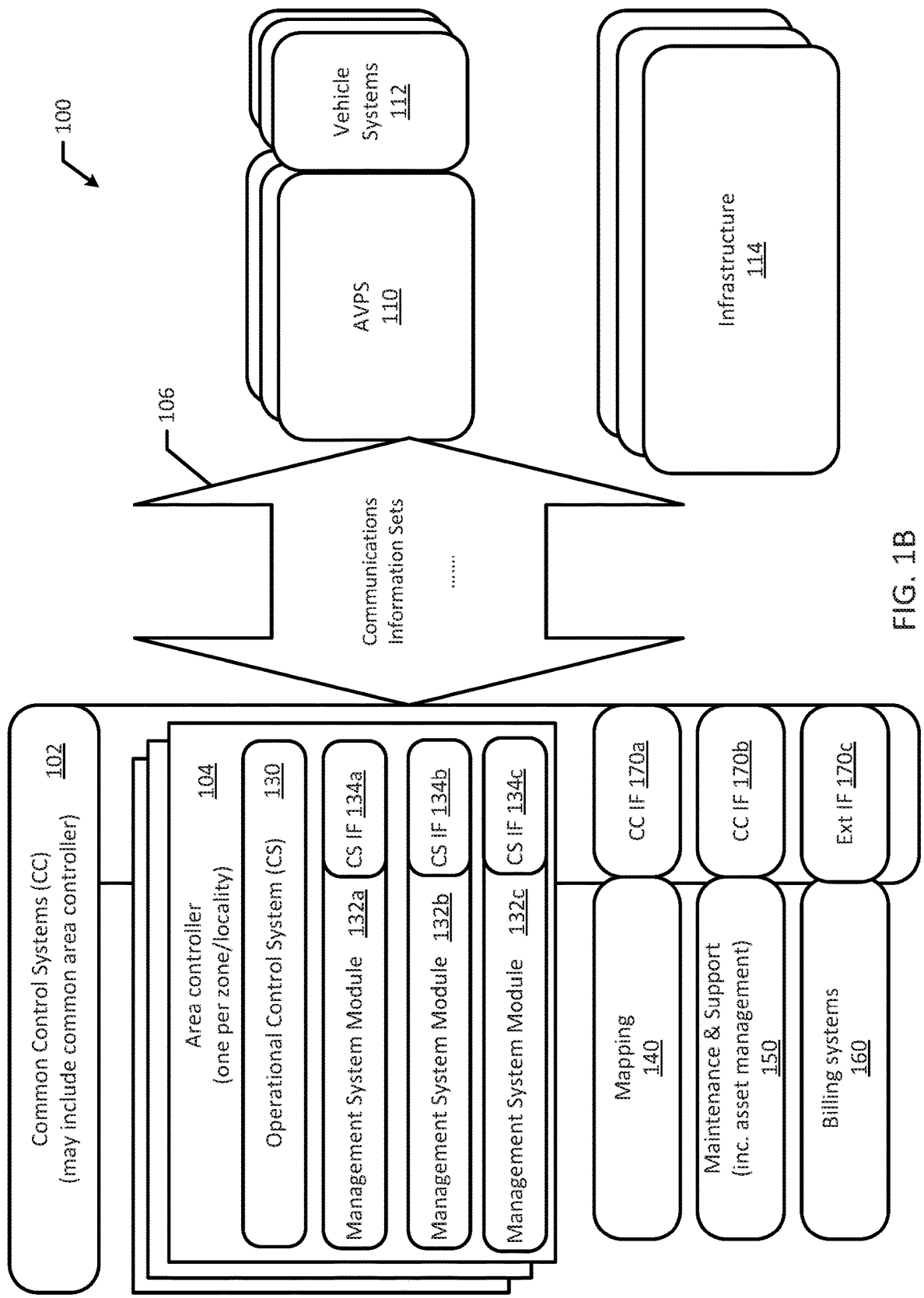
FIG. 1B illustrates further detail on control systems in the transportation system, according to an example embodiment of the present disclosure.

The area controllers may provide local general control information to AVPS each associated with individual vehicles in the form of one or more information sets, which may also communicate directly with local "smart infrastructure" deployed throughout the system. FIG. 1B illustrates further detail on control system components in the example transportation system 100, according to an example embodiment of the present disclosure. For example, the area controllers may include management system modules (e.g., management system modules 132a-c) that interface with the operational control system 130 via control system interfaces (e.g., CS IF 134a-c). Additionally, the management system modules 132a-c may manage aspects of the transportation system. Mapping modules 140, maintenance & Support modules 150 and billing system modules 160 may interface with the common controller 102 via common controller interfaces (e.g., CC IF 170a-c).

1.1.1 Common Controller and Common Management System (CMS)

An example CMS supports shared features useful to the operation of the entire system. For example, the CMS may receive and process aggregations of the information sets generated by the other system elements (area controller and vehicle AVPS) and store them in a common repository (e.g. one or more database) for use by the various subsystems. Based on received information, the CMS may assess the overall status of the system. The CMS may provide integration with third party systems such as billing systems, and features that are system wide such as identity management and the like.

In an example, the area controller and/or management system comprises an operational control system which performs the functions described above (e.g. TMS, BMS), as well as additional subsystems as necessary for the configuration that the area controller is deployed. In an example where the area controller and/or management system is a boarding zone management system, the area control may further comprise subsystems that manage sensors and boarding zone management functions such as asset management, personalization, and ID management. The area controller and/or management system is also in communication with the CMS and external systems, using an I/O interface such as a network. For example, a mapping and maintenance and support subsystem may have interfaces to the CMS, and an example billing subsystem may have an interface connection to an external billing system.

The area controller is in communication with the vehicles operating upon the roadways under its control, in particular, the area controller is in communication with the AVPS controlling each vehicle in order to communicate information sets such as control and scheduling information, as well as control suggestions.

The area controller is also in communication with the infrastructure surrounding the area controller using one or more input/output interfaces. For example, with a boarding zone controller, the controller is in communication with sensors that provide passenger recognition and location information, which the boarding zone controller uses to infer timing of when a passenger will be available to board an available vehicle. In a further example of a virtual segment area controller, the controller may be in communication with local infrastructure such as traffic cameras and "smart" stoplights in order to control the stoplights so as to provide enhanced right of way for cooperating vehicles.

Figure 2:
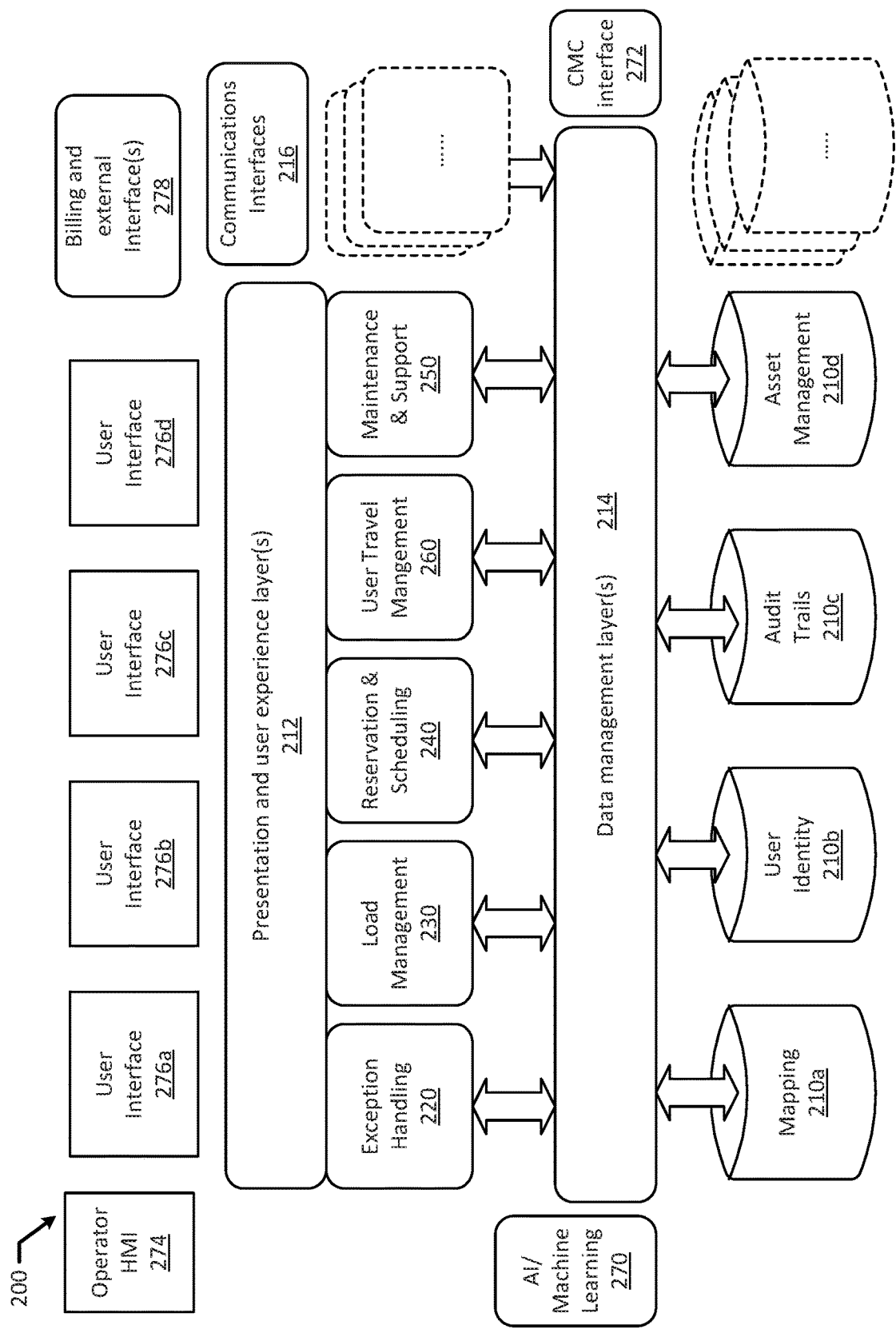
FIG. 2 illustrates an example operations center with management system components, according to an example embodiment of the present disclosure.

The common control system may also have an associated operations center, where the overall operating status of the transportation system may be represented and where appropriate operations are managed by team members in conjunction with the control system components and their management systems. FIG. 2 illustrates an example of an operations center with common management systems 200, according to an example embodiment of the present disclosure. The operations center may include an operator human machine interface 274 and/or user interfaces 276a-d.

Common management system components may include, but are not limited to the following modules:
Reporting and exception handling (220)
System Load Management (230)
Maintenance and support (including asset management) (250)
Billing systems (external to system, via interface 278)
Billing systems interface (278)
Common Controller interface (272)
System capacity management and planning (not shown)
Reservation and scheduling systems (240)
User Travel Management (260)
Machine Learning (270)

Each of these systems may include one or more repositories employing both those that emphasize ACID (Atomicity, Consistency, Isolation and Durability). The information may be stored, for example, in SQL databases and those that follow CAP (Consistency, Availability and Partition tolerance), for example, a NOSQL database such as CoachDB, including both schema on read and schema on write in any arrangement.

The CMS comprises a plurality of data repositories that are used to store information about the operation of the system. The data repositories may communicate with the various common management system components and modules via data management layers 214, which may be presented to a user via user interface layers 212 and/or user interfaces 276a-d. The data repositories include:

| ID | Repository Name | Data types |
|---|---|---|
| 210a | Mapping | Segment definitions and attributes |
| 210b | User identity | User identity and personalization |
| 210c | Audit trails | Audit trail information from various management and control systems. |
| 210d | Asset management | Infrastructure, controllers, and vehicle information |

The CMS may also have an associated control center, where the overall operating status of the system may be represented and where appropriate operations are managed by team members in conjunction with control systems.

In some embodiments, maintenance, billing and reporting systems may consist of standard off the shelf systems, which are then integrated into the Common control system through appropriate API's using the communications interface 216.

Unlike autonomous vehicles operating without separation from alternate forms of transport and/or potential hazards and/or obstacles, such as people, animals, roadside obstacles and the like, the example systems may have a stable state of operations. This stable state may be advantageously unimpeded by capacity bottlenecks, such as those caused by infrastructure (e.g. tunnels etc.) and may be configured for optimum capacity of such a system expressed in metrics such as vehicle movements (which may include people transported) in specific time frames, passenger and/or vehicle journey times, passenger comfort and safety, energy efficiency, system maintenance, financial costs and the like across an example system (including sections thereof). Such states may be determined by, in whole or in part, one or more control systems, for example, a CMS in collaboration with other control systems. Within a specific system, the CMS may have access to algorithms to configure and manage such optimized stable states, providing information and/or instructions to each area controller and AVPS, which then operate collaboratively towards an optimized and stable systemic state.

1.1.1.1 Reporting and Exception Handling (220)

The reporting and exception handling subsystems provide reporting programs for collecting, aggregating, analyzing and reporting upon operational data stored in one or more repositories. Such systems may include deployment specific reports that verify the operations of the system are aligned with any service level agreements entered into. Such reporting may be dynamic, including real time and/or periodic (e.g., hourly, daily, weekly and the like).

1.1.1.2 System Load Management (230)

System load management systems track and monitor the overall loading of the system and the components thereof. The system load management system tracks current and projected loads, for example, using physical and logical vehicle representations as described herein, and compares current and projected loads against system capacity. The system capacity constraint may be determined by the limitation that any one of the system components, for example boarding zone capacity, vehicle availability, roadway capacity, time delay for passenger acceptance and vehicle matching and the like. Many current systems optimize for a single capacity resource, such as a train station, specific vehicle or driver and the like, whereas this system may optimize for any of a set of parameters, including for overall capacity through use of one or more algorithms to achieve one or more states of stable operations.

1.1.1.3 Capacity and Route Planning System

The control system and its associated management system may provide capacity planning and route suggestions to the transportation systems. Capacity planning systems may model the capacity of the transportation system and determine the number of vehicles are operating in the system are sufficient to meet current and projected demands. The capacity and route planning system may also establishes the capacity of each roadway segment of the system from reported audit data so as to ensure that the system is not overloaded.

If the capacity planning module determines that additional vehicles are needed, it may initiate requests to the reservation system to assign a parked vehicle (e.g. a vehicle in a garage) to be made active and to move to the general area of the roadway that is (will be) needed. The assignment of the vehicle and the communication of the assignment to the vehicle are described elsewhere. Conversely, if the capacity planning module determines that too many vehicles are operating, it may initiate a request to assign and move a vehicle to a parking area where the vehicle can wait without utilizing significant amounts of energy until it is needed again. Similarly, if the capacity planning module determines that vehicles are needed in a particular place, it may initiate requests for unused vehicles to remain in particular areas where greater capacity is needed.

In an embodiment, the capacity planning function and the system load management function model the capacity and current load of at least some of the roadways of the system using a combination of logical and physical vehicle representations. In this way, the actual and planned (future) use of any aspect of the system may be calculated and any bottlenecks resolved before they occur on roadways and in boarding zones.

Physical vehicle information includes information for vehicles that are currently operating on a roadway, and is taken from one or more repositories, controllers, and management systems of the system. Logical vehicles are created by capacity planning and system load management when a reservation requires a placeholder for capacity and load planning purposes. As a physical vehicle begins operation, the logical and physical vehicle representations are merged by the capacity and system load management functions.

The management of the lag between the under supply or over supply of vehicles to match the demand for such vehicles is undertaken through having a forward view of the forthcoming demand, as each prospective user, in some embodiments, provides information for a future scheduled request for transport (as described below). This information may be provided by a controller through information sets originating from the reservation and scheduling management system and may be complemented by one or more other information sources, such as for example analysis of previous operating history, trend analysis, probability distributions and other algorithmic approaches.

The capacity planning module may make capacity forecasts available as part of one or more information sets that may be sent to controllers and vehicles.

The route planning system works in conjunction with the capacity planning system and the reservation system to determine one or more recommended or target routes and corresponding trip times on the roadway that a vehicle may travel in order to fulfill an assigned request. The target routes may be used by the capacity and system load management systems to project future loads and capacity bottlenecks. These target routes may be provided by a controller to the vehicle when the vehicle is notified of its assignment to fulfill a request.

1.1.1.4 Vehicle Deployment Control Systems

In considering the management of sets of vehicles in a deployment, a series of relationships can determine the effective and optimized operations of such a deployment. In some embodiments, these include the following example relationships:

Vehicle and geographic location
Vehicle and time (space)
Vehicle and space that vehicle occupies (expressed in space and time)
Vehicle and a set of other Vehicles within a radius (vehicle context)
Vehicle and specified origin and destination points
Vehicle and energy status of that vehicle
Vehicle and vehicle payload/occupant Each of these relationships may be used by one or more control and management systems to determine the operations of one or more such vehicles within a deployment.

1.1.1.5 Reservation and Scheduling System (240)

The common controller, the common controller management system (CMS), or another subsystem in communication with the common controller may provide passenger reservation and scheduling management. For example, potential passengers may pre-book their journey through, for example, an application hosted on a suitable device, such as a smart phone. This application provides the passenger with one or more approaches for identifying their current location and providing information as to their destination. They may also allow specification of any intermediate destinations, for example, where another passenger may be boarded. The common controller or a reservation and scheduling subsystem of the CMS may transform this information into one or more origin-destination point information set for the passenger, and may then elicit from the passenger, the passenger's preferred pick up time.

In some circumstances, pick up timing may be associated with capacity, for example if the system is nearing capacity, then potential passengers may have their pick-up times delayed until an appropriate vehicle or boarding slot is available in order to help manage crowding at a boarding zone, an alternative routing, including differing boarding zones for embarkation and disembarkation, are selected, or the timing change may be used to help manage congestion control at the points of capacity constraint within the system and system infrastructure, or to help provide congestion control at key bottlenecks in the infrastructure.

In some embodiments, passengers confirm their trip requests through a reservation system, the reservation system may ensure that the overall system, through interactions with a scheduling and matching system, can configure the system operating parameters to meet the terms of that request.

As passengers may be unlikely to be accurate in timing their own arrival with sufficient accuracy for efficient system operations, and where each boarding zone has multiple boarding slots, the reservation system may offer passengers timing based, for example, to the nearest minute, though with sufficient flexibility through the use of vehicle and passenger slack time as well as passenger timings to have a vehicle available for them at the offered time.

Reservation systems may offer endpoint timing selection, i.e. when the passenger wishes to arrive at their destination and/or departure timing (e.g., when the passenger wishes to leave). Passengers may select either or both their destination and/or departure, and may have additional timing calculated, such as that from their current location to their origin BMS and from the destination BMS to the final destination.

The reservation processing may include other variables, such as for example:

Sharing a vehicle with another passenger unknown to the passenger attempting to book (in some embodiments some information may be shared by the system with appropriate permissions)

Offering a passenger an embarkation/disembarkation choice that is outside a predetermined (by passenger/system or both) distance of their selected origin/destination Differing pricing or other commercial terms for more or less immediate scheduling of their journey 1.1.1.5.1 Trip Request Processing A trip request is a negotiation between a passenger and the transportation system, represented in some embodiments, by a reservation system where a passenger selects at least an origin and destination pair and either a departure time or an arrival time. This information, with passenger identity(ies), location information, preferences and/or other pertinent information may be provided by the passenger, often through an application, to the reservation system.

In some embodiments, the reservation system may then calculate the appropriate distributed boarding zones which are closest to the passengers selected origin and destination. Such origin and destination distributed boarding zones may also be selected by a passenger and/or offered to a passenger in an interactive manner through an application.

After requesting a journey, a passenger may have a set of attributes associated with the journey. Example attributes may include: a) passenger identity information sets, b) passenger journey origin and destination, c) assigned boarding zone, d) passenger desired arrival time and/or system derived departure time (which may be provided as a range), and e) passenger determined departure time and/or system derived arrival time (which may be provided as a range).

After the reservation has been created by the system, for each prospective user, the reservation system may provide, in some embodiments, an information set with the pending request for transport information. An example information set may comprise the following items, however, it will be appreciated that variants may have less information in the information set:

Start point and destination point(s), either approximate or precise

Time for boarding

Estimated trip time

Estimated wait time for boarding

Number of people travelling

Special circumstances, e.g. wheelchair, small children etc.

Identity of passenger(s) and passenger-based preferences

Type of credential to be presented to the vehicle

Once the request for transport information set is received by the common controller, one or more vehicles are assigned to fulfill the request by the scheduling and matching system of the CMS and the information set is updated with the assigned vehicle information. The assignment of vehicles may be determined based upon numerous factors, including, for example, the following information sources:

Historical travel patterns by time period (for example holidays, weekday, month and other seasonality factors)

Weather

Special events

Estimated time for the vehicle to arrive at the origination point.

Vehicle availability

Current vehicle location and operating status (e.g. power state)

These factors may be combined and the reservation system selects one or more vehicles to be assigned to fulfill the request.

In an embodiment, the vehicle(s) are selected from the vehicles that are available.

In an alternative embodiment, the vehicle(s) are selected based upon operational characteristics of the vehicle, such as type of payload it can carry or the number of passengers the vehicle can hold.

In another alternative embodiment, the vehicle(s) are selected from the vehicles that are available and that have a minimum time to arrive at the origination point. Vehicles that are already located at the origination point are treated as having a zero "0" time to arrive at the origination point.

In another alternative embodiment, the vehicle(s) are selected from the vehicles that can arrive "just in time" to the origination point, so as to optimize the use of the boarding zone resources by minimizing the amount of time a vehicle or passenger waits at a boarding zone and increasing vehicle availability by not having vehicles wait idly for passengers to arrive.

In another alternative embodiment, the selection of the vehicles to be assigned to fulfill the request is made based upon one or more cost metrics related to an aspect of the operation of the system, such as a cost to operate the vehicle.

In yet another alternative embodiment, the vehicles are selected using an algorithm that optimizes the vehicle availability of all the vehicles in the system and selects the most optimal vehicle(s) given consideration of the availability of all the vehicles in the system. Optimizing the overall availability of vehicles in the system ensures that wait times for vehicles at start points is minimized across the entire transportation system.

Any of above, or other criteria not described may be used to configure the selection algorithm in order to optimize the vehicle selection algorithm without deviating from the scope of the disclosure.

The selection method varies depending upon the loading of the transportation system. In some embodiments, the system may switch between selection methods based upon the current capacity and load of the transportation system. For example, if the load of the system is currently low, and many vehicles are parked in a boarding zone in order to minimize operating costs, the system may use a selection algorithm that minimizes the time for the vehicle to arrive, as most vehicles will be selected from the parked vehicles. Alternatively, if there are currently large number of requests for a specific origination point (e.g., boarding zone) that place the origination point (e.g., boarding zone) close to its operating capacity, the vehicle selected may be the one that can arrive at the boarding zone at the same time, so as to optimize the throughput of the boarding zone and thus increase the number of requests that can be fulfilled per unit time.

Once the vehicle(s) are assigned to a request for transport, a copy of an information set corresponding to the request for transport may be sent from the common controller to the assigned vehicles, either directly via a communications method available to the common controller, or from the common controller via one or more area controllers. The common controller optionally may broadcast the information set to all area controllers, or may determine the area controller(s) currently in communication with the vehicle(s) and send the information set to those specific area controllers for forwarding to the vehicles. The information set sent by the common controller may be provided by a common controller that includes reservation and scheduling system, or may be created by an external reservation and scheduling system and sent to the common controller for onward transmission.

Some alternative example reservations described herein integrate pre-booked journeys, where a passenger requests a journey, specifying their origin and destination points, using for example, an app, web interface, voice command or other communications methods as supported by an example transportation system. This request for transport information is then scheduled by one or more common controller, management systems, and/or area controllers, so as to provide a confirmation to the passenger of the boarding zone location, the time of the availability of the vehicle or vehicle in case of group bookings, the anticipated time of the journey, the transaction terms of the journey (cost or other equivalent value exchange), method of payment for such value exchange and any other information set pertinent to the journey.

1.1.1.5.2 Scheduling and Matching of Reservations

The scheduling and matching subsystem of the trip reservation system allows for capacity management and resource allocation in the form of vehicles, boarding zone slots and other system resources to meet passenger demand as created with the trip reservation system.

The scheduling and matching subsystems may calculate the availability of an embarkation slot and disembarkation slot for a passenger after they make a trip request for their journey. The calculation may include the anticipated status of both embarkation and disembarkation BMS at the requested time of departure or arrival. Additionally, these calculations may include detailed scheduling for entering and leaving boarding zones as well as any passenger specific information, such as their rate of travel when using a boarding zone. In this manner, the scheduling and matching systems calculate the time period(s) in which the likelihood of the availability of a vehicle is sufficient to accept the reservation and create an information set which instantiates the reservation.

When an information set for the reservation is instantiated, a logical vehicle may be assigned to at least one TMS preceding the relevant origin BMS, within the time period information of when a physical vehicle is planned to be available for a passenger. The TMS may then attempt to match the logical vehicle to a physical vehicle, such that a vehicle becomes designated for reservation and associated information set. The TMS may then provide the matched vehicles' AVPS with appropriate information set, such as the BMS for the vehicle to interact with. This information may then be communicated to that BMS, which will then synchronize the vehicles arrival with the passengers that are scheduled to arrive at that boarding zone for embarkation Vehicles that TMS(s) may attempt to match, may be already in use, in which case the destination BMS may need a vehicle for embarkation of a passenger. Other vehicles that TMS(s) may attempt to match include those that currently do not have a passenger. These vehicles may communicate to TMS(s) their energy or other vehicle status, which may be used in the matching process.

In an example, the system may be a closed system, such that scheduling and matching may not accept trip requests for a particular time period if the resulting reservation would likely cause the continuous flow to cease or result in a significantly reduced flow. One of the factors in maintaining continuous traffic flow is the availability of a slot for disembarkation for a passenger once a passenger has entered a vehicle. To achieve optimal flow, system management components may collaborate with scheduling and matching systems to orchestrate and manage the availability of such slots, such that passengers may only be offered reservations when the system has sufficient capacity to complete their journeys.

In some embodiments, the capacity of the system may be modelled as the number (e.g., quantity) of logical vehicles and physical vehicles populating the system at a point in time. For example, each logical vehicle represents a potential for a physical vehicle. For example, a reservation system may create a logical vehicle when a reservation has been created and such vehicle may then be inserted into an operating vehicle flow such that the logical vehicle represents a potential physical vehicle, which is only assigned to the specific passenger when that passenger has been recognized by a boarding zone system. This late binding of physical vehicle to a passenger may increase the flexibility of the reservation and scheduling capabilities of the system, which helps reduce the wait time of passengers by letting the system just-in-time match available vehicles to passengers who have arrived at a boarding zone.

In the same manner, each TMS and BMS also create and maintain logical representations of their available capacity for optimum throughput and/or other specified performance metrics, which are then populated by physical vehicles for each time period.

Matching systems may utilize sets of algorithms and techniques to maintain system operations, such as for example Bayesian probability analysis and other statistical techniques, machine learning, neural networks, goal seeking, acyclic and other forms of graphs and the like, in any arrangement.

1.1.2 Area Controller(s)

An example area controller comprises a management system configured and deployed to manage the operations in a portion of the system, e.g., to manage a portion of the infrastructure and a set of autonomous vehicles operating in that portion of the infrastructure. This may include scheduling, travel, locations, flow, loading, distribution, etc. For example, such a system may comprise a set of features, implemented as programs executed by the CPU of the area controller, including but not limited to:

Operational control systems
Operational fleet management
Personalization and identity management
Energy management
Communications
Safety An area controller may prepare and/or configure information sets that provide an AVPS with operating configurations that may, in whole or in part, determine the operations of one or more cooperative vehicles and then communicate some of all of the information sets to an AVPS. Aspects of the information set may originate from other control system components (for example, a common controller, a second area controller, a second AVPS) or from sensors connected to the area controller.

The example system may further include a plurality of area controllers each having an assigned geographic area of the system, the area controllers providing information sets comprising control instructions to vehicles traveling in their respectively assigned geographic areas. Optionally, an area controller may also be configured provide information sets comprising cooperative control information to vehicles travelling to a common destination, even when such vehicles are in different assigned geographic areas.

Area controllers are generally associated with or assigned to one or more geographic areas or infrastructure elements. Additionally the area controllers may manage the operation of the system around their respective assigned or associated areas/elements. In an embodiment, a plurality of area controllers may be assigned to a specific geographic area or infrastructure element. A respective assigned or associated geographic areas of one area controller may overlap with another assigned or associated geographic area of another area controller. For example, multiple area controllers may be associated with at least a portion of the same geographic area or infrastructure element. Similarly, a cooperative vehicle may be operating cooperatively with one or more area controllers at the same time.

An area controller may manage vehicles within the area or domain controlled by such an area controller, for example an area configured by a common controller or other management system, or an area that is determined by other factors such as the physical geometry of a specific physical and/or logical location, area of sensor coverage, etc. The vehicles operating within such an area are associated with area controller(s) for that area, and communicate with the one or more area controller associated with the area.

Area controllers may have responsibility for one or more merge/demerge zones. For such zone, the area controller may communicate information sets so as to inform cooperation with vehicles intending to merge/demerge and those vehicles with which they are merging/demerging. For example, this may include providing vehicles with block based trajectories (including both logical and geo blocks). The block based trajectories may provide a framework for those vehicles involved to determine the appropriate navigation and positioning as determined by their AVPS, so that the integration or separation of the vehicle merging or demerging has minimal impact on the optimum flow of vehicles. In some cases, these merge/demerge zones will be determined in advance. For example, merge/demerge zone adjacent to fixed boarding zones or where a distributor roadway segment connects or disconnects from a trunk roadway segment may be predetermined. Other merge/demerge zones may be dynamic in that a vehicle for example may have boarded/de-boarded a passenger at a location that is not a fixed boarding zone.

Area controllers provide task specific control of aspects of the transportation system. These controllers are generally optimized for a specific function (e.g. boarding area controller), and are connected to activity specific sensor suites that are used by the controller to determine information about the roadway segments it controls and the environment surrounding those roadway segments. For example, boarding zone controllers are connected with boarding zone systems, including reservation request kiosks, passenger monitoring and tracking subsystems, and the like.

Area controllers are also in communication with a common controller and other area controllers. In this way, area controllers may operate either as a hierarchical control system or as a mesh control system depending upon the control strategy being employed. In addition, area controllers are in communication with the vehicle controllers of the vehicles operating within the roadway segments that they manage.

Lastly, area controllers are in communication with common resources provided by the CMS on an as needed basis, for example, in order to report auditable data, passenger, and vehicle and roadway status information.

Area controllers generally provide operational guidance, local performance optimization (e.g. as vehicle movements within a boarding zone), and conflict resolution within their functional area. Area controllers may perform some or all of the following tasks:

Store and forward of control information between vehicles, area controllers, and common controllers.
Store and forward of sensor information between vehicles, area controllers, and common controllers.
Store and forward vehicle reporting (including vehicle sensor information) between vehicles, area controllers, and common controllers/CMS.
Manage and optimize the local roadway segment model
Issue control instructions to vehicles operating upon roadway segments under its control as determined by the local roadway segment model.
Provide suggested control information to vehicles operating upon roadway segments under its control, or to vehicles that will be passing into or out of its area of control for coordination purposes.
Monitor connected sensor information for safety and operational inputs.
Monitor vehicle reporting for safety and operational inputs.
Coordinate with other area controllers for vehicle flow control.
Forecast roadway segment usage.
Alert upon determining an unsafe or out of normal operating condition occurs.
Determine and establish virtual roadway fiducial markers (in roadway or in the environment surrounding or adjacent to a roadway) and communicate these fiducial markers to vehicles as needed.
Coordinate and instruct infrastructure under its control (e.g. gates, stoplights)

1.1.3 Controller Communications

Figure 3:
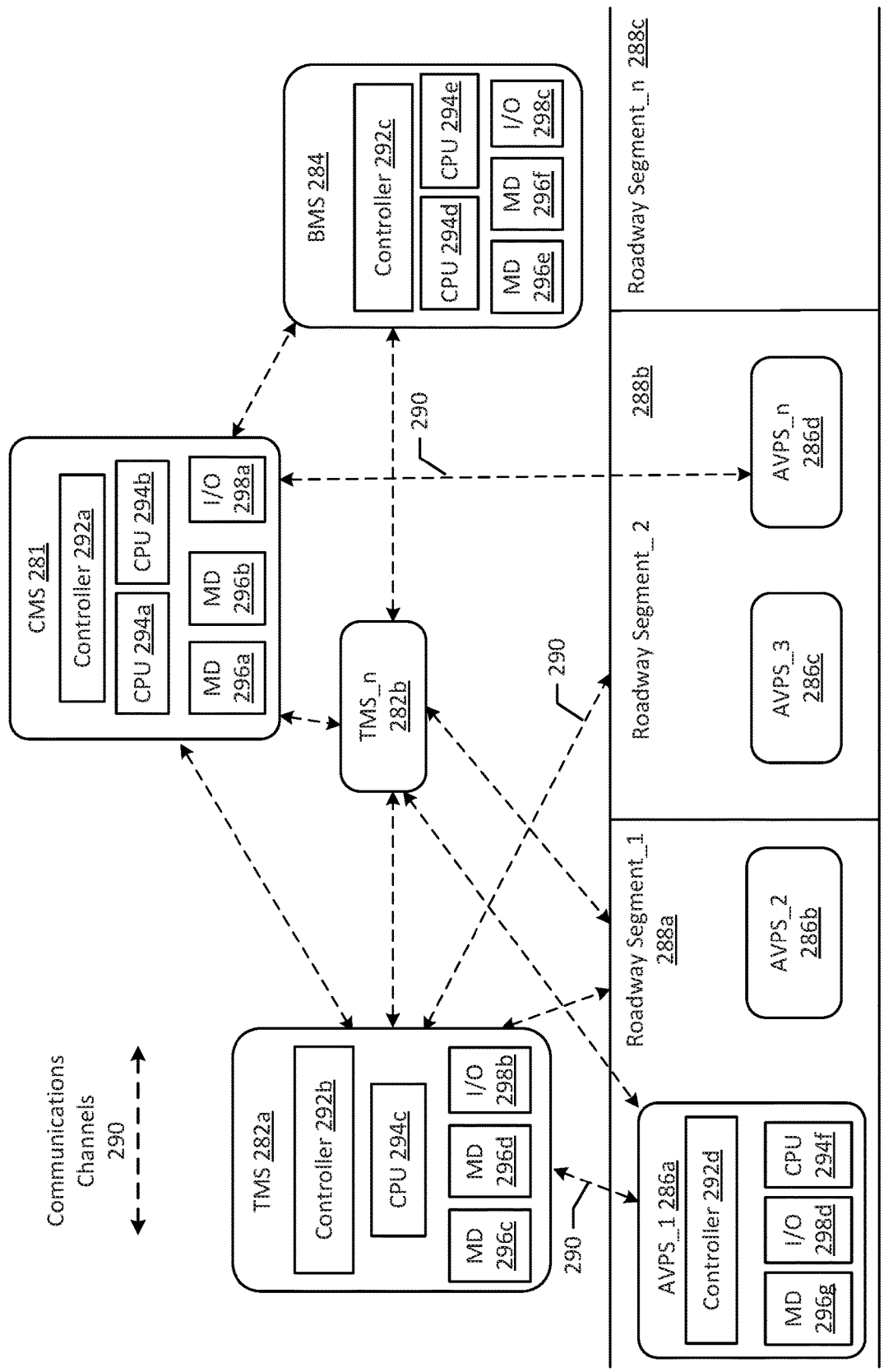
FIG. 3 illustrates a controller and communications arrangement according to an example embodiment of the present disclosure.

FIG. 3 illustrates a system overview 280 of a common management system ("CMS") 281 communicating with various other control systems, including several types of area controller and/or management system. For example, the CMS 281 may communicate with boarding zone management systems ("BMS") 284, trunk management systems ("TMS") 282a and 282b, and AVPS 286a-d.

The CMS 281 may be configured to coordinate a continuous flow of a plurality of vehicles, which may each have its own AVPS (e.g., 286a-d), on roadway segments (e.g., roadway segments 288a-c). The CMS 281 may coordinate the continuous flow of the plurality of vehicles through communication with the other controllers and management systems (e.g., TMS, BMS, AVPS) illustrated in FIG. 4. Through this communication, vehicles may be directed to arrive at a boarding zone from a plurality of interconnected roadway segments. Similarly, vehicles may be directed to depart from the boarding zone to the plurality of interconnected roadway segments. The roadway segments may be dedicated roadway segments with a plurality of roadway segments (e.g. roadway segments 288a-c). As discussed in more detail below, the boarding zone may include a plurality of vehicle slots where passengers can board the vehicles.

In an example, the management systems (and their respective controllers) may communicate via communication channels 290. The communication channels 290 may be normal communication channels or exception enforced communications. Each management system may include a controller (e.g., controllers 292a-c). Similarly, each AVPS may include a controller (e.g., controller 292d). Additionally, each management system may in turn include one or more physical processors (e.g., CPU 294a-f) communicatively coupled to memory devices (e.g., MD 296a-g) and input/output devices (e.g., I/O 298*a-d*). As used herein, physical processor or processor refers to a device capable of executing instructions encoding arithmetic, logical, and/or I/O operations. In one illustrative example, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device (e.g., MD 296*a-g*) refers to a volatile or non-volatile memory device, such as RAM, ROM, EEPROM, or any other device capable of storing data. As discussed herein, I/O device refers to a device capable of providing an interface between one or more processor pins and an external device capable of inputting and/or outputting binary data.

Processors may be interconnected using a variety of techniques, ranging from a point-to-point processor interconnect, to a system area network, such as an Ethernet-based network. Local connections within each node, including the connections between a processor and a memory device may be provided by one or more local buses of suitable architecture, for example, peripheral component interconnect (PCI).

1.1.4 Information Set(s)

An example information set comprises one or more of the parameters and control targets illustrated in the table below:

---

Transportation system target parameters, which define operational metric targets that control system components operate in ways to optimize their operations toward
    Trip time parameters, including
        Historical trip time metrics (between endpoint pairs)
        Trip time metrics targets (between endpoint pairs)
    System capacity parameters, including
        Historical system capacity metrics
        System capacity metrics targets
    Passenger wait time parameters, including
        Historical passenger wait time metrics (Summary, by time ranges, and by boarding zone)
        Passenger wait time metric targets (overall, by time ranges, and by boarding zone)
    Roadway parameters, which define operational metrics for specific roadway segments and sensing data, include:
        One or more roadway segment specific target parameter sets, including
            Roadway segment (or subroute) identifier
            Time range for parameter set
            Target velocity for vehicles on road segment
            Target capacity
            Target headway
            One or more roadway segment cooperative operation parameter sets
        Roadway segment specific sensor data, including raw (e.g. images, temperatures) and processed data (e.g. snow covered, blocked, etc.).
        Roadway segment operational metrics (from area controllers)
            Average Vehicle count (for time intervals)
            Average Vehicle velocity (for time intervals, in distance/time)
            Vehicle count (absolute count)
            Average delay (wait) time (in seconds)
    Cooperative operation parameter set (global)
        Shoaling parameters
            Maximum shoal size (in vehicles)
            Minimum intra-vehicle shoal gap (in seconds)
            Minimum inter-vehicle shoal gap (in seconds)

-continued

Vehicle operational parameters
    Request for transport information, including start point, endpoint or destination, vehicle assigned, start time, end time, passengers (# and ID)
    Trip route information
        Target route information, including start point, stop point, roadway segment information, and vehicle profiles.
    Vehicle operating parameters, such as velocity, intents, operating metrics
    Vehicle status parameters, such as occupied flag, charge state, Operational metrics.

---

1.1.5 Identity Management System

Some example systems described in the present disclosure are intended to support high density urban transport on an on-demand basis and as such each passenger who intends to use the system creates a reliable identity for use with the example system. This identity is unique to a specific user and may include for example biometrics (including but not limited to face recognition), one or more tokens (for example RF ID), one or more devices (for example smart phone), one or more credit cards or other financial instruments (including for example Apple pay and other touchless payment systems) and/or other reliable, verifiable unique identity information sets.

Advantageously, each potential user of the example system may establish a registered identity with an identity management system within the transportation system or an external identity management system that is federated with the transportation system. The user and passenger identity information is managed by this identity management system. Such an identity may include:

Sufficient identification characteristics to enable a vehicle and/or infrastructure to recognize such a passenger. Example identification may include a face recognition scan or other biometric information set, an identity representation from an authorized source, e.g., government/corporate ID, etc.

One or physical and/or virtual articles for exchanging value with the billing systems, e.g., a credit/debit card, stored value account, issued or recognized voucher/coupon, authorized third party ledger system, etc.

One or more device, token or other physical entity that may be recognized by the vehicle and/or infrastructure (for example smart phone, secure token with communications capability, RFID, etc.)

User preferences as a passenger, such as vehicle type, entertainment system settings, and the like.

Such registered identity information may also include information about relationships to other passengers, for example a family, friends, business colleagues and the like.

1.1.6 System Security

The example system may use cryptographic techniques to ensure the individual and overall security of the system and the components thereof. In some embodiments, this includes, but is not limited to:

Vehicle rolling chassis and components thereof (e.g. propulsion, braking, energy and the like)

Vehicle control systems and associated API's

AVPS

Vehicle sensor systems (from raw sensor data through all processing)

Vehicle information systems (system-wide and personalized)

Vehicle to vehicle and vehicle to control system component communications (end to end secured communications)
Information repositories
System infrastructure Embedding unique cryptographic signatures throughout an example system from the basic components of each vehicle through all the components that comprise an example vehicle may advantageously ensure the security and integrity of the system. For example, the use of one or more digital identifiers for each vehicle component, for example an electric motor controller may have a digital signature, using standard cryptographic techniques and technologies, such that there is a non-repudiatable unique identity for that component. Thus, the manifest of a vehicles components may be initialized and retained by, for example an AVPS and may be then recorded into a suitable irrefutable repository, for example a blockchain or similar record.

Security may be enforced, in part through the use of appropriate isolation, for example keeping AVPS and passenger entertainment and communication systems isolated from each other), the use where practical of secure processors (or those capable of supporting separate processing for secure and non-secure operations, such as ARM SOC and/or Intel SGX enabled processors). Communications throughout the system may be secured through TLS/SSL, for example to AES 128/256 bit standards, with separate key management for safety and redundancy systems where appropriate. Information repositories may use one or more standard cryptographic techniques to protect information when in transit and/or at rest.

1.2 Example Roadway Infrastructure

One example embodiment described herein is an integrated set of roadway infrastructure elements that together form a high density urban transport solution. In the example roadway, in whole or in part, some or all of the individual infrastructure elements may be encoded so that it can be recognized as unique by vehicles and control system components. This integration of specialized encoding at multiple levels, is configured to support sensing sets of different types by different vehicles. This configuration may support a redundant safety regime and highly accurate navigation and positioning to create an integrated high capacity personalized transport solution.

The width of a roadway segment travel lane is called the gauge. Optionally, a subset of the interconnected roadways may have sufficient width to allow multiple vehicles to travel in parallel in the same direction.

An example system may further have roadway segments that are marked with a machine readable location information.

1.2.1 Prefabricated Infrastructure

The example system may include one or more roadway infrastructure elements (the actual roadway itself) that are prefabricated, such that they may be combined and erected on site within a short space of time in order to create an example separated roadway segment and associated infrastructure elements. In some embodiments, each of these pre-fabricated roadway elements may be serialized and include one or more indicia suitable for recognition by one or more vehicles when transiting such a roadway element. Pre-fabricated roadway elements may also include reciprocal shapes facilitating connection of the roadway elements to each other (i.e. lego blocks/Märklin tracks) as well as cavities and other provision to support cable tunnels, wiring, fresh and waste water piping, radio base stations and other such facilities.

When deployed, such pre-fabricated roadway elements may be mapped so as to create the appropriate geo blocks for use by one or more control system components. Such pre-fabricated roadway elements may be positioned such that the physical location is further encoded into such a roadway element, which may then be communicated to vehicles transiting the roadway element as well as control system components managing such transits.

These pre-fabricated roadway elements may include serialized identifiers such that when connected together the sequence of serialized identifiers form a fiducial that is unique to a specific deployment environment which vehicles traveling on those components may recognize. This permits a vehicle to continue to operate autonomously by automatically identifying its location on a roadway when operating conditions diminish sensor operation or inhibit communication with other control system components (e.g. heavy snow, fog).

1.2.2 Reduced Gauge Infrastructure

Gauge limitations improve costs of specific segments. The system may have some roadway segments gauge restricted (for example, a dedicated segment or set of dedicated segments may be gauge restricted). Gauge restrictions may permit higher capacity operations in a limited physical footprint and may support adaptive reuse of the existing built environment, such as reuse of an existing traffic lane as a virtual roadway segment supporting multiple lanes of lighter gauge traffic or splitting an existing rails-to-trails structure currently used into a pedestrian/bike path and a one lane narrow gauge segment. Each segment may be appropriate for the width of a single vehicle at a specified gauge, a plurality of vehicles at a specified gauge (e.g. multi-lane), or able to be used by vehicles of differing gauges.

1.2.3 Integration of Infrastructure

The roadway may include one or more systems to support vehicle operations, including the provision of indelible information sources that have geo coded or other unique information sets that may be used by vehicles and/or the control system components supporting such operations.

In some embodiments, a roadway may have an embedded information set, for example an RFID tag, which provides a reference point for all vehicles travelling on such a road way so as to indicate the location, position, edge, center or other reference point on such roadway.

An example roadway segment may incorporate other passive identifying indicia, such as for example those that may be read by one or more sensor set, such as barcodes, undulations, markings and the like, that are embedded in the construction of an infrastructure element. The roadway indicia may include specific embedded elements that are optimized, and potentially serialized, for one or more sensor sets, in order to provide reference information. In some embodiments, the information set generated through recognition of these embedded positional information sets may be integrated with the information sets generated by active sensors on a vehicle, such that the combined information set may be communicated to other control system components, such as area controllers, management systems, and/or other vehicles, in any arrangement.

In some embodiments, a roadway may have one or more markers, for example, in the form of a grid or similar structured optical and/or non-optical reflective or reactive materials. For example, a vehicle may position itself within the frame of reference determined, in part by the roadway and the infrastructure therein. For example, a vehicle may include forward, left, right, 360 degree, upward and/or downward looking sensors including optical and non-optical (e.g. RF, infrared, ultrasonic, sonar, radar, audio and the like), for example an IR camera.

In some embodiments, a physical (such as a curb) or logical barrier (such as a geo fence), may be installed at those locations where vehicles and passengers interact closely, such as a boarding zone, where such a curb may include locational information, such as through embedding or reactive or reflective indicia.

In some embodiments, a roadway, such as a pre-fabricated roadway segment, may have multiple holes suitable for a geographic surveying device(s) to be inserted, and when deployed each of these markers may then be recorded and recorded in one or more repository. These holes may then be filled by, for example, metal plugs, which when combined with an appropriate road marking scheme create an encoding scheme that vehicles may use for positioning and navigation. For example, such markings may be undertaken using retro reflective paint and be created by a robot designed for such an activity.

Figure 4:
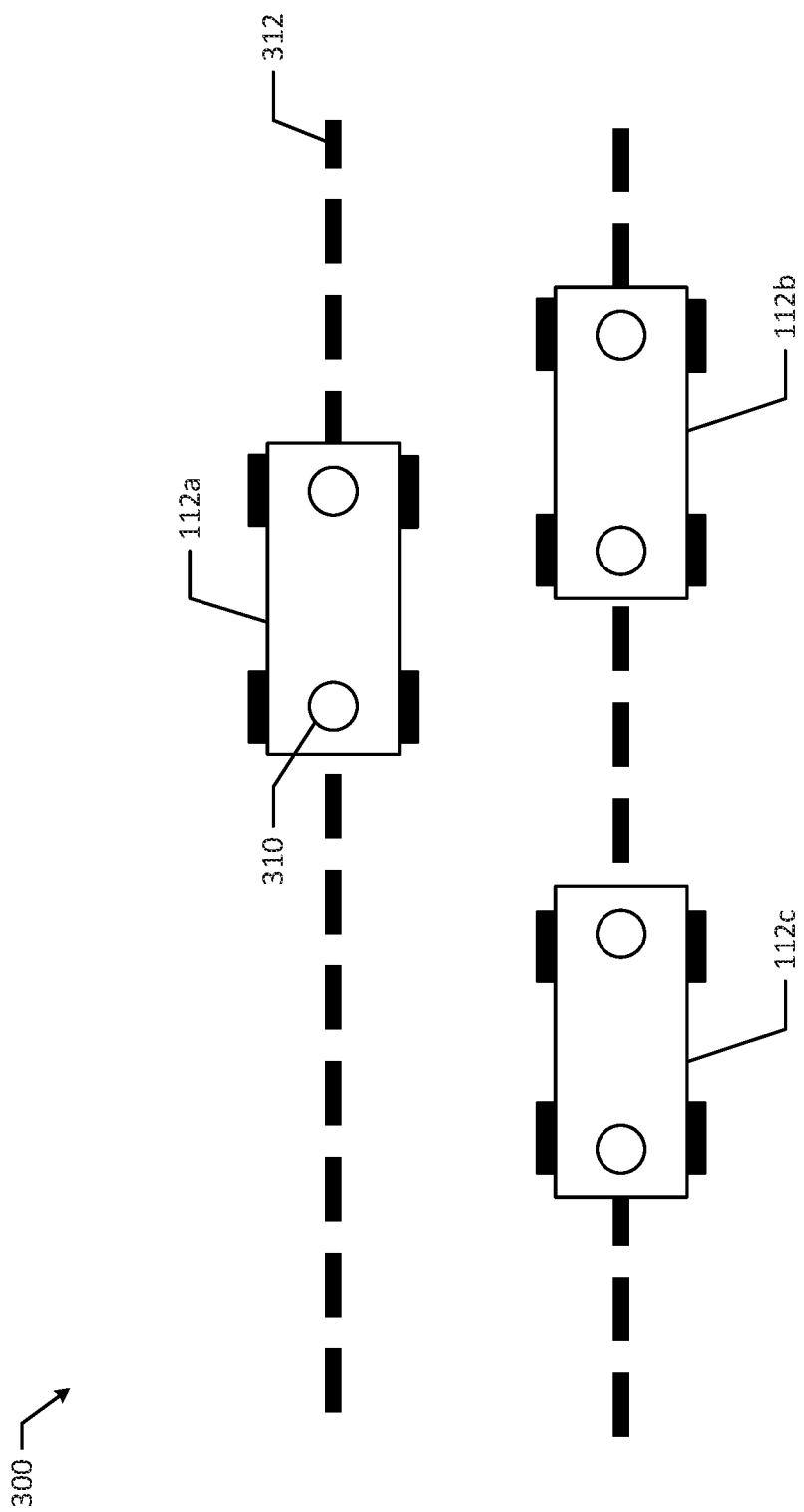
FIG. 4 illustrates an encoded roadway, according to an example embodiment of the present disclosure.

FIG. 4 illustrates an encoded roadway 300, according to an example embodiment of the present disclosure. An (x,y) position may be obtained from a combination of downward-facing camera data, for example, from a sensor or camera 310a-f, that reads markings 312 on the roadway, with inertial data. Road segment and/or infrastructure markings may be distinct and uniquely identified in a lookup database giving true and exact positions. From the database, the vehicle (e.g., vehicle(s) 112a-c) knows the precise position of the marking, and by inference, its own position. Wheel rotation data may be used to interpolate between markings. It will be appreciated that markings may be placed to a ±1 cm accuracy, combined with reading to ±1 cm accuracy, may yield an overall positional accuracy of approximately ±2 cm.

Some embodiments may include roadway and infrastructure encoding that provides for different sensing technologies differing returns, which may also represent differing information sets, for example one may have an encoded geographic location, another a relative roadway maker (for example) "Kilometer 6 on roadway 123" and the like.

1.2.4 Mapping

In the example system, the roadway may be mapped to a high degree of accuracy using multiple mapping technologies, including GSSN, land survey, radar survey, Lidar survey, optical survey, audio survey techniques to establish a comprehensive integrated map of the roadway and infrastructure elements. The accuracy of these mappings may advantageously be to an accuracy of ±1 cm. The physical infrastructure elements may be represented in a geographic information system or other system in great detail, but such forms may be inconvenient for real time control operations. As discussed herein, the physical ground (and its associated information) may be quantized into blocks, termed here Geo Blocks, which are associated with the mapped and surveyed properties of the actual ground, in a more quantized representation.

In some example embodiments, the granularity of the standard vehicle may be used to determine the appropriate granularity for that mapping. For example, a mapped Geo block may be sized so that it is sufficiently large to include one vehicle at some point in time. The mapping may provide a set of relationships between the underlying physical environment, such as the roadway itself, and the potential and actual physical locations of vehicles. Each of the geo blocks may include a set of relationships between the perimeter, center-line or other dimensional characteristic of the geo block and the physical environment which it represents. For example, a boundary of the physical environment, such as a wall, fence or other form of separation that are deployed to delineate the roadway from the surrounding environment may have a specific set of relationships with one or more geo blocks, which may include for example, wayside infrastructure elements that include sensor detectable unique identifiers and other indicia. For example, if a geo block is one a straight section of roadway, there may be a set of information characterizing the walls that are beside such a roadway, both in terms of perimeter and center-line, such that a vehicle may use such information for navigation and positioning.

For example, such a block may comprise a vehicle width plus, a side buffer, for example, 20 cm to 30 cm on each side, and a vehicle length plus an end buffer, for example 50 cm at each end. In this manner, a block can be said to "contain" one vehicle. Such blocks may be any shape, for example a curve may be mapped with dimensions that accommodate a single vehicle (and the block comprising such a vehicle) at rest.

Figure 5A:
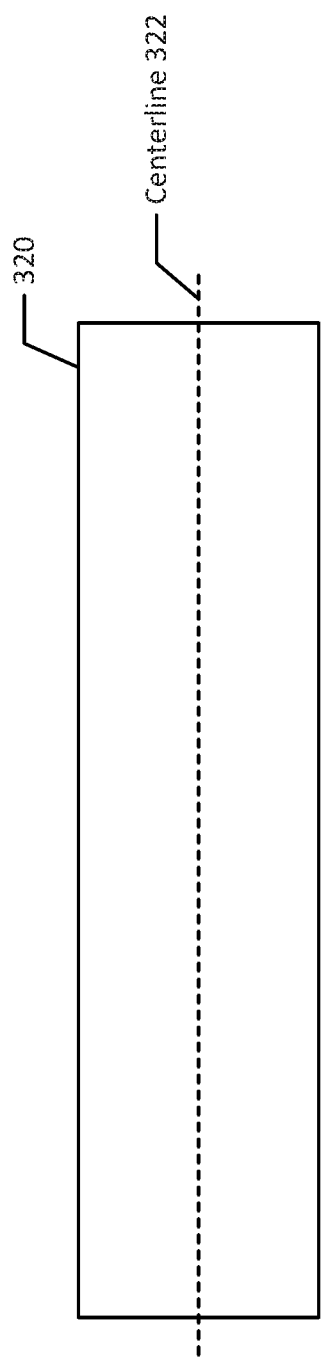
FIG. 5A illustrates an example of a standard logical block.
Figure 5B:
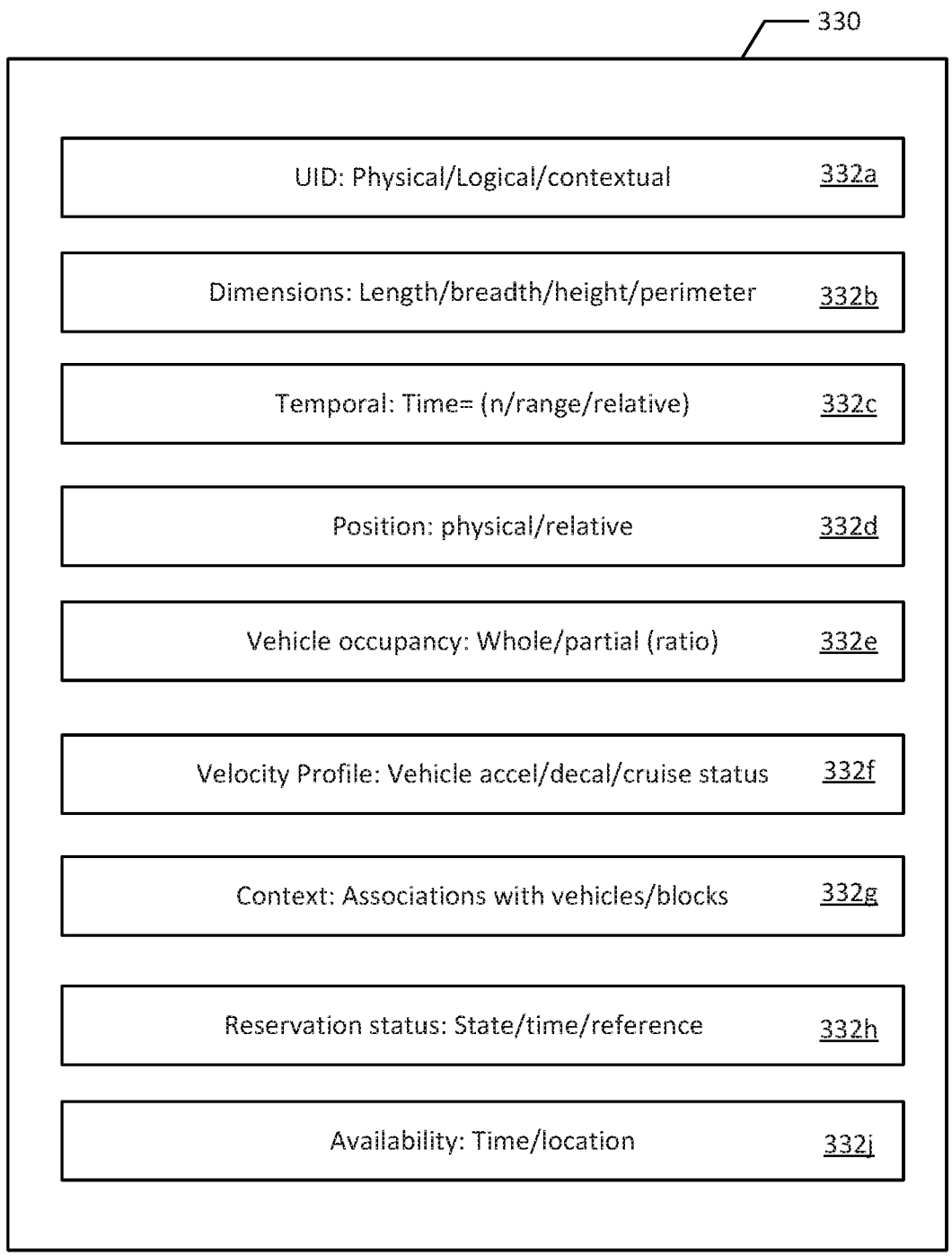
FIG. 5B illustrates an example attribute set based on a standard example vehicle.

For example, FIG. 5A illustrates an example of a standard logical block 320 and FIG. 5B illustrates an example of an associated attribute set 330 based on a standard vehicle. A standard logical block 320 may be sized sufficient to encapsulate a standard vehicle at rest with appropriate clearances so that vehicles in adjacent blocks never touch, even under adverse conditions. While blocks are described in the illustration as rectangular or near rectangular (e.g. with rounded corners), the disclosed system may also include irregular shaped blocks, curved blocks with varying radii, and boarding/disembarking zone blocks, as well as other shapes, as may be useful for controlling the system. An attribute set 330 associated with a logical block may include a unique identifier 332a, dimensions 332b (e.g., length, breadth, height, perimeter), time 332c, including a range or relative time when the logical block may be in a particular state, e.g., as part of an expected vehicle path, vehicle position 332d (e.g., physical or relative position), vehicle occupancy 332e (including whole or partial occupancy, which might be expressed, e.g., as a ratio), velocity profile 332f including vehicle acceleration, deceleration, and/or cruise status for a vehicle in the block, context information 332g, indicating the association of vehicles with particular blocks, reservation status 332h, indicating when a particular block will be reserved for occupancy, and availability 332j of a logical block at a particular time or location.

Figure 6A:
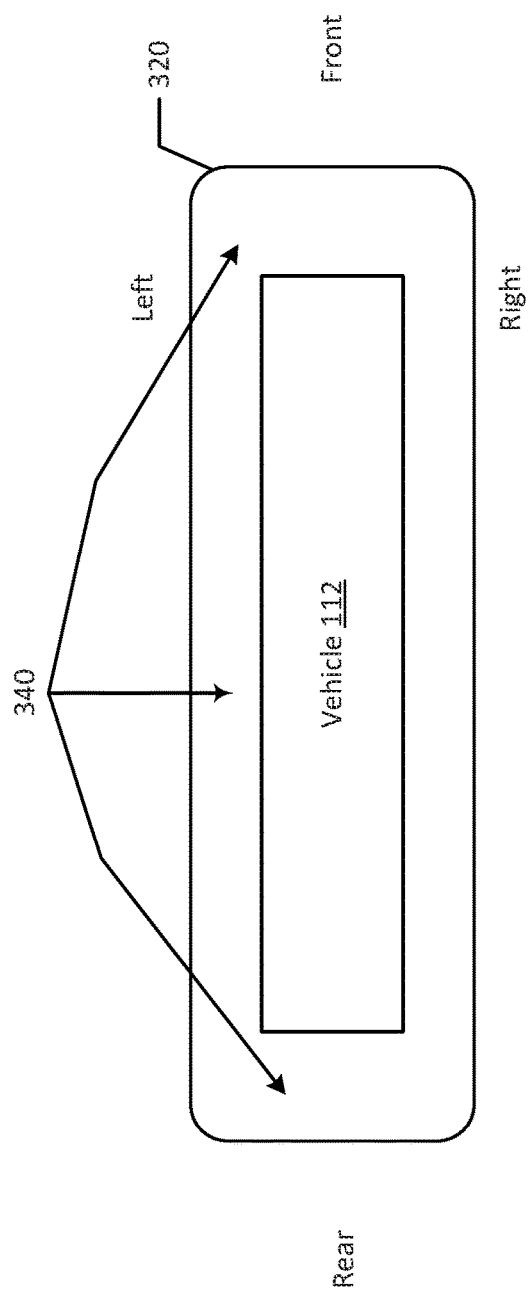
FIG. 6A illustrates the occupation of a standard block by a vehicle.
Figure 6B:
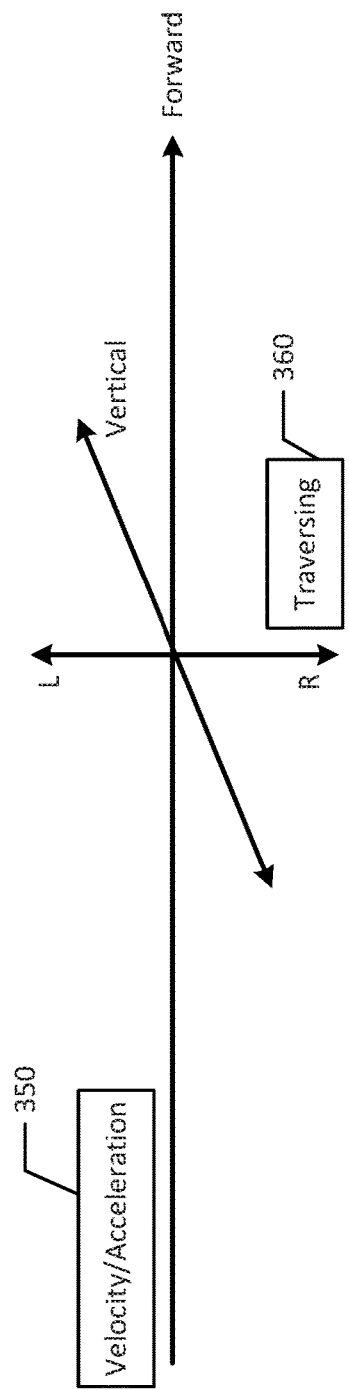
FIG. 6B illustrates information associated with a standard block.

FIG. 6A illustrates the occupation of a standard logical block 320 by a vehicle 112. Each vehicle 112 can have a pre-defined buffer space 340 around the vehicle 112, which determines the minimum distance that such vehicle 112 can have from an adjacent vehicle and/or the edge of a roadway. A block may be sufficient to encapsulate a vehicle with sufficient buffer space such that vehicles in tow adjacent blocks that remain within their block boundaries will not touch. FIG. 6B illustrates information associated with a standard logical block 320. In addition to a position, additional information can be associated with the logical block, e.g., vehicle velocity or acceleration, roadway traction coefficient (which may be calculated dynamically). The information may be shared with nearby vehicles, e.g., by an area controller. For example, velocity/acceleration information 350, traversing information 260, and positional information may be associated with the logic block.

A Geo block (geographic block) may be a uniquely identified representation of a specific physical roadway segment that has been mapped so as to create an accurate representation in one or more formats compatible with vehicles and control systems. A roadway may be mapped and divided into discrete geographic blocks, which represent a specific segment of such roadway and include the following characteristics: width, length, height, altitude/depth, radius, perimeter and at least one center-line 322. It will be appreciated other information may also be associated with a geographic block. For example, if the roadway is straight, then the geo block representing a part of that roadway can be a rectangle, the dimensions of which may be a standardized geo block, corresponding to the size of a standard vehicle plus sufficient buffer area for a boundary area to provide separation from other vehicles. There may also be a temporal set of characteristics for each geo block, where one or more clocks, including those of the transportation system infrastructure, management system, and control systems, may timestamp the block, and the operations thereof. For example, a geo block, which has a fixed relationship with the underlying physical environment, may use such timing information, in whole or in part, to assist in the determination of the availability of such a block to a scheduling system. For example, if a geo block is occupied by a vehicle at rest, for example one parked in a low peak period, such information may be used to indicate the unavailability of the block and the vehicle, and perhaps the expected duration of that unavailability. In this manner, such a block, which when occupied by a vehicle is labeled as an occupied block, may then have a relationship to a roadway that has certain dimensions and geographic features. For example, a roadway capable of supporting one or more vehicles traveling on such roadway may be expressed as a set of geographic blocks each of which is fixed in geography (for example a specified location, for example using surveying techniques, including cartographically mapped and uniquely identified features), such that for example the roadway comprises a set of uniquely identified blocks in an arrangement that represents a roadway.

Roadways may include constant radius turns, where one or more geo blocks are mapped to that curve such that each geo block may, contain one vehicle when a vehicle is present or transiting that block. For example, for a roadway capable of carrying multiple vehicles in parallel, there may be an equivalent number of geo blocks representing that curve.

In some embodiments where the example system of the present disclosure is provided using existing roadway, for example in a city center boarding zone, each of these physical environments will also be mapped. It will be appreciated that, though often the physical environment may include irregular areas, the physical environments can be mapped on the same basis, that is that they are able to contain one example vehicle at rest when fully occupied.

A block may in some embodiments; comprise a set of dimensions comprising length, width, height and perimeter measured in, for example, meters. Blocks may have fixed dimensions (fixed block) or dynamic dimensions (dynamic block). A fixed block may be geographic, for example related to a roadway and/or vehicle based, for example for a single or multiple occupant vehicle, repair or maintenance vehicle, freight vehicle and/or the like. A dynamic block may have dimensions that are related to the velocity of a vehicle, or a set thereof, a distance related to the acceleration or deceleration of a vehicle, and/or other dimensions that are related to the dynamics of vehicle and/or supporting system operations. For example, for a set of vehicles, where for example the vehicles are physically or logically connected, the dynamic block may comprise the complete transit route of those vehicles from their origin point(s) to destination point(s).

Blocks may be typed, such as where the block is geographic it may expressed in one or more notations, for example, of the form B-G-(UID)—(location XYZ)—where B designates Block, G designates type Geographic (Geo), UID is a unique to at least that deployment identifier and Location XYZ is the associate physical location expressed using standard locational descriptors, for example latitude/longitude (e.g. GSSN) coordinates.

There may be situations where through feedback from the operations of one or more vehicles, sections of physical roadway may not support the operations of those vehicles to the degree specified, for example a section of roadway may be in need of resurfacing and consequently the dynamics of the vehicles operations, for example acceleration and/or deceleration (braking) may be adjusted to account for those circumstances. In such as example the geo block associated with that physical segment of roadway may be modified, for example extended, so as to normalize the behavior of the vehicle in terms of travel over ground as expressed by a control software system.

Information sets generated during the use of Geo blocks may be used in differing physical locations, for example a bridge in a physical location A may provide traffic and/or other management systems with an information set that may be deployed in location B with a similar bridge.

Geo blocks may preferably be sized so that they have only one vehicle that fully occupies a particular Geo block at one time. Such full occupation precludes another vehicle entering that block, until, at least in part, the vehicle occupying that Geo block has started to leave that block. For example, for operations where a vehicle entered a Geo block from the rear whilst a vehicle that had previously occupied the whole Geo block was leaving by the front, then the Geo block may, subject to the distance agreed and/or specified between the vehicles (and potentially an area controller), contain temporarily two vehicles in part.

When referencing the position P of a vehicle entering or leaving a Geo block B, this can be expressed as, for example, BP (Block Position)=V(uid) 0.37 {B-G-(UID)-(location XYZ)}, meaning vehicle's XYZ center-point has advanced 0.37% into referenced geo block B along its centerline.

It will be appreciated that, in some example embodiments, a system may have multiple levels, for example when fitted into an existing tunnel of a subway or other tunnel, where each geo block has a depth from a specified position, and consequently has a unique identifier sufficient to distinguish two blocks with the same horizontal location, but differing depths.

Figure 7:
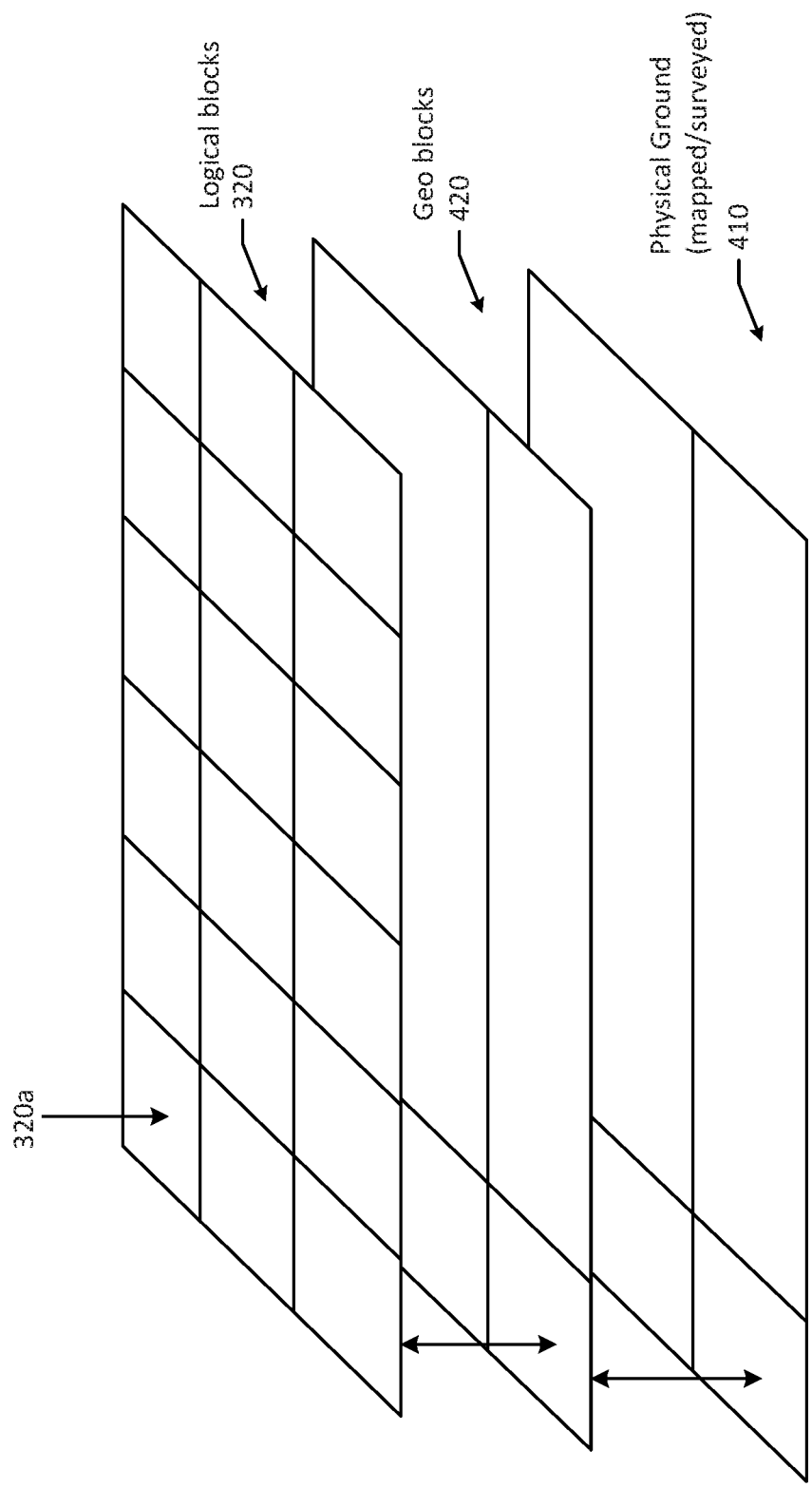
FIG. 7 illustrates relationships between the layers of blocks comprising a mapping of an example roadway in some example embodiments.

FIG. 7 illustrates relationships between the layers of blocks representing a roadway, according to an example embodiment of the present disclosure. At the lowest level, the actual physical ground or roadway 410 may be surveyed, mapped, and possibly labeled either optically, or using electronic approaches, such as RFID. At a next level, the system may include a quantized map of geographic location, e.g., for use in by control system components. This map may be assembled from Geo blocks 420 that have associations with physical ground blocks and with higher level logical blocks 320. At the highest level, a logical block (e.g., logical block 320a) represents vehicle flow, and may be associated with or associated to multiple Geo blocks 420, e.g., representing current and future positions of vehicles or vehicle flow. It will be appreciated, that while the blocks look similar in size on the illustration, they need not be similarly sized, and also need not be in a 1:1 relationship, e.g., a single logical block 320a may have associations with multiple geo blocks 420. In an example, each logical block 320 may have at least one profile active at a point in time.

1.2.5 3d-Radar Mapping

In some embodiments, the example roadway system may be mapped by radar/Lidar so as to create a 3D radar/Lidar map for the environment. Such mapping may include recognition of system infrastructure artifacts that have been positioned specifically to provide such radar mapping with identifiable landmarks. These landmarks example may be unique to the system, providing a unique radar signature that may be used by a vehicle to identify and/or confirm a location in support of that vehicles' positioning and navigation.

Such a mapping may be employed, for example, in the form of a repository stored by example on each vehicle. Each vehicle's radar sensors may provide navigation and position information to that vehicles AVPS. Should there be any variations detected by such processes, these may be sent to an appropriate control system component, such as an area controller, and may be validated by other vehicle sensors, such as cameras, to determine whether the vehicle may need to take avoidance or other actions.

1.2.6 Feature Mapping

A complete example transportation system roadway and associated infrastructure elements are mapped in detail, for example to an accuracy of plus or minus 1 cm. Each feature in such an environment may be identified and classified. The classification may enable sensors to more accurately and efficiently process incoming information sets. This approach also supports providing machine learning systems, such as deep learning with appropriate classified feature sets at multiple levels, which may then be used to refine and/or optimize sensor performance.

1.2.7 Mapping Granularity

The mapping of geo blocks may employ a number of approaches to creating an appropriate granularity that supports locational positioning for the example system. It will be appreciated that, because roadways may be separated, mapping of the system roadway and associated infrastructure elements can be undertaken in a highly granular manner. The roadway and infrastructure elements may be mapped in multiple frequency and time domains, for example visual, audible, radar and/or other electromagnetic frequency and time domains.

Associated meta data may be provided for each mapped segment, for example roadway conditions, such as snow, ice, water (standing and/or running), bumps or surface irregularities, spills of either liquid or solid materials, or the like. Other roadway conditions may include obstacles, such as barriers, holes, roadway deterioration states (for example on a one to five scale, where five is the best road condition (e.g. least worn) and 1 is the worst (e.g. most worn), dead animals, rubbish and detritus (e.g. discarded cans, plastic bags and the like), blocked drainage and the like.

This mapping may be integrated into geo blocks and may associate with one or more vehicle operating profiles, for example Cruise/Merge/Demerge etc. Mapping may also be applied to boarding zones (both static and dynamic). The mapping may be considered, in part or in whole, in determining the configurations of the vehicle operational profiles, for example by variations in velocity, acceleration and the like.

1.3 Logical Blocks

In some embodiments, there may be a set of mappings based on logical representations of the underlying geo blocks, but which are synchronized to one or more time clocks. These logical blocks form the "river" of available capacity for vehicles to occupy at relevant velocities of those vehicles transiting a roadway, in the example system of the present disclosure.

Logical blocks provide a quantized perspective on the capacity of a specific section or roadway represented as geo blocks, such as that for example the rate of travel of a logical block. An available capacity unit capable of containing a standard example vehicle is in part determined by the velocity profile of that block. For example, in a trunk roadway segment this may be 50 kph, whereas in a city center which includes one or more slow speed or boarding zones this may be 25 Kph. As such the ratio of logical blocks to geo blocks may be different in different locations or different situations. This flow of logical blocks can provide the basis for a dynamic capacity model for a system deployment.

Logical blocks may also be inserted or removed from a flow of vehicles transiting a set of logical blocks. For example, in an example, a flow of vehicles is travelling at 50 Kph, with an inter-vehicle distance of 4.65 m. The vehicles in example stream may vary their velocity to create at a specific point in the flow, one or more further logical blocks. The new logical blocks may be made available to other vehicles. These vehicles may then use these blocks to enter the stream, for example when vehicles are merging with that vehicle flow. This approach may also be used, when one or more distributor roadway segments are feeding into a trunk roadway segment. Once the merging vehicle has entered the flow, each of the other vehicles in proximity in that flow may then adjust their individual headway so as to maintain the continuous and optimized flow of those vehicles.

A block may be occupied, in that it is said to "contain" a vehicle. For example a logical or Geo block may include a vehicle that, in whole or in part, is contained within the boundaries defined by such a block.

FIGS. 8A, 8B, 8C and 8D illustrate relationships between a vehicle and a block, showing a block fully occupied, and a vehicle entering and leaving a block. For example, FIG. 8A illustrates an example of a vehicle 112 leaving a block 320. The rear of the vehicle may occupy a portion of the block with a block to vehicle ratio of 1:n (e.g., where n is the percentage of the block occupied). FIG. 8B illustrates and example of vehicle 112 entering a block. The front of vehicle 112 may occupy a portion of the block with a block to vehicle ratio of 1:n (e.g., where n is the percentage of the block occupied). In an example, trailing edge ratios may be negative and leading edge ratios may be positive. FIG. 8C illustrates and example of a vehicle fully occupying a block where the block to vehicle ratio is 1:1. An anchor block 460 may be a geo block 420 and/or a logical block 320. Additionally, block to vehicle ratio may include the edge of the block, which is being entered or exited. For example, a ratio of 1:n may designate the entry by a vehicle from the rear of a block.

Logical block arrangements may comprise sets of blocks, which can be identical in dimensions, such as a standard logical block based on the dimensions of a standard vehicle. There may also be other types of blocks. For example, a headway logical block, may have dimensions that are equal to the inter vehicle distance determined for a specific velocity. Other types of logical blocks may include, for example, constant radius curve logical blocks, merge and demerge logical blocks, deceleration and acceleration logical blocks (for example those used in boarding zones), etc. In some embodiments, logical blocks may be dynamic, such that their dimensions are adjusted to suit a specific set of operating conditions. For example, logical block sizes may be adapted to conform to a size determined to provide optimum integration of traffic flows, for example, when a distributor roadway segment is merging with a trunk roadway segment. In response to congestion, or to allow merging logical blocks may shrink and speed or velocity may be adjusted.

In some embodiments, logical blocks may have associated profiles, which express the velocity and acceleration/deceleration characteristics of that logical block. For example, a logical block may have an associated cruise profile, merge profile, boarding zone profile and the like.

1.4 Block Profiles

Each logical block may have an operating profile, which expresses the operating parameters of that block. For example, a block may have a cruise profile, where the velocity of the block is 50 kph. Such a profile may be used, in some embodiments, to provide a target set of conditions for a vehicle attempting to synchronize with that logical block.

Figure 9:
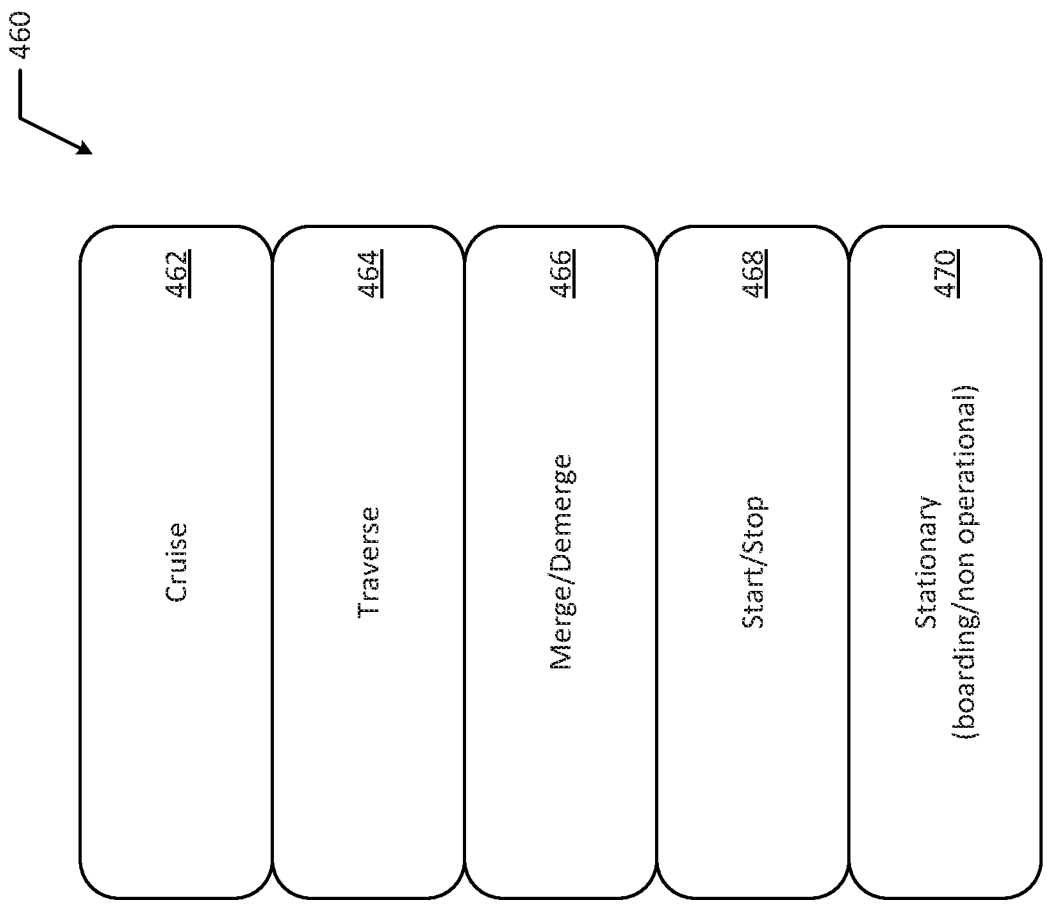
FIG. 9 illustrates the vehicle profiles arranged by increasing velocity.

FIG. 9 illustrates example vehicle profiles 460 arranged by increasing speed. For example, block profiles may include:

Cruise profile 462: Set at a specific constant speed with some variance for maneuvers and control system parameterization provided in one or more information sets. For example, cruise speed may be 50 Kph with ±10% for adjusting to a vehicles position, for example, when other vehicles are merging. In dense inner city environments with multiple boarding zones, cruise speed may be set at 25 Kph to account for the high number of merge/demerge maneuvers being undertaken.

Traverse profile 464: A vehicle traversing may need to adjust its speed to enable the vehicle to, for example, traverse a roadway from the left most boundary to the right most boundary. The traverse may be needed, for example, to exit the trunk roadway segment onto a distributor roadway segment. Velocity and acceleration/deceleration may be varied within a specified performance envelope so as to achieve this maneuver. The traverse may be undertaken in cooperation with the other vehicles in the flow. Such a maneuver may be initiated and/or controlled by the vehicle itself and/or by an area controller.

Merge/Demerge profile 466: A vehicle enters or leaves a flow of vehicles, which typically may be traveling at cruise profile. For example, a demerge may be used to allow a vehicle to demerge from a trunk route so that a passenger may alight at their destination. Alternatively, a merge may occur when a passenger has occupied a vehicle and that vehicle now merges with a traffic flow so as to take the passenger to their destination.

Start/Stop profile 468: A vehicle is entering/leaving a boarding zone so that a passenger may board or alight from the vehicle.

Stationary profile 470: The vehicle is at rest and may be waiting for a passenger. While waiting, the power use configuration may be reduced, but still set at a level to enable passenger recognition and entry. The vehicle may be parked at a location awaiting the receipt of additional information sets, which may comprise additional control system instructions, in which case it can enter a quiescent state in order to save energy until it receives additional information sets from an authorized area controller.

Each of these profiles may consist of a set of configurations for the vehicle operations, including velocity, acceleration/deceleration, passenger experienced G force, energy consumption, positional and direction change and the like.

These profiles may be combined to create a journey from an origin point to a destination point. For example, an example journey may include the following profiles:

Stationary (Embark): Start (leave boarding zone): Merge (enter vehicle flow—e.g. Trunk or distributor roadway segment):Cruise: Demerge(exit trunk or distributor roadway segment): Stop(enter boarding zone): Stationary (disembark).

The vehicle may operate a set of contextual synchronization and harmonization operating conditions set (CSHOCS), where each profile has a CSHOCS and there is an overall CSHOCS that governs the overall journey. In some embodiments, a control system component, such as an area controller, may supply one or all of the parameters and/or the CSHOCS to the vehicle as part of an information set that is communicated to the vehicle such that the vehicle may undertake the relevant operations.

1.5 Vehicles and Adjacent Blocks

Figure 11:
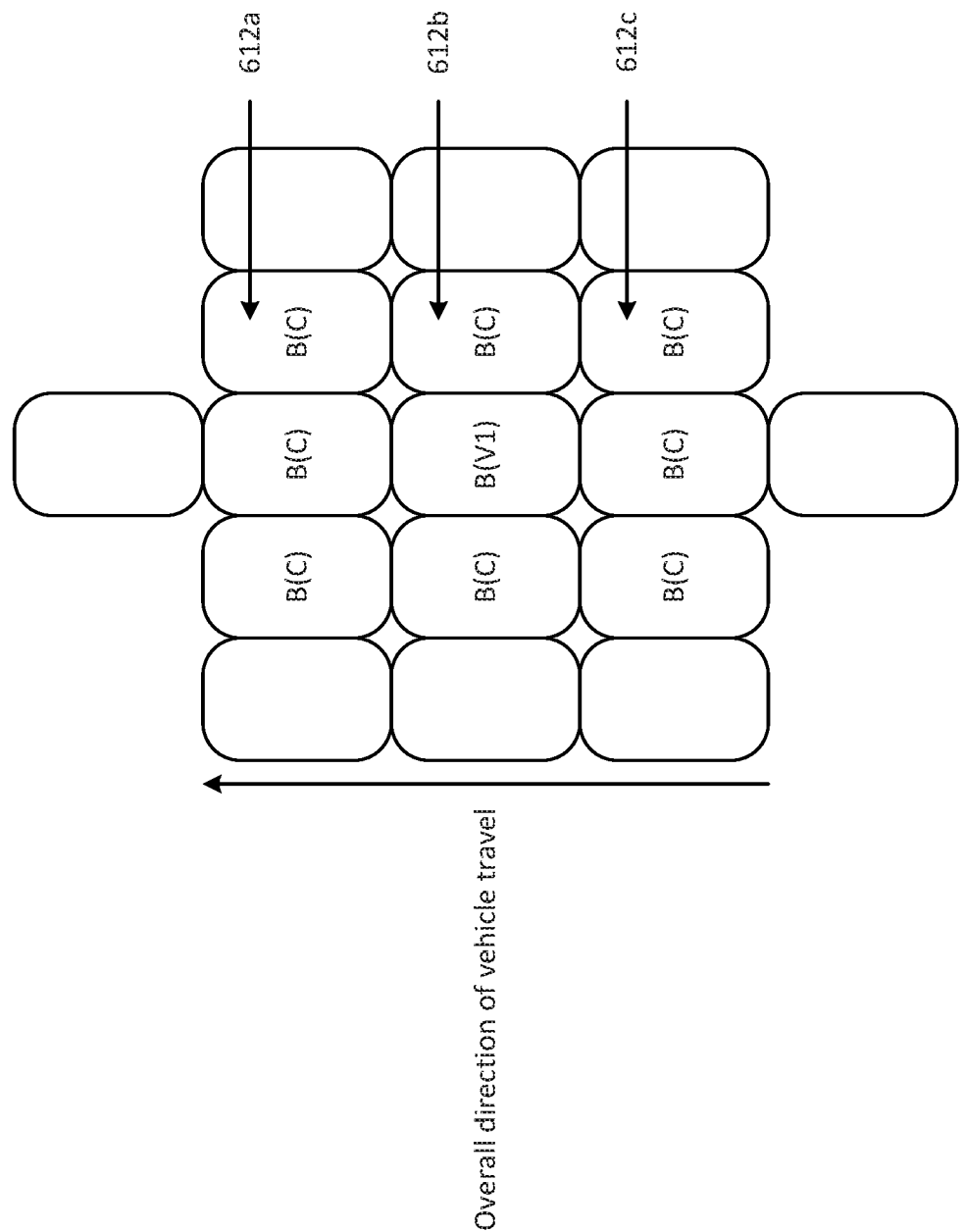
FIG. 11 illustrates a series of blocks, one of which is occupied by a vehicle (V1) and examples of the potential rule sets associated with those blocks for a second vehicle (V2) that may attempt to enter those blocks.

A vehicle may occupy a logical block, and the vehicle may be moving. For example, occupied logical block may be transiting geo blocks at a velocity. Thus, the vehicle ma be surrounded by adjacent logical blocks that may contain other vehicles. The blocks that are directly adjacent to the vehicle are said to be contestable blocks, in that any vehicle entering that block can only do so if the vehicle has the right to do so and that block or section thereof to be entered is not occupied by another vehicle. FIG. 11 illustrates a series of blocks 612, one of which is occupied by a vehicle (V1) and examples of the potential rule sets associated with those blocks for a second vehicle (V2) that may attempt to enter those blocks. Blocks which are contextual to a specific vehicle, but are not occupied by that vehicle may be defined as "contestable", which is illustrated as a B(C) block. The reach of a vehicle's awareness may depend on the velocity, direction and distance from a vehicle block B(V1) as well as information sets from other vehicles, infrastructure and/or control system(s). In the illustrated example, each block adjacent to B(V1) has a contextual relationship with B(V1) and each other, thereby representing potential movements by a vehicle (e.g., block B(V1)) and potentially other vehicles.

Each block may have an associate rule set. For example, block 612a may have an associated rule set that V1 may enter after informing all vehicles within (n) blocks of the proposed direction change. Block 612b may have an associated rule set that either V1 or V2 may enter, but not both. Additionally, block 612c may have an associated rule set that another vehicle (e.g., V2) may enter, but V2 may not exit block 612c into B(V1).

In some circumstances a block may have two vehicles which are partially occupying that block, for example when a vehicle is entering a block whilst another is leaving. For example, if the relative distance between the vehicles remains constant, then such a maneuver may be undertaken safely. For example, two vehicles may simultaneously occupy a single block, according to an example embodiment of the present disclosure. Additionally, a vehicle may simultaneously occupy multiple blocks, as illustrated in FIGS. 8A and 8B where the rear of vehicle 112 occupies one block while the front of the vehicle 112 occupies another block.

A geo block may "contain" a vehicle, for example expressed as (V(UID))-Vehicle with unique identifier. Each vehicle may have sufficient situational awareness to identify, though deterministic sensor based inputs and/or through information sets provided by other vehicles and/or area controllers, the relative positions of other vehicles in relation to it. In this manner, a vehicle which is contained by a logical block, which may be notated (B-V) or B(V), may move across a roadway (comprising sets of geo-blocks B-G or B(G)) at a specified velocity and/acceleration/deceleration.

This creates a layer model where the relationships between the geo-blocks B-G and logical block B-V may be specified both in absolute and relative terms. In some embodiments, such relationships may be expressed as probabilities in terms of scheduling the relationship between one or more logical blocks B-V and one or more geo blocks B-G.

It will be appreciated, there may be multiple layers of intersecting blocks. For example, a dynamic block may include at least one vehicle which is traversing a roadway by moving from the left to the right, for example to demerge from a flow of vehicles. This dynamic block may comprise a set of blocks of a fixed size for example a logical block B-V in the center with a further logical block connected to each side of B-V logical block. A similar approach may be used for those vehicles that are merging with the stream. In this manner, an "exclusion zone", may be created dynamically. The logical blocks in the exclusion zone may be notated as B-E (Block Exclusion) for that vehicle. When the vehicle is traversing from one geo-block to another, the exclusion zone may be used to calculate the potential for intersection with another vehicle wanting to, or occupying that B-G.

Each block has a set of characteristics. The characteristics may include the dimensions of the block. Another characteristic is the leading edge. The leading edge of the block may be assigned depending on the direction of travel. The designation of the perimeter edges of a block may change in accordance with the vehicle's direction of travel. For example, a block containing a vehicle has edges that may change designation based on steering profile and direction of that vehicle. For example a side edge may become leading when the vehicle is moving sideways, which may occur, for example, with"4 wheel" steering vehicles.

1.6 Boarding Zones

A boarding zone is a location in the system where passengers may join with a vehicle or leave a vehicle safely.

1.6.1 Boarding Zone Controller

A boarding zone controller and its associated management system (BMS) manages the vehicle and passenger flows within a boarding zone and in the area around a boarding zone.

Figure 10:
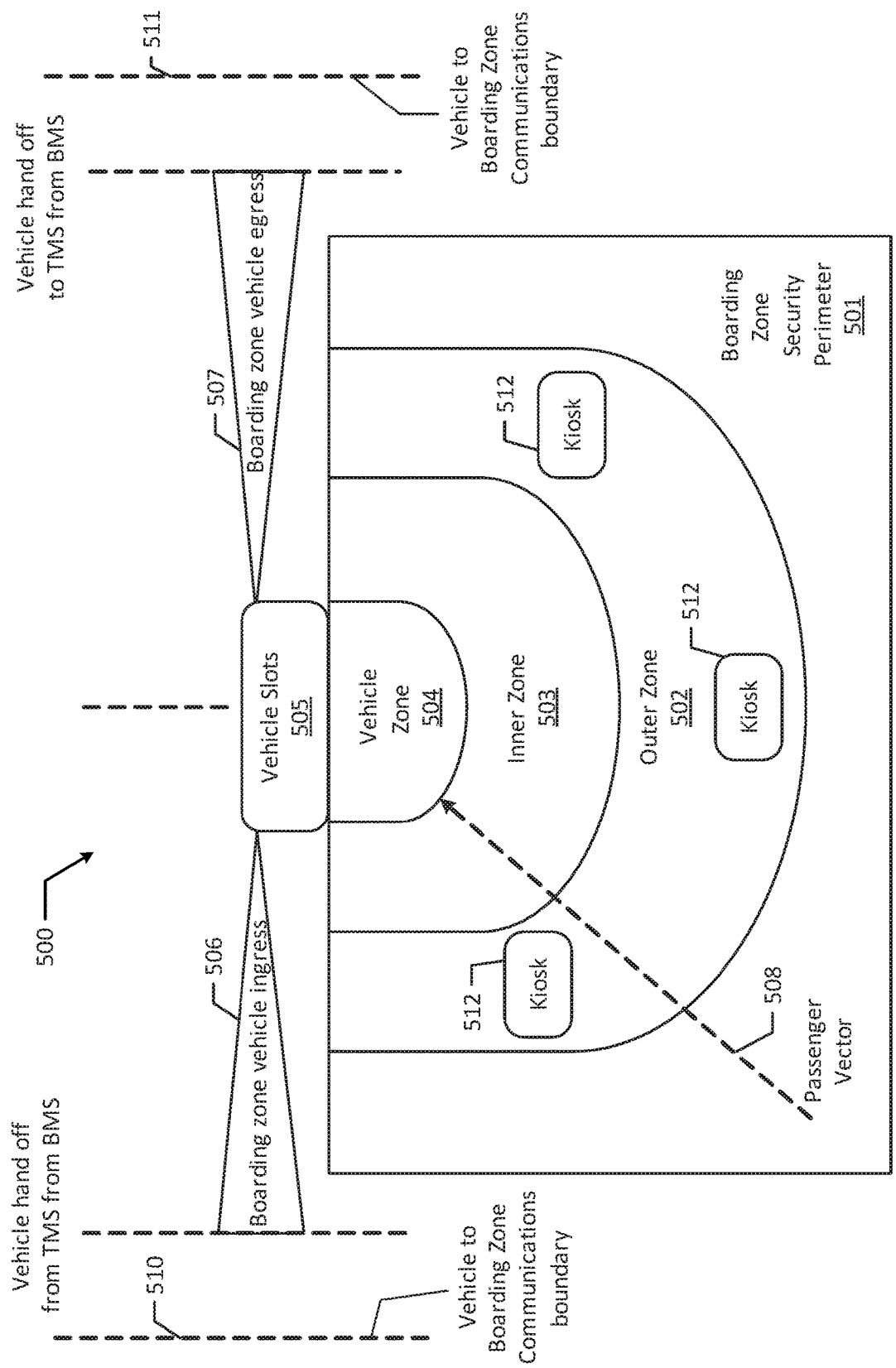
FIG. 10 illustrates an example boarding zone in an example embodiment of the present disclosure.

FIG. 10 illustrates an example boarding zone 500. For example, a boarding zone may include one or more vehicle slots 505 that are configured to allow a vehicle to park in the vehicle slot. Additionally, a boarding zone vehicle ingress region 506 and a boarding zone vehicle egress region 507 may be connected to each vehicle slot. The boarding zone vehicle ingress region 506 and the boarding zone vehicle egress region 507 connect the roadway segments of a dedicated roadway segment to the vehicle slots. The boarding zone 500 may also include a passenger boarding zone 501, which may be a geographically delineated area with one or more outer geo-zones (for example an outer zone 502 and inner zone 503) and a vehicle boarding geo-zone 504. Passengers may travel through the passenger boarding zone 501 along a passenger vector 508. The passenger boarding zone 501 may be adjacent to the vehicle slot 505 so that passengers can embark and/or disembark from vehicles parked or standing in the vehicle slot.

As illustrated in FIG. 10, vehicles may communicate with a boarding zone management system ("BMS") and its associated boarding zone controller ("BZC") once they are in proximity with the BMS and/or BZC. For example, there may be a communication boundary 510, 511 that vehicle crosses before communicating with a BZC. Additionally, a TMS may hand off the vehicle to the BMS once the vehicle approaches a boarding zone vehicle ingress region. Similarly, the BMS may hand off the vehicle to the appropriate TMS as the vehicle exits a boarding zone vehicle egress region to a roadway segment. In an example, a vehicle may be monitored by one or more management systems at any given time such that the CMS has real-time information on the location of each vehicle in the vehicle flow.

Each of the passenger and vehicle interactions may involve a slack time calculation, in that there is an available time for the synchronization of the assignment of a vehicle to a passenger for a specific journey, which has been instantiated as an information set.

Passenger Identity Manager: This element identifies a passenger through one or more techniques, including face, gait and/or other biometric recognition, device recognition, passenger declaration (for example self-identification at a kiosk) and the like. This information set may be used, in part to track the progress of a passenger to the boarding zone slots and subsequently to the assigned vehicle for their journey. For example, the geographically delineated area of the boarding zone may include one or more sensors to allow recognition and monitoring of passengers. In an example, passenger recognition includes establishing the location of the passenger through opt-in device based location systems, preferably through one of Bluetooth, RFID, and GPS.

Passenger Location Tracking: This includes establishing the location of the passenger, either through opt in device based location systems and/or through self-declaration by the passenger at the time of the interactions with reservation systems. Such information may be used in part to determine which boarding zone a passenger is directed to, the likely transit time for their travel to such a zone, and the direction from which the passengers approach such a zone.

Once a passenger has entered a boarding zone outer geo zone, their presence may be either detected by one or more passenger identification systems or they may announce their presence through interaction with at least one kiosk or other boarding zone passenger management system. For example, they may possess a bar code, electronically or physically which they present or they may simply provide details of their reservation, such as a confirmation number or similar.

Kiosks 512 (as illustrated in FIG. 10) may be positioned in the outer geo zone of a boarding zone to permit those passengers who do not have a device, have not preregistered their identity or may need to provide further confirmation to establish their presence at a boarding zone for the purpose of undertaking a pre-arranged journey.

A kiosk 512 may, in some embodiments, be able to recognize a passenger, provide a passenger with a printed bar code for a vehicle, accept a value token or other stored value card, coordinate a passenger transaction for a passenger whose reservation was undertaken by another registered system user and the like.

1.6.2 Boarding Zone Operations

In some embodiments, the matching of a vehicle to a user may involve employing one or more matching algorithms, which involve the identities of both the vehicle and the user. For example, a user may present him/herself to a vehicle which has been pre-scheduled and pre-positioned for that user, at a specified time period, and such pre-positioning information is made available to that user, and thus the match is achieved. This approach is suitable for conditions for example, where there are only a few people and few vehicles, such as for example a residential area where the vehicle may be situated outside the users address.

However, in a crowded area, for example where multiple people are present at a specific time, for example when a theatre empties, and there may be multiple vehicles that have been scheduled to match to that set of users, there is a need to determine the appropriate allocation of vehicles to users in an efficient and user friendly manner.

In some embodiments, this may be achieved through the use of vehicle identifiers, such as for example signage on the vehicle, indicators directing a specific user to a specific vehicle, recognition by a vehicle, user characteristics detection such as via facial or movement features other biometric characteristics, detection by the vehicle of an RF tag, Bluetooth signal and/or other electronic identifying signal, recognition of a bar code displayed on a passengers device and/or other identification approaches that enable such matching. For example, a vehicle may send a specific passenger a message, which includes a set of instructions and/or indications, such as dots on a map, audible beeps, haptic indicators and/or other indicative information that enables a passenger to present themselves, and potentially their credentials to such a vehicle. In this manner, a set of vehicles may match to a set of passengers without requiring a specific vehicle to match to a specific passenger.

In the situation where there is an extremely large number of passengers requiring a large number of vehicles at a particular boarding zone (or set of boarding zones) in a short time period, for example when a sports event finishes, there may be a large set of vehicles that are pre-positioned in those one or more boarding zones, or actively traversing roadway segments near those boarding zones, and using similar approaches to those described herein so that each passenger or group of passengers may be allocated to a vehicle.

In certain situations there may also be a 'turn up and go' mode of boarding zone operation, where authorized users present to a vehicle without prior booking, where the vehicle either departs immediately to an assumed yet unconfirmed destination, and the destination is confirmed by the user once the user is already in the vehicle.

In some embodiments, a user may be offered a more convenient vehicle allocation, for example, by optionally sharing the vehicle with another user.

Contested areas are those boarding zones where there are vehicles and other entities, such as people or other non-system vehicles.

Boarding zones may be fixed at specific positions and/or may be dynamically located depending on availability of roadway and/or other considerations.

Figure 12:
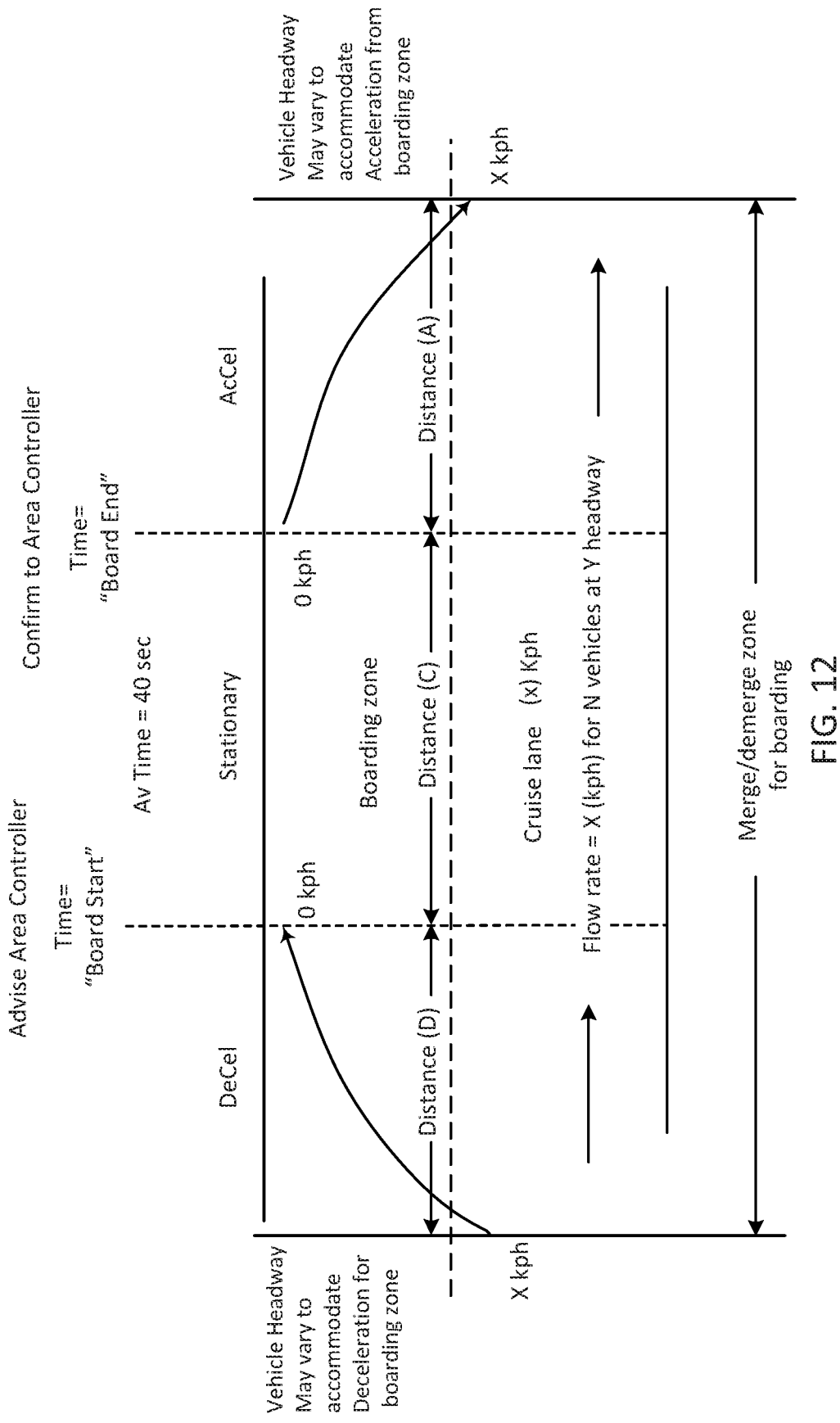
FIG. 12 illustrates an example process for handling boarding and de-boarding, according to an example embodiment of the present disclosure.
Figure 13:
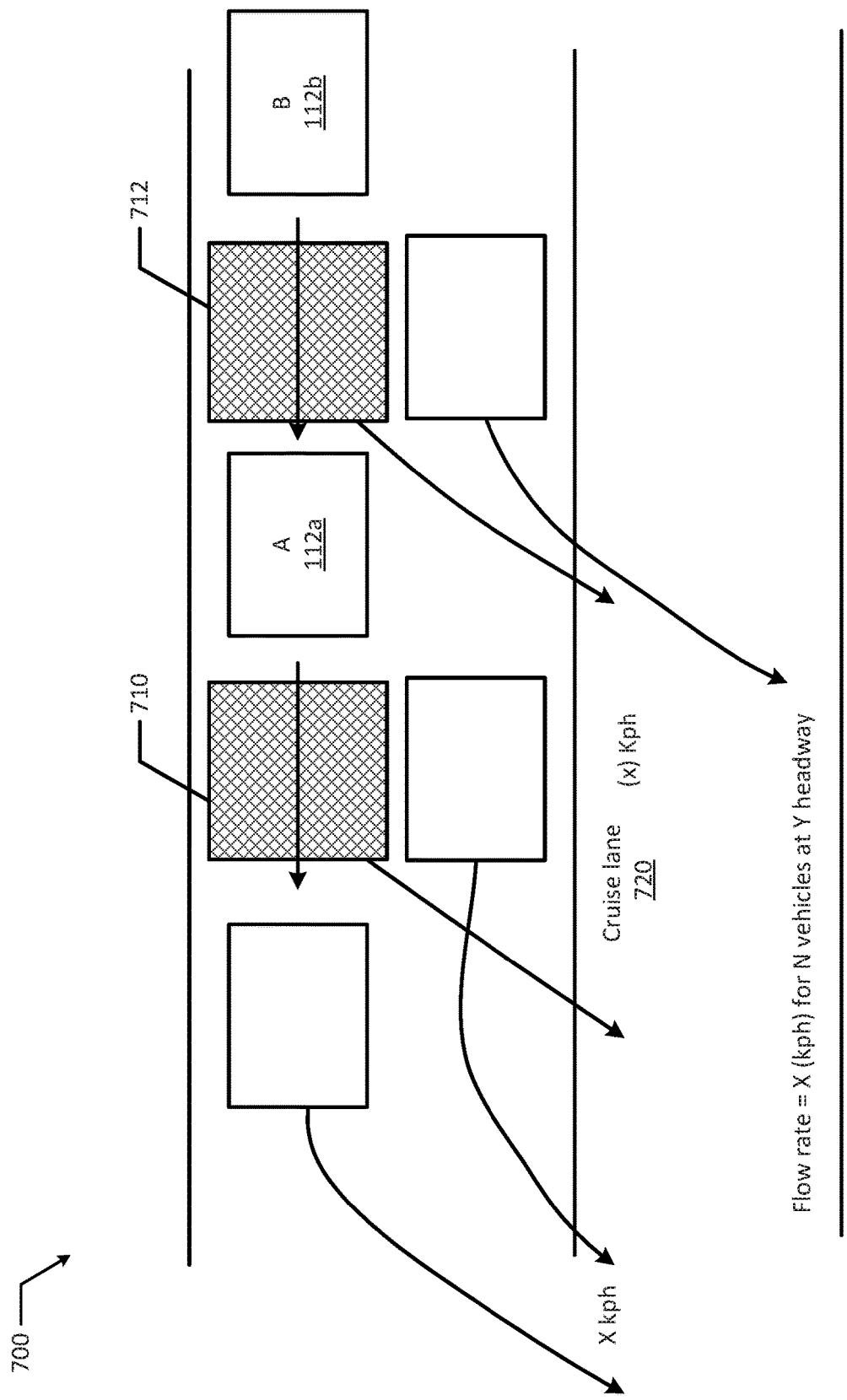
FIG. 13 illustrates a simplified single curb double stack boarding zone, according to an example embodiment of the present disclosure.
Figure 14:
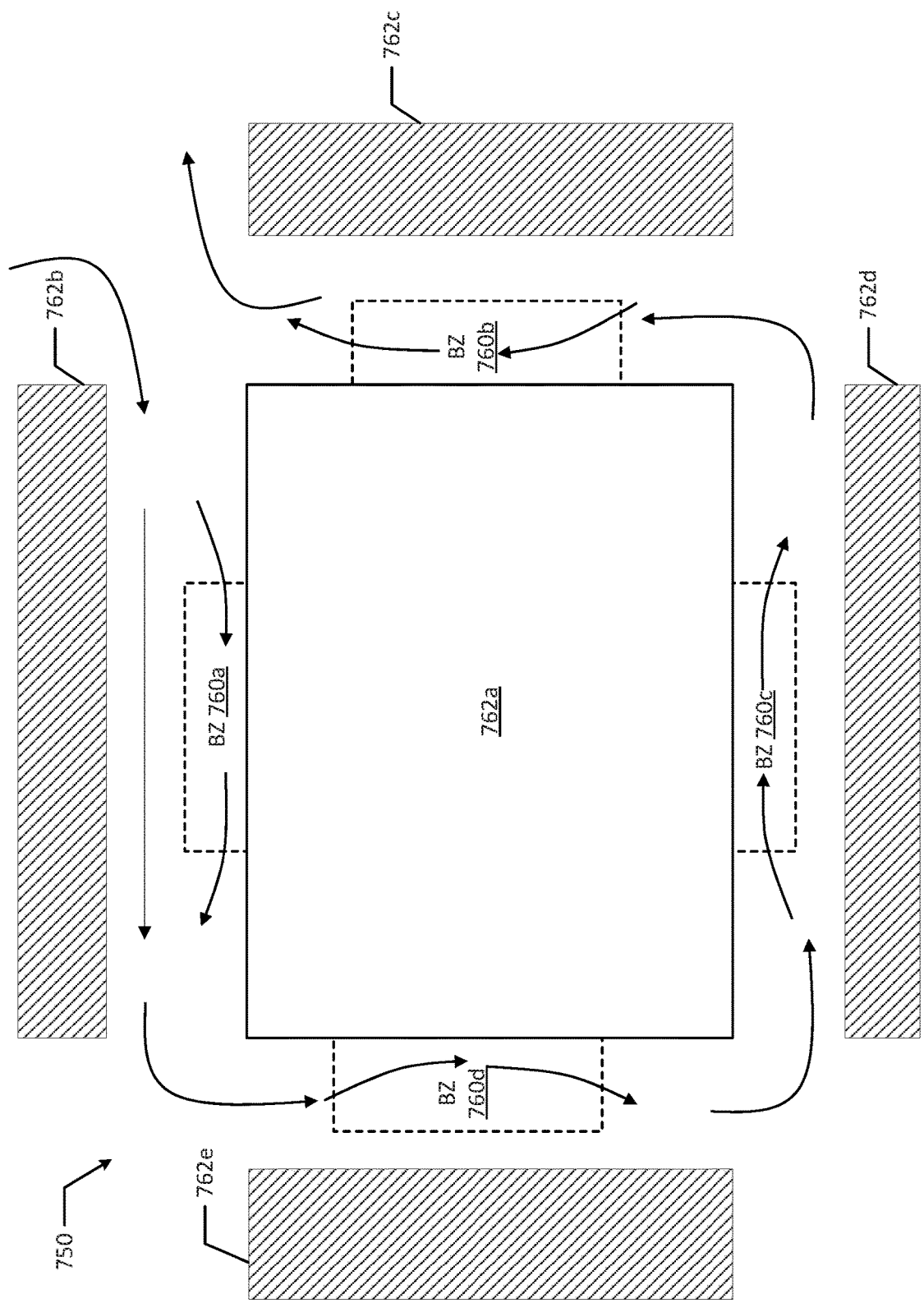
FIG. 14 illustrates an example roundabout boarding zone, according to an example embodiment of the present disclosure.

FIG. 12 illustrates an example process for handling boarding and de-boarding, according to an example embodiment of the present disclosure. FIG. 13 illustrates a simplified single curb double stack boarding zone 700, according to an example embodiment of the present disclosure. For example, at block 710, passenger load/unload is avialable for the dwell time of "vehicle A" (e.g., vehicle 112a). Additionally, at block 712, passenger load/unload is available for the dwell time of "vehicle B" (e.g., vehicle 112b). Vehicles (e.g., vehicles 112a-b) re-enter a cruise lane 720 after passengers load/unload. In the illustrated example, vehicles in the cruise lane 720 travel at (x) Kph. FIG. 14 illustrates an example roundabout boarding zone 750, according to an example embodiment of the present disclosure. For example, boarding zones 760a-d may be established around physical structures 762a-e, such as buildings, walls, etc. to create a roundabout boarding zone 750. The various arrows in FIG. 13 and FIG. 14 illustrated potential vehicle paths.

1.6.3 Example Passenger Interaction with a Boarding Zone and Vehicle

Identity management may be integrated with the transport request and boarding zone operations. The transport request identifies the expected passenger(s) for a transport request, and the boarding zone and vehicle may then use that information to optimize the passengers interaction with the system, reducing wait times and increasing passenger throughput.

For example, a user may present themselves to a vehicle at a boarding zone, and the vehicle may use a camera mounted above the door to verify the identity through face recognition, whilst communicating via short range radio, for example Bluetooth an information interchange with that users device, through for example an app on a mobile device, further validation of the user. Such an information interchange may include one or more sets of information for the personalization of the vehicle to that specific user. Such interchange of information may commence before a passenger arrives at a boarding zone, i.e. from the time and location of booking and/or during the passenger's movement towards the boarding zone.

Once in a vehicle, a passenger may be observed by one or more cameras to validate that the user appearing at the door is the one occupying a seat. In the case of multiple passengers, each identity may be verified. If the passengers are not traveling as a group, as expressed in their booking, then one or more vehicle personalization configurations may be modified or may have reduced or restricted availability.

In some embodiments, a passenger may be evaluated by one or more sensors fitted inside the vehicle to, for example, establish their weight, height, other physical attributes and/or other characteristics. Such information sets may be used for the adjustment of seating, vehicle dynamics, vehicle environmental controls, safety and security and the like.

Multiple vehicles may be provided for an associated request or reservation. For example, if a passenger has booked for a number of people, for example, six (6) passengers, three two-person vehicles may be provided for their journey. The assigned or provided vehicles, besides being grouped together physically for the journey may also be grouped together logically, such that inter vehicle ad hoc networks are instantiated, enabling each of the passengers of the vehicles to be able to communicate with each other over audio and video, including for example, the provision and tracking of location information sets, for example vehicle and passenger locations.

Vehicle control may require permission or be passenger specific. For example, if the passengers are a family with children, then the vehicle which has at least one parent may be able to control the communications capabilities of such ad hoc networks for each of these vehicles. The physical boarding and de-boarding of such linked vehicles may be synchronized by one or more area controllers, such as boarding zone management systems, so as to ensure that the set of vehicles depart and arrive and sequential boarding slots to ensure close physical proximity of the passengers using these vehicles.

1.7 Example Vehicle

One example embodiment of the present disclosure includes a system having multiple at least partially autonomous transportation vehicles configured for passenger and/or freight payloads. An example deployment may also include service vehicles, for example such as vehicles suitable to clear snow or rubbish, monitor and maintain the road surface, provide security notices to people adjacent to limited access roadway, deal with broken down vehicles, and other such auxiliary tasks.

Vehicles of the present disclosure operate independently and cooperatively to optimize the performance of the transportation system.

Each vehicle may have a rolling chassis which may comprise, a propulsion, traction and braking (including regenerative braking) system, steering mechanism(s), wheels, a passenger or freight compartment with its own subsystems (e.g., HVAC; entertainment; power supply independent of the powertrain power supply) and dedicated vehicle control systems for the operation and interaction of these systems. Dedicated vehicle control systems may be provided, for example, for propulsion, braking, battery and energy management, etc. These vehicle control systems communicate with each other and with the AVPS described herein. A vehicle is also fitted with a sensor array that includes those sensors that are part of the rolling chassis and further sensors that provide position, navigation and situational information for the AVPS. There may also be sensor sets that monitor and evaluate the cabin of a vehicle, such as cameras, microphones, weight detectors (for example in a seat and/or integrated into the axles), temperature and humidity sensors, luminance sensors and the like. These cabin sensors may communicate with an on-vehicle Human User Experience system (HUE).

Each of these systems is outlined in further detail herein.

An example vehicle, in some embodiments, may incorporate several distinct systems:

Vehicle Control systems—responsible for the movement and management of the vehicle over ground Vehicle Navigation and Positioning systems—responsible for the management of the autonomous vehicle operations and including the sensors for such management Vehicle passenger systems—responsible for the vehicle passenger comfort, entertainment, communications and the like.

AVPS—responsible for establishing and managing cooperative communications between other AVPS, area controllers, and common controller and their associated management systems, and optionally, various external management systems.

A vehicle is fitted with an AVPS, which provides the overall control functions for the cooperative operation of the vehicle. The AVPS may communicate with other vehicles AVPS(s) and one or more controllers in order to create a fabric of command and control that operates in one or more cooperative ways in order to optimize the transportation system operations. An AVPS may also integrate the vehicle control systems with the vehicle navigation and positioning systems, creating an integrated system which can, through the use of standardized API's encompass suitable rolling chassis platforms from multiple suppliers with differing performance specifications that are compatible with the overall operations of the system. An AVPS further provides the cooperative operation modules, which implement the cooperative behaviors of the AVPS.

AVPS equipped vehicles (called cooperative vehicles) may optionally be individually configured to cooperate with another cooperative vehicle, such as one or more nearby vehicles in order to improve traffic flow by using one or more of the cooperative operating techniques described herein for interacting with nearby vehicles. Software components (programs) that implement the cooperative operation techniques are built in to the AVPS. These cooperative operation components are parameterized with cooperation parameters from one or more information sets received by the vehicle. The cooperative operation programs, when executed by a processor of an AVPS, may cause the vehicle to operate cooperatively with other vehicles in accordance with the currently received configuration parameters.

Cooperative operation between vehicles entails the following steps:

1. A first AVPS identifies, from sensor inputs or information sets, one or more cooperative vehicles that are nearby. In an embodiment, nearby is defined as being within sensor range of the first cooperative vehicle. In an alternative embodiment, nearby is defined as operating under the control of the same area controller, and sharing sensor information. In still another alternative embodiment, nearby is defined as being in communication with a vehicle so that information sets may be communicated.

In some embodiments, the cooperative vehicles are identified in an information set that is sent to the one or more cooperative vehicles by a controller.

2. The AVPS establishes a secure communication link with each of the identified vehicle (either directly or relayed through an area controller). The communication link may be one-to-one or one-to-many (broadcast). The communicating cooperative vehicles then communicate their intent to operate cooperatively and exchange (send and receive) information sets that specify the cooperative aspects they will operate under.

3. The AVPS of each cooperative vehicle may integrate the cooperative parameters from the newly received information set into its operating parameters, and then may operate in the cooperative manner defined by the information set specifications.

Cooperative vehicles, while in communication with each other and/or with a control system component and are operating in a cooperative manner, are called cooperating vehicles.

A cooperative vehicle may also cooperate with one or more control system components, such as an area controller that is responsible for managing the operation of a portion of the infrastructure and the operation of vehicles on that infrastructure. The cooperative operation between a cooperative vehicle and an area controller entails the following steps:

1. The area controller identifies the cooperative vehicle, either from a sensor, from a communication from the cooperative vehicle, and/or from a communication received from another area controller.

2. The area controller establishes secure communication with the cooperative vehicle, and provides the cooperative vehicle with an information set comprising parameters for the operation of the vehicle while the vehicle is operating under the control of the area controller.

3. The cooperative vehicle reports its operating information (e.g. velocity, intents, vehicles that the vehicle is cooperating with) to the area controller on a periodic basis.

Figure 15:
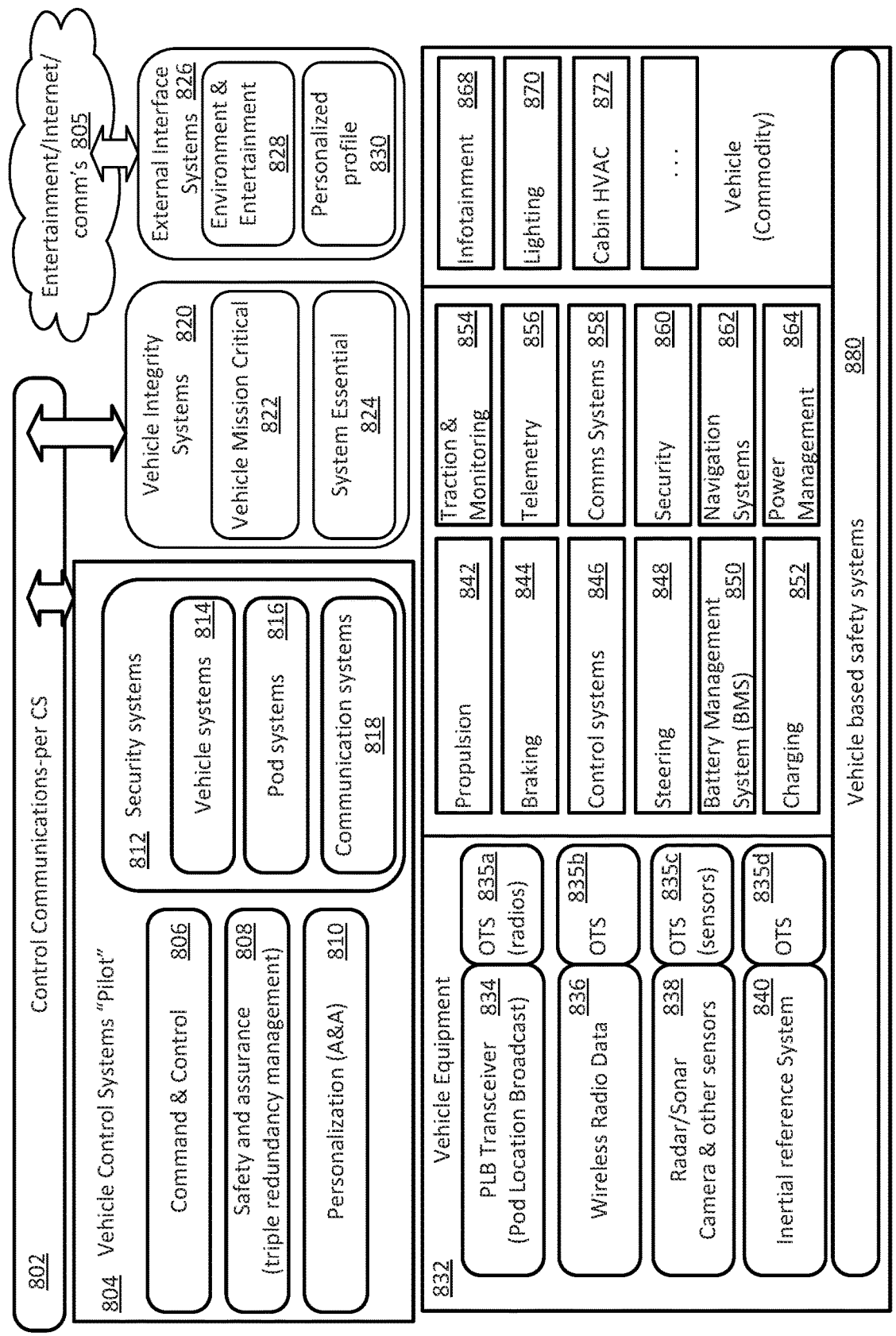
FIG. 15 illustrates an example vehicle information system architecture, according to an example embodiment of the present disclosure.

An example vehicle information system architecture is illustrated in FIG. 15, according to an example embodiment of the present disclosure. As illustrated in FIG. 15, control communications 802 may be communicated to vehicle control systems 404 and vehicle integrity systems 820. The vehicle control systems may include various modules including a command & control module 806, a safety and assurance module 808, and a personalization module 810. The vehicle control system 804 may also include security systems 812 including vehicle systems 814, pod systems 816, and communication systems 818. The vehicle integrity systems 820 may include a vehicle mission critical module 822 and a system essential module 824.

External interface systems 826 may include a personalized profile module 830 and/or an environment and entertainment module 830. The information from the modules may be communicated over the internet or other communication module 805. The vehicle information system architecture may also include vehicle equipment 832, such as a pod location broadcast (PLB) transceiver 834, a wireless radio 836, a camera and/or sensor 838 (e.g., radar, sonar, etc.), and inertial reference systems 840. The vehicle may also have operational modules including a propulsion module 842, a braking module 844, a control system modules 846, steering modules 848, a battery management system modules 850, a charging module 852, traction and monitoring module 854, a communication system module 858, a security module 860, a navigation system module 862, and a power management module 864. The vehicle may also have an infotainment module 868, a lighting module 870, and a cabin HVAC module 872. The vehicle information system architecture may include additional vehicle based safety systems 880.

Example vehicles may include one or more solar generating panels that are integrated into the vehicle, for example on the vehicle roof.

1.7.1 Vehicle Type

Individual passenger vehicles in the example system may include:

- Electro optically variable transparency windows
- Large scale screens—potentially limiting forward vision—potentially replacing forward-facing window (since the vehicle operates autonomously)
- Integrated power probe/receptacle for automatic energy transfer without human intervention—
- Occupant sensing capabilities
- Occupant communication and device integration capabilities
- Occupant specific information sets and management thereof
- Variable seat orientation Face forward/back/side
- Vehicle to infrastructure communications
- Vehicle to area controller communications
- Vehicle to vehicle communications
- Vehicle to CMS communications
- Vehicle interior sensors
- Vehicle exterior sensors
- Vehicle mechanical fail safe capabilities in support of graceful failover In addition to passengers, vehicles may be integrated into the system to carry cargo or freight. Freight systems may include:

- Pallets for freight
- Seat compatible freight management systems
- Removable seats
- Removable vehicle bodies
- Specialist freight handling systems
- Mail and other package delivery systems
- Customizable freight transport cabins

1.7.2 Vehicle Size

Example vehicles may be made in different sizes in order to optimize the vehicle to its assigned task. Reducing the size of vehicles saves construction and operational costs. The size of the vehicle may vary depending upon the payload it is designed to carry and the type of roadway segments it operates upon.

1.7.3 Passenger Vehicle Embodiments

In some embodiments, example vehicles are configured for one or two people, as the average vehicle passenger load is only one or two people. In other embodiments, example vehicles may have space for four, six, or even eight passengers.

In some embodiments, example vehicles are the regular width of regular passenger vehicles or trucks. In other embodiments, example vehicles are of reduced size, having an inside width of at least 32 inches (the width of a standard wheelchair) and a maximum outside width of approximately half of a standard lane width, which varies between nine to fifteen feet (9 feet-15 feet) in the USA, and between eight to eleven feet (8 feet-11 feet) in Europe.

Example configurations of a narrow gauge vehicle may alter the seating arrangement of passengers in these vehicles. For example, a vehicle that has seating for four passengers may place the passengers one behind the other instead of the two-across, two deep seating of standard automobiles.

1.7.4 Freight Vehicle Embodiments

1.7.4.1 Vehicle Pallets

In some embodiments vehicles, may have interchangeable passenger compartments and freight compartments. For example, a vehicle that has a two-person passenger compartment may have a two-unit freight capability, for example, where each freight unit is a standardized freight pallet or container. For example, such a freight unit may comprise a 1 m cube, which can be made of aluminum or other lightweight material and may include one or more locking features to support automated and/or authorized loading and unloading of such pallets. There may be specialized pallets for specific purposes, such as carrying water, energy, medical supplies and the like. Specialized pallets may be sized to fit 'snug' inside a passenger compartment.

1.7.4.2 Roll on Roll Off Pallets

Figure 16:
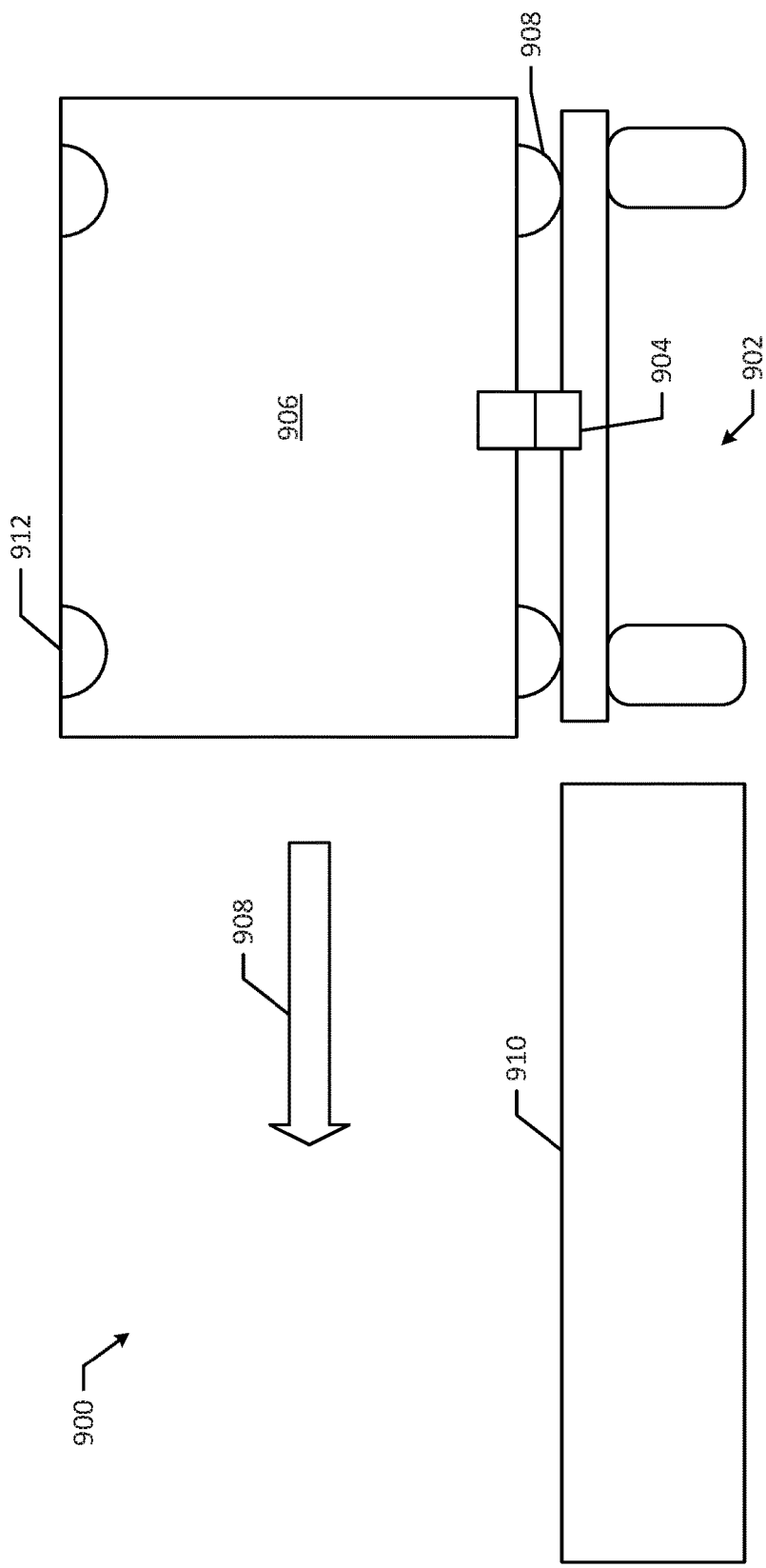
FIG. 16 illustrates an example roll-on roll-off freight container system, according to an example embodiment of the present disclosure.

In some example vehicles, a rolling chassis 902 may include locking mechanisms 904 that hold freight containers 906 in place, including for example those with inbuilt wheels (e.g., container wheels 908). Such freight containers 906 may then be released from the rolling chassis 902 by, for example, manual human intervention or with an automatic system (e.g., an electronically controlled lever or other device that releases any locking mechanisms on the rolling chassis and then initiates movement of a freight container off the chassis) in the direction 908 of the platform or container holding area 910 for unloading. This unloading and loading may be at front, rear on top of or either side of the rolling chassis. FIG. 16 illustrates an example roll-on roll-off freight container system 900 for use in an example transportation system. In an example, a vehicle freight container 906 may include wheel sockets 912 so that multiple freight containers 906 can be stacked or interlocked together.

The vehicles may then clear the loading dock in an efficient manner as each freight container is removed from the vehicles, manually or through the use of automation.

Each container may have one or more compartments, which in some embodiments require authenticated identities of one or more types (for example devices, tokens, identity recognition systems and the like), for a user, system or other autonomous system to access the contents of the freight container. Some loading areas may have locking capabilities such that only with appropriate authorization may the freight container be removed from such locking.

1.7.4.3 Freight Systems for Delivery of Mail Packages

In some embodiments, a rolling chassis 902 may have a freight container 906 and a robotic device mounted, such that for example the container 906 may have multiple compartments each of which contain packages, mail or other contents that are to be delivered to specific locations, for example a mail box, where the robotic device may select the contents of the container and place it in an appropriate receptacle, for example a mailbox. In some embodiments vehicle may act to deliver freight to specified locations with vehicle sensors providing access control for authorized access to such freight.

In some embodiments, an example vehicle may be used for baggage that is not accompanied by a passenger, where the identity of the passenger is known to the example system and the relevant security evaluations have been undertaken.

1.7.5 Vehicle Rolling Chassis Systems

Example vehicles may employ electric propulsion and associated energy supply and regeneration systems with integrated braking, integrated controllers, and operating management systems. These systems are available as "off the shelf" components with a number of suppliers providing integrated platforms. These platforms may include sensor sets for monitoring and management of these sub systems and provide communications capabilities for the integration of these platforms with the example systems. Several "off the shelf" components (e.g., OTS 835a-e) may be used in association with the vehicle equipment 832 of FIG. 15.

1.7.6 Vehicle Sensor Systems

Figure 17:
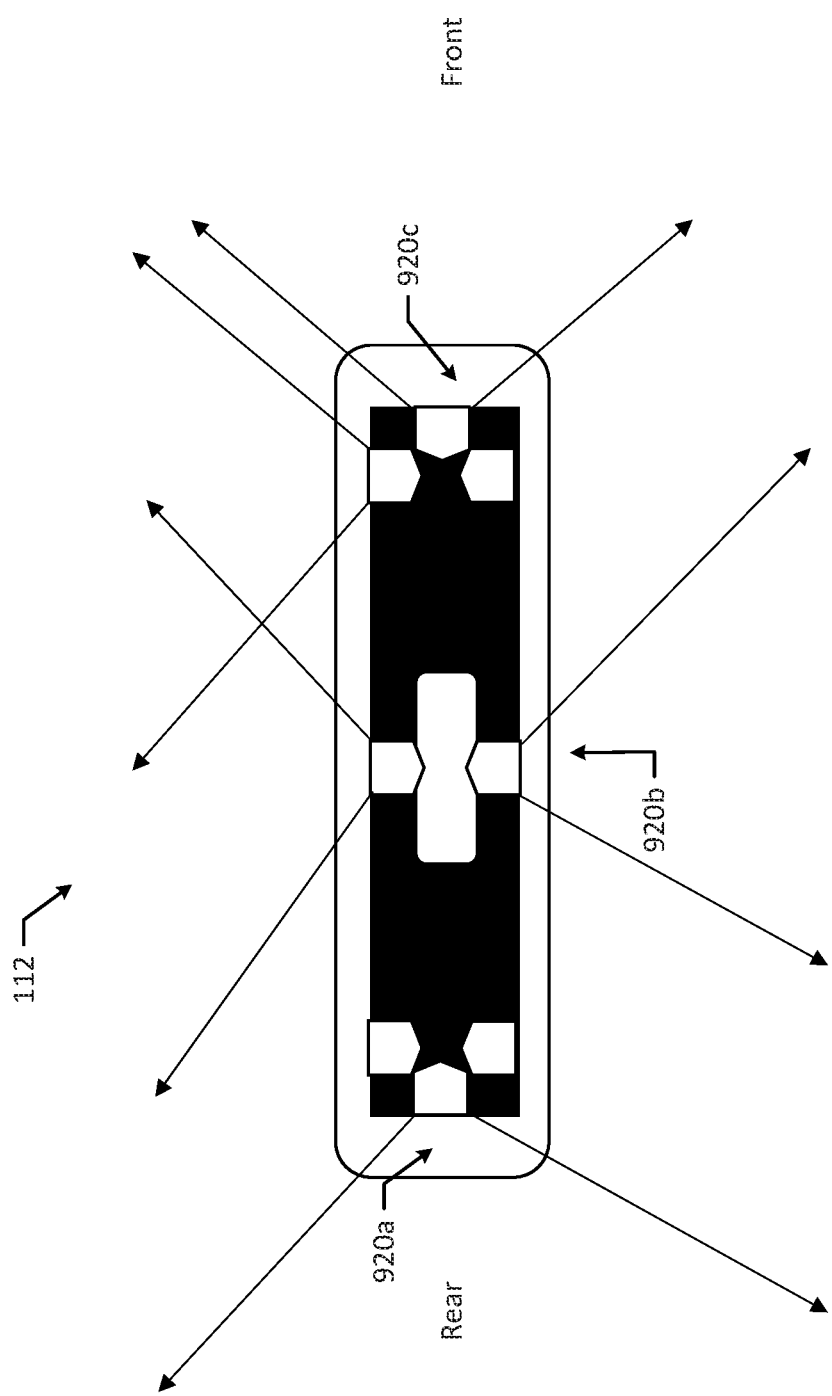
FIG. 17 illustrates potential sensor configurations on an example vehicle.

Each vehicle may have one or more sensor sets, which enable the vehicle to position itself accurately in the frame of reference of a transportation system roadway and infrastructure, such that the vehicle may operate as integral part of an urban transport system. FIG. 17 illustrates some of the potential sensor configurations on an example vehicle. For example, the sensor configurations may provide an interleaving coverage from various sensor packs 920a-c.

In some embodiments, vehicles may have one or more sensors, including for example, cameras, microphones, tactile and other physical presence sensors (for example pressure sensors in vehicle seats and/or axles capable of mass measurement), motion detectors, light sensitive sensors and or other environmental and/or biometric sensing apparatus.

In an example system, each vehicle may be fitted with a set of sensors that enable that vehicle to autonomously transit the roadway. This may include, but is not limited to cameras, microphones, radar, Lidar, ultrasound, infra-red, RF and other optical and/or electromagnetic sensors and emitters.

For example, a vehicle may have a downward-facing camera that captures pre-positioned markings, for example a grid, on the road surface that enable the vehicle, employing recognition of, for example binary states created by retro reflective paint and using an IR camera at an appropriate capture rate, and for the vehicle to make a determination as to its location on the basis of the sensor reading.

This information may be complimented by other sensors, such as radar, radio, line of sight, markings on the roadway and/or other infrastructure that, when evaluated, provide the vehicle with an exact location of each of its extremities, speed, heading and other vital geo data.

These sensors may operate independently and/or in collaboration providing multiple verifiable information sets that provide the vehicle with sufficient information so as to be able to undertake the operations intended.

Each sensor set may include sensors that are part of the vehicle rolling chassis and propulsion systems, such as for example motor, brake, energy and the like control system information sets. Such information sets may be integrated into the vehicle sensor information sets which are managed by a vehicle AVPS.

Each vehicle may include one or more navigation and positioning systems, such as reference systems, GNNS, inertial reference navigation systems, gyroscopes, radio frequency based positioning (such as for example from cell towers), vehicle to vehicle positioning (for example using vehicle sensor packs), vehicle to infrastructure positioning (for example using roadway indicators, markings (including those optimized for one or more sensors), grids and other infrastructure incorporated indicia (including encoded roadways using visible and non-visible reflective markings, physical surface artifacts (for example indentations and projections) that may be optimized for specific sensor set information set generation (which for example may be serialized so as to create unique to a specific roadway/system deployment identifiers).

As illustrated in FIG. 17, a vehicle 112 may include a rear sensor pack 920a. The rear sensor pack 920a may include a camera and/or rear-facing Lidar/radar/IR sensors. Additionally, the vehicle 112 may include an under vehicle sensor pack 920b. The under vehicle sensor pack 920b may include a microphone facing forward, a microphone facing the rear of the vehicle, a microphone facing down as well as a camera facing down. Similar to the rear sensor pack 920a, the vehicle 112 may also include a front sensor pack 920c. The front sensor pack may include a camera facing forward. The cameras may include forward and/or down facing Lidar/radar/IR. Additionally, side cameras or side sensor packs may be used for other vehicle and/or infrastructure recognition and tracking. Additionally, the side cameras or side sensor packs may be used for passenger recognition.

1.7.6.1 Sensor Sharing

The vehicle controller operates using sensor inputs, either from those sensors that are part of the vehicle, from external sensor data that is provided to the vehicle by an external source, or from a combination of the two types of sensor data.

Vehicle control decisions may be improved by receiving sensor information from external sources and using these sensor inputs into the vehicle control decisions made by vehicle controller. External sensor sources may include one or more area controllers or other vehicle control systems. Sensor data received may include the output of any remote sensors, but will typically include information received directly from:

another vehicle that includes information collected from sensors mounted on that other vehicle, from sensors directly connected to an area controller that the vehicle controller is in communication with, from a sensor data repository, or from sensors located on another vehicle that have been forwarded by an area controller.

Store and forwarded sensor data may be from other vehicles that are currently in communication with the area controller, or may be from sensor data transmitted to the area controller by a vehicle that was previously in communication with the area controller (e.g. a previously passing vehicle). External sensor data sources are typically authenticated by the vehicle controller before using that sensor data in order to prevent rogue sensor data from effecting vehicle operations, and the communications are secured using standard communications information security techniques.

Conversely, the vehicle controller may also operate to share sensor information with other vehicles, area controllers, and central management sensor data repositories. For example, all sensor information of a particular class may be forwarded to another vehicle, area controller, or to the CMS.

1.7.7 Vehicle Pilot Systems (AVPS)

In an example vehicle of the transportation system, an autonomous vehicle pilot system (AVPS) is one of the transportation system's control components integrated with the autonomous vehicle and configured so as to cooperatively manage the autonomous operations of the vehicle, thus customizing the vehicle to operate in cooperative ways with other cooperative vehicles and the transportation systems control components. Cooperative operation of autonomous vehicles within the transportation systems roadways provide significant improvements in the operation of the transportation system as a whole, whilst minimizing the control burden on the transportation systems control system components.

For example, a vehicle may be under the authority of a common control system for a city (in whole or in part), whereby that authority is delegated to one or more area controllers associated with one or more physical and/or logical locations such a vehicle operates within at one or more times.

Each of these control system components may provide a cooperating vehicle with one or more information sets, comprising one or more specification sets that determine or parameterize aspects of the operating context for such a vehicle, for example an origin and destination point for a specific passenger (or freight) may be provided to the vehicle as part of an information set at an appropriate time. The information sets may include remote sensor data for use by the vehicle in making more accurate operational decisions by extending its sensor range (and thus its situational awareness). This allows the vehicle to operate safely at higher speeds, which increases the throughput of the transportation system.

Each of these information sets may then be used by a vehicle to, in whole or in part, determine and execute operations for the successful execution of such specifications, wherein the vehicle will invoke one or more autonomous operations, such as for example, stop and pick up uniquely identified passenger at a specific location, merge into a flow of vehicles towards the destination, demerge from such a vehicle flow and come to a stop at an appropriate boarding zone for passenger disembarkation.

Some vehicle implementations consist of one or more vehicle controllers that in aggregate comprise the AVPS. Alternatively, the features of the AVPS may be integrated into an existing vehicle controller and operate as part of that controller. The AVPS in turn integrates with the vehicle controllers that implement the commands that are generated by the AVPS and communicated to such vehicle controllers, for example those for traction, braking, steering and the like.

For example, an AVPS may include, but is not limited to:
Command and control
Safety and assurance
Security systems
Vehicle integrity systems
Communications In some embodiments, an AVPS can operate in conjunction with a human user system (HUS) which provides the relevant personalization of the vehicle systems that may be configured for the human experience, for example integration of their personal information systems with the vehicle information and entertainment systems.

Alternatively, an AVPS may be completely isolated from a HUS, so as to ensure that there is no mechanism for an external interloper to gain any access to the AVPS, should they be able to compromise the HUS.

1.7.7.1 Vehicle Controller Improvements

The vehicle controller comprises additional vehicle control software that permits operation of the vehicle in multiple-state operation mode and/or a cooperative autonomous operation mode. AVPS functions may integrated into one or more individual vehicle control modules, or may be implemented as a stand-alone controller within the vehicle.

Multiple-state operations mode is an operating mode of the vehicle controller that permits it to operate part of time in an autonomous manner consistent with SAE level four or level five autonomy, part of the time in cooperative autonomous operating mode (described below), and at least part of the time in externally controlled mode. The vehicle controller may switch between these operating states as situationally required and/or as instructed by an area controller. Specifically, the vehicle controller may change operating states upon express instruction from an area controller, may change states based upon the portion of the roadway it is operating upon, or based upon one or more sensor-observed operating conditions associated with the roadway.

Cooperative autonomous operation mode is an operating mode of the vehicle controller subsystems that permit the vehicle controller to take primary control of the vehicle and operate the vehicle in a manner consistent with SAE level four or level five autonomy, whilst communicating with area controllers for additional instructions (e.g. terminal navigation instructions optimized for the specific area), to bi-directionally communicate sensor information with area controllers, and to use received sensor information in order to extend the vehicles situational awareness and improve its operational control of the vehicle. Cooperative autonomous operation mode includes the following operational approaches.

Self- and group-optimizing behaviors
Goal seeking behaviors
Cooperative navigation mode
Shoal forming operations mode
Direct and synthetic fiducial recognition
Sensor sharing
Enhanced positioning and navigating
Vehicle integrity monitoring and reporting

1.7.7.2 Goal Seeking Behaviors

The optimized vehicle controller may cause the vehicle to operate in accordance with one or more "goals", which are independent of the vehicle assignments associated with reservations. These goals may be stored within the vehicle controller, may be received as part of a downloaded passenger profile, or may be received as part of one or more operational requests from an area controller or the CMS. Goals may be provided in such a manner that they are associated with rewards for attaining the goals.

One example type of goals and reward is the reduction in billing applied to a reservation. For example, a reward may be applied when a vehicle operates at a specified level of cooperation, such as adjusting velocity to facilitate a merge by another vehicle, or by adjusting velocity so that additional energy is consumed to allow the average velocity on one or more roadway segments to be increased so as to improve capacity.

The vehicle controller may use these goals in its operation and may arbitrate between goals in order to attempt to fulfill as many goals as possible.

1.7.7.3 Cooperative Navigation and Behaviors

A vehicle controller, when operating in cooperative mode, may cause the vehicle systems to communicate with one or more other vehicle controllers, one or more area controllers, the CMS, and/or the respective management systems in order to communicate information about the current state, intents and operating environment of the cooperative vehicle. The current state information communicated may include the current controller state and status.

In addition to sharing sensed sensor information (as described elsewhere), an vehicle controller may cause the vehicle systems to communicate the current vehicle location or other aspects of vehicle operation such as velocity, current operating mode, current operating profile, and similar information available to the vehicle controller. This communication may occur in response to a timer, to a communication received, a request from another controller, upon the change in state or status of the vehicle or one of its subsystems, upon identification of a particular environmental objects, identification of a roadway or road hazard, etc.

As part of the cooperative navigation operation, the vehicle controller may accept navigation and control suggestions from other controllers, such as other vehicle controllers, area controllers, the CMS, and/or the respective management systems in order to request vehicle operational changes such as a velocity increase or decrease, operating restrictions such velocity restrictions, and notifications including alerts and warnings. In addition, the vehicle controller may accept requests from other vehicle controllers to optimize their common operations, such as by shoaling.

1.7.7.4 Shoal Forming

The vehicle controller may operate in a manner to identify one or more vehicles that it travelling together with, either by direct vehicle to vehicle communication, or by recognizing the vehicle using one or more sensors. If the recognized vehicle is a cooperative vehicle, the optimized vehicle controller may communicate with the vehicle and form an ad-hoc vehicle group or a "shoal" as described elsewhere. Shoaling and ad-hoc vehicle groups have the effect of optimizing the operation of the transportation system by reducing the interstitial gap between vehicles and allowing more effective controls of external infrastructure such as optimizing stop light timing for a group of vehicles when operating outside of controlled roadways, which in turn optimizes the transportation system as a whole.

1.7.8 Vehicle Positioning and Navigation

Each vehicle may include sets of sensors, including radar, LIDAR, IR cameras, microphones, ultrasound and the like. The set of sensors may sense the environment of the vehicle at, for example, a 10 millisecond time resolution. One of the operations undertaken by these sensors, may include the scanning of the roadway and other infrastructure to ascertain and confirm the exact location of the vehicle within the system. The degree of accuracy of such determinations may, in some embodiments, be in the range of plus or minus 1 centimeter.

For example, a roadway and/or other infrastructure element may have a marking in the form of a cross which when captured by an appropriate sensor can enable a vehicle to determine the relationship between the cross, which may be aligned with the roadway centerline, and the vehicle and if required make any adjustments to the vehicles trajectory.

Figure 18:
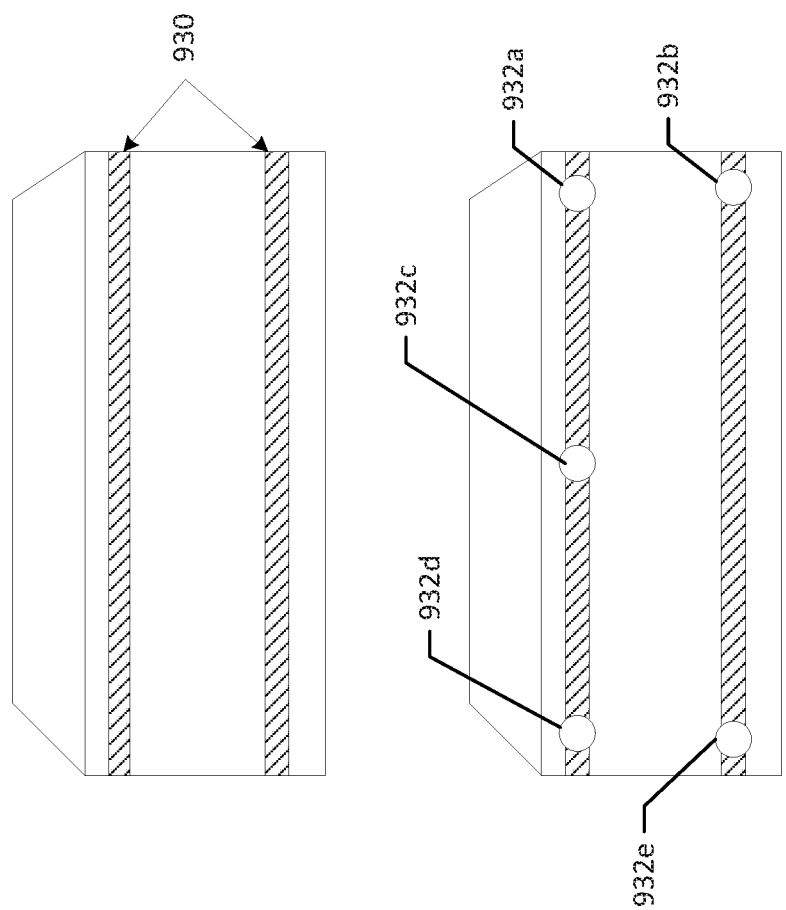
FIG. 18 illustrates vehicle marking/indicia and sensors that may be incorporated into vehicles.

FIG. 18 illustrates vehicle marking/indicia and sensors that may be incorporated into vehicles. The roadway may be marked so as to represent vehicle dimensions. The markings may include a layer that is raised or indented. The vehicle may include an emitted, e.g., an LED emitter (emitting different colors/wavelengths), and receivers, e.g., photo diode receivers such as avalanche receivers. It will be appreciated that the roadway itself may have further sensors and emitters to assist in identifying the vehicles and allowing them to determine their positions. Marking layers may include positional markings 930 that are passive, reflective, or reactive. They may be responsive to active emitters, or detectable by passive sensors. Sensors 932a-e may include cameras, IR, RF, ultrasound, and may include both emitters and receivers. When vehicles come into proximity with each other, sensors may identify variance in velocity, direction, angle, etc.

1.7.8.1 Fiducial Recognition

The vehicle controller may operate in a manner by which it uses it sensor inputs to directly recognize fiducials, and then make operating decisions based in part upon the recognition of the fiducial. For example, the vehicle controller (or a subsystem of the vehicle controller) may use an RF sensor to recognize a roadway embedded fiducial (or area controller) that it is approaching or passing, and then precisely determine the vehicles location using that fiducial and a database of fiducials and their location. In an alternative example, the vehicle controller may identify the fiducial directly from the image it receives from a sensor.

The vehicle controller may operate in a manner in which synthesizes a fiducial from one or more sensor inputs by identifying sensed data attributes from sensor information collected from one or more sensors, and using those attributes to make a determination that a fiducial is present. For example, the vehicle controller may receive a sensed image (either from onboard sensors or from remote sensors relayed by an area controller), and then process the sensed image using an image object classification program in order to detect objects and object attributes, and then look up those determined objects and object attributes in a database of fiducial attributes in order to make a determination that an object and attributes identified in the image is a specific fiducial.

Without regard to how a fiducial is detected and identified and its location is determined, the vehicle controller then uses the information about the fiducial and the vehicles location as part of AVPS processing (described later).

Cooperative Navigation and Behaviors

A vehicle controller, when operating in cooperative mode, may cause the vehicle systems to communicate with one or more other vehicle controllers, one or more area controllers, the CMS, and/or the respective management systems in order to communicate information about the current state, intents and operating environment of the cooperative vehicle. The current state information communicated may include the current controller state and status.

In addition to sharing sensed sensor information (as described elsewhere), an optimized controller may cause the vehicle systems to communicate the current vehicle location or other aspects of vehicle operation such as velocity, current operating mode, current operating profile, and similar information available to the optimized vehicle controller. This communication may occur in response to a timer, to a communication received, a request from another controller, upon the change in state or status of the vehicle or one of its subsystems, upon identification of a particular environmental objects, identification of a roadway or road hazard, etc.

As part of the cooperative navigation operation, the optimized controller may accept navigation and control suggestions from other controllers, such as other vehicle controllers, area controllers, the CMS, and/or the respective management systems in order to request vehicle operational changes such as a velocity increase or decrease, operating restrictions such velocity restrictions, and notifications including alerts and warnings. In addition, the optimized vehicle controller may accept requests from other vehicle controllers to optimize their common operations, such as by shoaling.

1.7.9 Vehicle Information Systems

Each vehicle has one or more communications capability enabling, for example vehicles to share sets of sensor data and other pertinent information sets in support of those vehicles operations. For example, a vehicle may pass information to other vehicles (for example a vehicle that is at the leading edge of a set of following vehicles) to undertake one or more maneuvers, for example to merge/demerge from a flow of vehicles, for example those on a trunk roadway segment. For example, a vehicle may advise nearby or surrounding vehicles of a fault or bug in its own control system. For example, a vehicle may detect a fault with its own control systems that will lead to a deterioration of that vehicles operations, and the vehicle may advise those vehicles that are nearest to it, which may propagate such a message to other vehicles in turn, providing a minimal latency for those other vehicles to react. The fault or bug information set may be passed to one or more components of the control systems, including area controllers and a common controller and its CMS. The controllers (e.g., area controllers and/or common controller and its CMS) may in turn intervene into vehicle communications to manage both the flow of information to other vehicles and to provide further information sets to those vehicles that may be impacted by the deterioration of the initial vehicles operating conditions. The intervention may include, for example, configuration of one or more logical blocks (for example varying speed of a cruise profile for a set of logical blocks), vehicle operating parameters (for example increasing headway between vehicles), vehicle routing and navigation (for example providing navigation information suitable for avoiding the deteriorated vehicle) and the like.

Vehicles may also make information sets available from one or more sensors on the vehicle to other vehicles. For example, a forward-facing camera image set may be made available to other vehicles and/or area controllers. Additionally, other vehicles operating in a cooperative manner may receive and evaluate the image information set, with other information included information set, for example location, relative distance, velocity, acceleration and the like, for purposes of managing operations of the receiving vehicle(s). The information sets also may be sent to one or more control system components, such as an area controller, common controller and/or their corresponding management systems, where one or more algorithms may be employed to analyze such images. For example, multiple cameras, radars or other sensors may provide an information set that, when aggregated and analyzed, provides a 3D rendering of the space being sensed. The information sets may be used to create further detailed mappings, evaluate one or more objects in the field of sensing, provide further input for other processing (for example machine learning algorithms for further system optimization, identification and/or classification of one or more feature sets for deep learning and the like) and the like.

1.7.10 Vehicle Integrity Monitoring

The optimized vehicle controller may include processing routines that are capable of verifying the integrity and functioning of various subsystems of the vehicle. In addition to the standard code signing, and signature verification on controller program loading techniques that are well understood, the optimized vehicle controller may include routines that may further test the vehicle sensors, mechanical components, and then report upon the results of these tests. These routines may be used as part of regular vehicle self checks, and at particular locations within the operating system as described above (e.g. when transitioning between surface streets and controlled roadways as described for an ingress segment). While the number and type of self-tests may vary by controller, the following classes of tests are envisioned:

Testing sensors and sensor arrays by providing well-known (and easily recognized) objects within the sensing field of one or more sensors and determining if the sensor (or sensor array) detects and properly identifies that object. Example sample objects presented for sensing may include objects that are known fiducials, common objects in various sensed orientations (such as people, vehicles, virtual roadway segment markings, etc.), and objects that present to the sensors in order to detect the limits and range of the sensor system (such as a gray scale with minimum perceptible changes in color, designed to test if the sensor and recognizer are operating at a required or desired level of effectiveness)

.

Testing mechanical systems by providing external stimuli and determining if the external stimuli is detected and whether the vehicle systems operate properly in the presence of these stimuli. External stimuli may include changing aspects of the vehicle environment (such as temperature or humidity), friction coefficient, whether the suspension is operating properly by operating the vehicle over a known roadway segment with particular features such as bumps and determining whether the vehicle systems register and respond to the systems appropriately. Similarly, in some contexts (such as garage), operational limit (such as acceleration and power draw under acceleration) and braking tests may be conducted and reported upon.

Testing communication systems by causing the vehicle communications systems to connect to one or more area controllers and/or CMS controllers, and by testing RF reception using differing transmitters to emit transmissions of differing strengths and from differing orientations with respect to the vehicle RF antennas.

Testing of redundant systems, to ensure automatic switchover and comparing of results of redundant operation. For example, the testing regime may cause two redundant processors to execute a routine on a set of known inputs and compare the outputs and timing to determine if both processors are functioning correctly.

As self tests are performed, the optimized vehicle controller may communicate the test and test results to an area controller, or to a repository of a CMS. In some embodiments, one of the area controllers or a CMS may request a vehicle execute one or more self tests selected from the set of available tests.

1.7.11 Individual Vehicle Control System

In an example system, an individual vehicle may include multiple subsystems providing an autonomous vehicle platform, for example:

Vehicle chassis, drive, steering and associated management systems
Battery and other energy management systems
Sensors and autonomous operations systems
Communications and infrastructure integration systems
Cabin and human environmental systems
Human contextual information systems
Safety and redundancy management and operations The integration of these vehicle sub systems, such as cabin features, cameras and microphones, drive and vehicle control systems, windows and display systems and/or the like creates several unique aspects for the human experience using the example system. For example, these features may be coordinated in combination when a set of vehicles is being used to fulfill a request for a set of passengers, such as, for example a family, co-workers, school participants, and the like.

The integration of information sets from vehicles at the level of sub systems of a vehicle may provide closer integrated operating conditions, supporting for example inter vehicle communications, (for passengers, vehicle systems (and/or sub-systems) and roadway infrastructure elements). For example, vehicle sensor information sets may communicate current, anticipated and/or previous operating conditions to other control system components (e.g. other vehicles, area controllers, and common controllers, and their respective management systems) in any arrangement. For example, a first vehicle may receive and/or transmit an information set comprising vehicle specific information, regarding, for example, velocity, trajectory, position, intents/ operating plans, energy levels, sensor outputs and the like, to one or more other vehicles. In addition, the first vehicle may share information sets it has previously received. For example, if a set of vehicles with similar destinations are traveling in proximity to each other, these vehicles may share one or more information sets, for example, if an area controller specifies that such a set vary their velocity.

Vehicles may also incorporate plug and play personalization and customizations, so that passengers may have access to materials, for example their entertainment, files, personal information access, communications and the like, that are specific to them. This may include one or more secure capabilities that ensure that all customer specific information is only available to that customer, and that the vehicle and/or other supporting systems do not retain any information sets, other than, for example, appropriate meta data for billing and/or other administrative tasks. Each customer may have an application and one or more devices that provide sufficient identity information for effective authentication and/or authorization.

1.7.12 Vehicle Operating States

Vehicles may operate as a state machine and use the current vehicle state to help control the operation of the vehicle. In some embodiments, a vehicle state may be associated with certain vehicle profiles, which are described herein. For example, a vehicle that has a destination of a specific Boarding Zone, may undertake to execute control sequences from profiles representing a set of vehicle states (vstates) associated with boarding zone operation.

vstate01: vehicle is traveling at a range of high speeds on the main roadway (or set of segments), using one or more control systems, primarily the AVPS, to position the vehicle in continuous flow of vehicles. For example, an AVPS may use feedback control to maintain the appropriate distance to the next vehicle ahead. This may be the Vehicle Cruise Profile ("VCP"), whereby although the vehicle may vary speed, the AVPS is maintaining velocity within specified parameters of VCP. In this example Vtarget=50 kph, though this may have a variance, Vtarget_V=20 kph, where the target velocity may vary by plus or minus 20% (40 kph to 60 kph) to accommodate vehicles maneuvers.

vstate02: vehicle is traveling with fixed acceleration on the main roadway, reducing its speed so that it enters a loading zone within a very tight tolerance of a target velocity Vtarget (e.g., Vtarget=25 kph). In some embodiments, this may be a Vehicle Traverse Profile (VTP) with parameters such as Vtarget=25 kph.

vstate03: vehicle is changing lanes at speed Vtarget, for example undertaking Vehicle Merge/Demerge Profile ("VMP").

vstate04: vehicle moves forward at speed Vtarget, until it encounters another vehicle, arrives at the end of the transition zone and/or is instructed to vary speed, for example by a BMS.

vstate05: vehicle moves forward at speed Vtarget until it either encounters another vehicle, enters the allocated parking spot or is otherwise instructed by BMS.

vstate06: vehicle is at rest unloading passengers.

vstate07: vehicle is at rest loading passengers (e.g., the vehicle is operating VEP).

vstate08: vehicle is at rest waiting to depart (e.g., the vehicle is operating VEP).

vstate09: vehicle is backing up, out of its parking spot (e.g., the vehicle is completing
VEP operations).

vstate10: vehicle is moving forward until it encounters another vehicle, arrives at the end of the transition zone and/or is instructed to vary speed, for example by a BMS (e.g., the vehicle is operating VBP).

vstate11: vehicle has identified and/or been informed of a virtual vehicle (i.e., open spot) in a continuous main flow, and is accelerating to Vtarget in order to match the speed and position of this spot, operating VMP.

vstate12: vehicle is changing lanes at speed Vtarget, into its open spot in main flow, operating VTP.

A virtual vehicle may be used to identify and manage gaps between actual vehicles in our system. For instance, a virtual vehicle may be inserted between two real vehicles, which may then adjust their velocities so as to accommodate its presence. A real vehicle executing a merge maneuver may establish a virtual vehicle at its target position in its new lane. A real vehicle exiting a loading zone does so into the gap maintained by a virtual vehicle (see vstate11 above).

1.8 Safety Systems

In some embodiments, the vehicle traction and braking systems are designed such that the vehicle wheels will still rotate during a traction or braking failure. In this manner, a vehicle can "free wheel" to a stop on a flat surface in line with residual friction of the vehicle. In some embodiments, this may involve a spike/cantilever/metal or other material and and/or the like emerging from the bottom of the vehicle that provides such friction with the roadway. Such a retarding device may employ a one way profile, such that it can move in the direction of travel but cannot move ion the opposite direction, for example if a vehicle is on an incline which would take it backwards. In this manner, the vehicle may slow to a stop and then be retarded from any rearward movement.

This graceful failover approach is embodied throughout embodiments of the system, such that each operative subsystem is shown to have a graceful failover mode, and in extremis the vehicle will adopt this strategy, even if all the control systems and other safety features are non-operational. This includes the use of triple redundant power supplies for example, one high voltage/high current for main traction, one low voltage (e.g. 12 v/24 v/48 v) to supply the control systems and the like and a further low voltage system as a back to the first low voltage system and/or to power the ancillary systems.

Additionally, appropriate vehicle control systems may provide information sets to other vehicles, area controllers, common controller and/or any other relevant systems if the traction and/or braking systems fail. Additionally, providing the information set may include providing any passengers (including any other passenger designated parties) with information sets that are appropriate for the circumstances, such as for example safety information, rescue information and the like.

Steering systems are designed, in some embodiments to have failure states that also include graceful failover, such that if a steering system malfunctions the vehicle is able to reach a state of rest in a safe, efficient and effective manner. In the example of a vehicle traveling on a roadway that is straight, this involves the steering having a "straight ahead" mode, which may be actuated by one or more mechanical, electromechanical, hydraulic, pressured air or other mechanisms. In some embodiments, a steering system retarding device may prevent the vehicle to maneuver into vehicles travelling in the opposing direction including in curves, for example by a device directing a steering mechanism that has failed in the direction away from the side of opposing traffic.

1.9 Vehicle Transit

Example vehicles may operate so as to arrange themselves and/or be arranged into groupings that optimize the transit of the vehicle (or sets thereof) under particular operating circumstances. In the example system, autonomous vehicles operate on a separated vehicle pathway, and as the deployment of such vehicles is based on pre scheduled journeys, each vehicle may operate in a highly optimized manner, both individually for the journey that is currently being undertaken and socially as part of that set of vehicles that are collectively providing the overall capacity of the system at that time.

An example system deployment may have an overall capacity limit which is determined by the vehicle roadway, the number of vehicles operating and the various operating profiles of those vehicles, and the capacity of the boarding zones that start and end each journey. This capacity limit can be represented as a systemic stable state, to which each of the operating control systems may collaborate in order to optimize the overall system and the operations of vehicles within that system.

1.9.1 Vehicle Aggregations (Shoaling)

Cooperative Vehicles may create aggregations of vehicles, which may be ad hoc, designated and/or pre-scheduled, such that a set of vehicles may combine in a logical arrangement, that may include physical aggregation of such vehicles on a roadway, e.g., to form "shoals" of vehicles. The arrangement of vehicles permits for various control optimizations that improve the overall operation of the system, for example, a shoal of vehicles may be routed (or rerouted) together as a group. Similarly, a shoal may be configured to present a number of vehicles at a boarding zone that optimizes the throughput of a boarding zone or other capacity limited resource of the roadway without causing undue delays to vehicles that are not part of the shoal.

Optionally, a subset of the interconnected roadways may have sufficient width to allow multiple vehicles to travel in parallel in the same direction, where the set of vehicles configured to travel in parallel at approximately the same approximate velocity on the subset of the interconnected roadway.

The vehicles traveling at the same time along a common sub-route of their journey may recognize that they are travelling together and force an ad-hoc shoal in order to optimize their use of the roadway. be configured to travel in a shoal, which is a vehicle grouping characterized as having reduced space separations between the vehicles in order to improve the capacity and throughput of the sub-route.

In some embodiments, vehicles may attempt to arrange themselves into arrangements based upon a common endpoint or destination, where each vehicle may create a temporal, logical and/or physical relationship with one or more other vehicle(s) travelling, for example, to the same or similar destination or intermediate destination, traveling on the same physical roadway, that have a common passenger set (for example a large family, passengers traveling to/from a sports event and the like) and other contextual arrangements that support optimization of such a set of vehicles. For example, a multi-lane roadway may be used by a set of vehicles such that there is a "passing" lane where vehicles aggregate and travel in groups to destinations where the group has scheduling or other right of way. In other embodiments, for example the aggregation may involve the vehicles physically and/or logically connecting to each other, for example in a serial or parallel arrangement. In this manner each vehicle may arrange to travel with other vehicles to a destination in an optimized manner.

Vehicles may "shoal" together such that they maintain a set of relationships with other vehicles that share sets of attributes in common. Vehicle shoals may be geographical and/or logical. For example, a shoal may comprise a set of cooperative vehicles transiting from one or more origin points to a common destination point.

For example, a geographical shoal may comprise vehicles that are in close physical proximity with a common destination may "shoal" and in some cases may move as a group within a flow of other vehicles. For example, such a shoal may move from a cruise profile to a demerge profile whilst traversing across the example roadway to an appropriate merge egress position. The shoal may be dynamic in that a vehicle may enter a shoal for a period, representing only part of the journey for that vehicle.

Regardless of physical proximity, vehicles not in the same location may "shoal" at a logical level, i.e. to regulate the flow of vehicles not yet in the same physical space, but at some future stage of their journey having some relationship and/or dependency. For example, vehicles may be targeted at or aiming for the same boarding zones and thus competing for a specific limited boarding capacity. All vehicles in this logical shoal may regulate their speeds to arrive at the boarding zone in a sequence that avoids any congestion. In another example, vehicles may form a logical shoal to arrive at a designate merge location at the right point in time, and exchange information to facilitate this synchronous arrival. Logical shoals of vehicles employ one or more communications with each other and/or one or more control system components to achieve a common objective.

Within a shoal, each vehicle may communicate directly or indirectly with the other vehicles in the shoal, information sets that support each vehicles ability to cooperate with other vehicles in a safe, reliable and efficient manner. For example, each vehicle may maintain a certain distance from the other vehicles, such as headway, lateral distance, they may match velocity and/or acceleration/deceleration, braking or other vehicle dynamics such as steering. In a logical shoal, where vehicles are not in close proximity, the vehicles may coordinate their transit to achieve some other objective, such as reducing congestion at a particular shared destination by spacing out arrivals, or by arriving together so as to assemble a group of passengers without undue waiting.

For example, in some embodiments, an AVPS may include a "shoal" mode whereby the vehicles at the edge of a geographic shoal provide, through their incorporated sensor arrays, information sets to those other vehicles in the shoal enabling the shoal to operate in a consistent and cohesive manner. Such operations may continue after such a shoal has demerged from or has yet to merge into a trunk roadway. For example, a set of vehicles may be travelling to a common destination, such as a sporting event, and information may be communicated such that each vehicle will seek to position itself in proximity of another vehicle with that common destination, matching velocity and other vehicle dynamics in the process, and sharing appropriate sensor information sets so as to enable the group of vehicles to most effectively and safely complete their journey.

When operating in "shoal" mode, an AVPS identifies one or more cooperative vehicles that meeting its shoaling criteria. The AVPS then establishes a secure communication with those vehicles and exchanges information sets regarding shoal operation. The exchange of information may be one time or ongoing. One or more of the vehicles may then alter its operation in order to effect the shoal behaviors. For example, two vehicles may communicate and start to shoal while sharing sensor and operational information, and a second cooperative vehicle may slightly accelerate in order to reduce the distance between the two cooperating vehicles to the minimum distance specified in the information set. In this way, the cooperating vehicles use less space on the roadway segment, improving the overall operation of the system by increasing the number of vehicles that can transit a roadway segment in a unit of time. The minimum distance permitted is determined in part from the communications lag between the two cooperating vehicles, in part from the amount of time it takes an AVPS to process sensor data and take an action to control a vehicle, and part from the velocity of the shoaling vehicles. In an embodiment, the inter-vehicle gap in the goal thus calculated on the fly by an AVPS based upon the above parameters and the velocities of the two vehicles. Depending upon the amount of information being shared, the communication link speed, and the processing power of the AVPS, the inter-vehicle gap may be reduced to less than 500 milliseconds, less than 1000 millisecond, or less than 1500 milliseconds. This reduction in inter-vehicle gap size significantly improves the throughput of the roadway segment. Additional cooperative vehicles may join a shoal by repeating the above process.

1.9.2 Vehicle Streams and Corridors

In some embodiments, a vehicle corridor may include a portion of a vehicle right of way having a width that is sufficient to support multiple vehicles, in multiple configurations, such as sequential, parallel, interlaced, and the like. Such vehicles need not be constrained to a specific designated lanes of roadways, e.g., as would be done by marking on the right of way, for example using passive and/or active indicators or though logical designation and demarcation. Areas without such designations are known as free-flow spaces. In some embodiments, free-flow spaces may include directional flow arrangements on either side of the traffic space, as well as interleaved crossings. In some embodiments, such designations, such as embark/disembark, merge/demerge and cruise may be dynamically assigned to a set of logical vehicle blocks and/or a set of geo blocks. For example, an area controller may allocate a specific set of geo blocks for embark/disembark and a set of logical blocks for a "swarm" of vehicles that will use such embark/disembark blocks. Once the embarkation/disembarkation has been completed, these blocks may then be designated as merge/demerge as the vehicle "swarm" then enters the vehicle flow.

For example, a vehicle stream, may comprise a set of quantized types, with specific block profiles as described herein, which may be used for example:

Ingress (passenger/freight embarkation) and egress (passenger/freight disembarkation), which in aggregate form the boarding zone. This may include specific zones, for zones for embarking and disembarking passengers and/or zones for loading and unloading freight and pallets.

Merge/demerge for vehicles to move from or to a cruise lane, for example when moving from a boarding zone to a cruise lane.

Cruise for vehicles that are traveling at the maximum velocity for that roadway, for example a typical trunk route may use 50 Kph. (or higher)

Where each of these types has a set of operating configurations, for example those supplied by an area controller as part of an information set, such configurations comprising, for example operating specifications, such as vehicle speed, headway and the like, that may be dynamically varied.

1.9.3 Merging and Demerging

In some embodiments, each vehicle may include one or more time references, which may be used for synchronization of vehicle systems and collaboration with system controllers, and synchronization with one or more vehicles. For example, a vehicle may be travelling at a specific velocity, and a time references, for example timers, clocks etc., may be used to determine the velocity of other vehicles with which such vehicle is merging. In this manner, the synchronization may include a vehicle intending to merge which is traveling at a velocity other than that of the group of vehicles with which it is to merge (e.g. vehicle A). The merging vehicle may operate at least one clock which is used to synchronize the relative time and relative velocity of this vehicle and the stream of vehicles with which it is intending to merge.

In this example, the vehicles comprising the vehicle stream with which Vehicle A is intending to merge, may also be aware, through direct and/or indirect communications with vehicle A (for example through vehicle to vehicle communications and/or through an appropriate Area Controller), the relative synchronization reference time of such a vehicle (vehicle A). In this manner, such stream of vehicles may make appropriate adjustments to their own relative distance between vehicles (from the rear(tail) of a first vehicle to the front(head) of the immediately following vehicle), so as to create a gap or logical block that is available for such vehicle (Vehicle A) to successfully merge with such a vehicle stream, which may include both vehicles being synchronized by one or more clocks/times, for example those of the vehicles and/or one or more control system components. This information may be used by all vehicles involved in the process to ascertain an optimum merge arrangement where the logical block to be occupied by the merging vehicle (Vehicle A) and the geo locked block at which this will occur create one or more optimizations as determined by the vehicles involved and/or area Controller(s). For example, this may be determined as the minimal impact on the overall velocity of the vehicles within the stream, the minimization of the time taken for the merging vehicle to enter the stream, or the management of acceleration and deceleration of the vehicle in order to preserve energy.

The use of one or more clocks for synchronization of the velocity and integration of one or more vehicles may include, for example, the shoaling of a set of vehicles, whereby the relative clock information of each vehicle is shared as a common reference among the vehicles. This shoal may be extensible, for example, fora vehicle having the same destination as the shoal (in whole or in par, e.g., majority of the journey is common), members of the shoal may make adjustments to their operation in order to change one or more of the vehicle distances (front and rear) between shoal members in order to make room (e.g. to make available a suitable logical block) for merging one or more vehicles to join such a shoal.

1.9.4 Merge and Demerge Interlocking

In some embodiments, two or more trunk and/or distributor roadway segments may combine to form a single trunk or distributor roadway segment. There may also be a vehicle that enters from a roadway onto another roadway, for example a trunk roadway segment, and then may leave that roadway, for example onto another trunk and/or distributor roadway segments. For example, a vehicle may enter from the right and exit on the left, where the vehicle interlocks with the other vehicles already running on that trunk roadway segment. Such a maneuver may use the block profile traverse, where the vehicle operations are optimized for this situation. This block state may then be communicated to other vehicles in the area adjacent to and/or on the anticipated path of the vehicle making the traversal and as such these vehicles may collaborate so that without undue compromise to their own travel, the traversal of the vehicle is assisted in an optimum manner.

Figure 19:
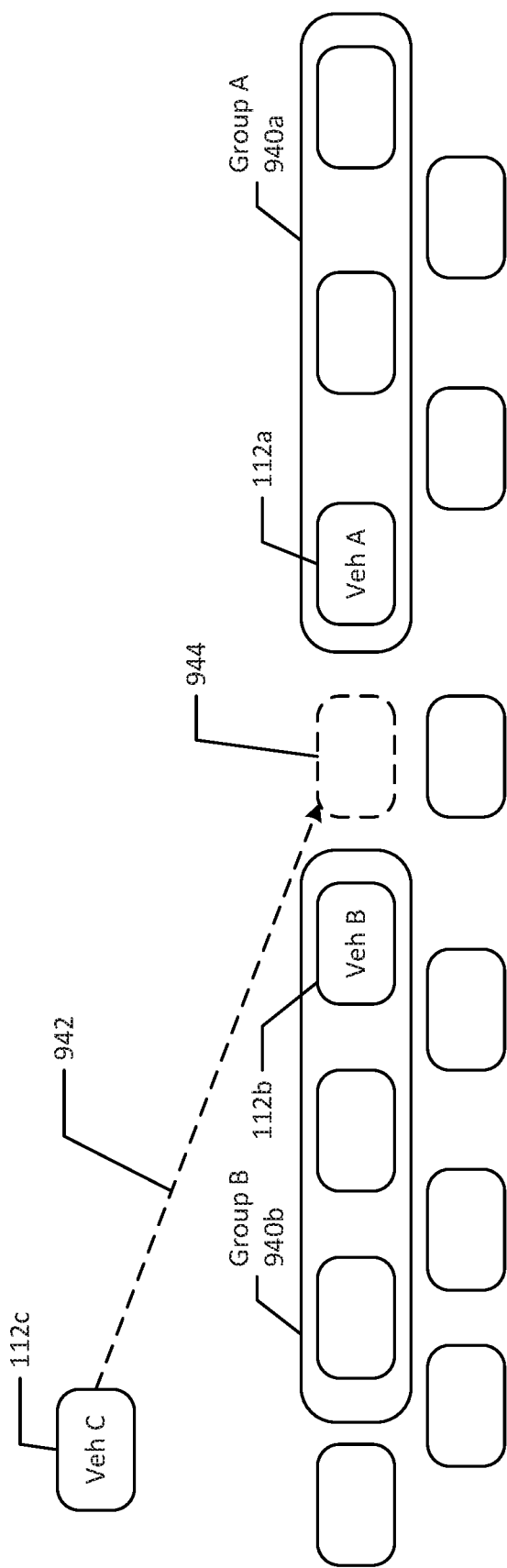
FIG. 19 illustrates a vehicle merging with an existing flow of other vehicles, according to an example embodiment of the present disclosure.

FIG. 19 illustrates a vehicle 112c ("vehicle C") merging with an existing flow of other vehicles. A vehicle on trajectory, for example one that is demerging from a vehicle stream to embark/disembark passengers, may project a trajectory (for example based on the vehicle centerline) for such a maneuver and then request that the logical and/or geo locked blocks that it seeks to traverse are clear of other vehicles (in whole or in part) at the time of such transversal. In FIG. 19, an area controller may inform two groups of vehicles (e.g., group 940a ("Group A) and ground 940b ("Group B), that vehicle 112c "vehicle C" is merging, and its projected trajectory 942. The trailing "group B" and leading "group A" may reduce inter vehicle distance to accommodate "vehicle C". The total vehicles in the groups are sufficient to enable an additional gap or logical block (e.g., projected block 944 for "vehicle C") with sufficient headway and tailway, e.g., a 3 meter block, with 2 m tailway and 2 m headway, for a total of 7 m. At cruise, in the example inter-vehicle distance may normally be 4.5 m. So, each group creates an additional 1.25 m of distance by, for example, "group A" speeding up temporarily, and for "group B" slowing down temporarily. Once "vehicle C" has entered the vehicle flow, then the vehicles in "Group A" and "Group B" may adjust their velocity so as to normalize inter vehicle distance to cruise profile, e.g., 4.5 m.

1.9.5 Dynamic Mapping

Each vehicle sensor set may be used to dynamically map the route being undertaken by an operating vehicle as it undertakes the journey on which it is embarked. For example, in some embodiments, a vehicle may be fitted with one or more microphones, which are facing downward towards the roadway, for example at a 45 degree angle facing forward. The sounds captured by these microphones may be processed by DSP to create an audio map of the roadway, and potentially of the vehicle traction operations as well. In this case, each roadway segment, for example a 1 meter×1 meter segment may have an audio map baseline established. Any variations to that baseline may be processed on an exception basis by the AVPS and management systems. For example, an audio profile may vary and information (e.g., roadway is wet, it has started to rain, etc.) can be communicated to other vehicles and system controllers.

In some embodiments, each vehicle may have a dynamic mapping of the system deployment in which it operates. Such a mapping may include navigation and positional information at several sensor/emitter frequencies, for example Radar, Ultrasound, visual, audio and the like. Such a vehicle map may be updated dynamically by, for example the vehicle itself, other vehicles with which it is communicating, and one or more control system components, such as an area controller and/or common controller and its CMS.

Map updating may include the vehicle undertaking one or more similarity matching operations, using for example a GPU based computing platform, to compare the locational and environmental information held in the vehicle repository with the sensor/emitter provided information sets from that vehicle and/or other vehicles which it is in communication with. For example, such a dynamic comparison may result in one or more variances, indicating a change in roadway conditions. These changes may then be communicated to and used by one or more control system components, including the area controller that the vehicle is operating with at any point in time.

In some embodiments, map updates may be streamed to all vehicles in a broadcast mode on a periodic basis, for example an area controller may broadcast updates to those vehicles with which it is communicating and/or to the common controller and its CMS for distribution to other control system components.

1.10 Demand and Supply of Vehicles

A vehicle that is operating within a first area controllers domain may interact with another area controller, either depending on location, for example if approaching a physical or logical boundary of such an area controller control or as instructed by a common controller, e.g., as a result of receiving an information set with parameters used to configure the operation of the vehicle in order to improve aspects of the system such as flow control, load balancing, or the like. When an area controller is interacting with a vehicle the degree of executive control and authority that the controller has may in part be determined by the vehicle AVPS. For example, an area controller may send to the vehicle an information set of parameters that include specifications for how the vehicle may "shoal" with other vehicles, or to travel to a different position such as a specific pickup and destination locations, a parking area, or even, for example, a specific segment of a roadway. After receiving the information set, the vehicle may comply within the constraints of its current operating situation, including the cooperation of other vehicles. There may be circumstances where an area controller may communicate information sets related to vehicles entering or leaving an area associated with a first area controller to another area controller.

An area controller may use one or more configurations to match the supply of vehicles for the demand for such vehicles. This demand and supply matching may employ one or more pre-emptive scheduling techniques, for example employing an address space where each vehicle has a specific identity and is assigned an address space within the area managed by the area controller. Such an address space may have a relationship with the logical and or physical "blocks" that comprise such an area, and which have further relationships with the geo blocks and physical blocks that comprise such an area. One advantage of such an approach is the ability to dynamically transfer such relationships to another area controller or other management systems as required.

1.11 Vehicle Control Autonomy in an Integrated Control System

In some example embodiments, each autonomous vehicle has sufficient autonomy and situational awareness to maintain the integrity of the operations of that vehicle in conjunction with other vehicles. Each vehicle navigates the roadway in pursuit of its route (origin point, destination point), and undertakes the appropriate vehicle operation profiles (e.g. merge/demerge, cruise etc.).

Each vehicle undertakes various solution strategies that ensure safe, reliable and efficient transit. The degree to which these factors may be optimized may be determined through the use of contextual determinations which may various control approaches. In an embodiment, these control approaches incorporate the cooperative operation techniques described herein.

Each vehicle may operate within a set of contextual constraints, for example, whereby the relationship between the vehicle and the logical block containing that vehicle comprises a set of relationships over a time period. For example, the relationship of the vehicle block to the logical blocks and geo blocks may be based on the velocity and/or acceleration/deceleration if the velocity is not constant, for example, when a vehicle is traversing a straight roadway. For example if the vehicle block and logical blocks both have a velocity of 50 kph, then the vehicle will adjust its relative position, so as to have a one to one relationship with that block. In this manner, the rate of flow of vehicles, represented by the logical blocks is matched to the actual vehicle traveling within that logical block structure.

When such a relationship, between the block representing (and containing) the vehicle in transit and the logical flow of blocks representing the flow of blocks at a specific velocity in relation to the geo blocks, representing the physical roadway, is synchronized, then each vehicle may undertake operations in relation to the roadway and other vehicles based on such blocks. For example, two vehicles traveling in parallel in adjacent blocks may recognize such a situation from their onboard sensors and/or being informed of this situation by one or more control systems. In both cases the vehicles may be operate in a way that precludes them from moving to occupy that block occupied by the other vehicle.

The representation of one or more traffic flows by logical blocks provides at least one basis for each vehicle to integrate itself into such a flow. The position of a vehicle is represented in terms of the relationship between the vehicle block and the flow of logical blocks. This integration may be used by the vehicle to determine the optimum strategy for a vehicle's integration whilst minimizing any disruption to that flow of other vehicles.

For example, a vehicle (and/or a set of vehicles and area controllers) may propose a specific trajectory involving traversing a set of logical blocks to achieve integration with an existing flow of vehicles. The proposing vehicle or area controller sends an information set to the other controllers and vehicles comprising the proposed route, in terms of blocks and timing of their traversal to other vehicles operating in the area of the vehicle(s) proposing to merge. In this example, each vehicle may cooperatively configure its own operating parameters so as to accommodate the incoming vehicle(s), through for example creating sufficient available space, represented by one or more blocks, for that entry to occur. Should this not be able to be resolved by the vehicles involved working in cooperation, an area controller may issue an additional information set comprising sufficient additional information so that all the vehicles involved to adapt their operations so as to enable such a merge. The common controller, area controller, and AVPS are thus all aware of the route to be navigated. That route may be expressed as a set of logical blocks which in whole or in part may be synchronized in an optimized manner with the logical blocks representing those roadways covered by the intended route.

In some embodiments, although the vehicles may be autonomous and independent actors, the area controller may provide a framework for operating within its area of influence. For example, an area controller may change the profile of a set of logical blocks from cruise profile to merge/demerge profile such that vehicles that traverse the logical blocks during a journey vary their control of the vehicle or the parameters thereof, to accommodate the changed circumstances.

In some embodiments, each vehicle has a set of relationships, which may be managed within the context of the operations of the vehicle. These include, but are not limited to:

R: the enumerated relationship from one vehicle to the vehicle preceding that vehicle traveling on the same trajectory, expressed in distance and/or time.

L: the enumerated relationship of one vehicle to another vehicle where both vehicles are traveling on adjacent parallel trajectories, expressed in distance and/or time.

LD: the enumerated relationship from the side center point of one vehicle to the side center point of another vehicle traveling on adjacent parallel trajectories, expressed in angle, distance and/or time.

P: the position of the vehicle in relation to the roadway on which it is traveling and the infrastructure embedded in that infrastructure. (P) may include multiple enumerations referential to multiple frames of reference, including for example, vehicle specific, vehicle to vehicle, vehicle to roadway, vehicle to other infrastructure, vehicle to area controller, GNNS and the like.

T: the vehicle trajectory enumerated in terms of the vehicle velocity and profile, for example cruise, merge, traverse and the like.

OD: the origin and destination points of the vehicle and may include multiple enumerations of each of these data points and at least one route. The route may include one or more waypoints where for example, a vehicle undertaking a journey may have the projected time for such a journey compared with the actual time on reaching such a waypoint, and vehicle and/or control systems may make adjustments based on any variations. For example, a vehicle may increase or decrease its velocity to account for the variance and may use, in whole or in part, further waypoints to determine the degree of variance. An area controller may adjust the parameters of one or more vehicles to account for any variations and communicate such adjustments to a common controller.

Each of these may comprise an information set of specifications which may be enumerated in any arrangement, such as for example hierarchical. For example, there may be information sets of specifications that are arranged in support of vehicle operations.

Figure 20:
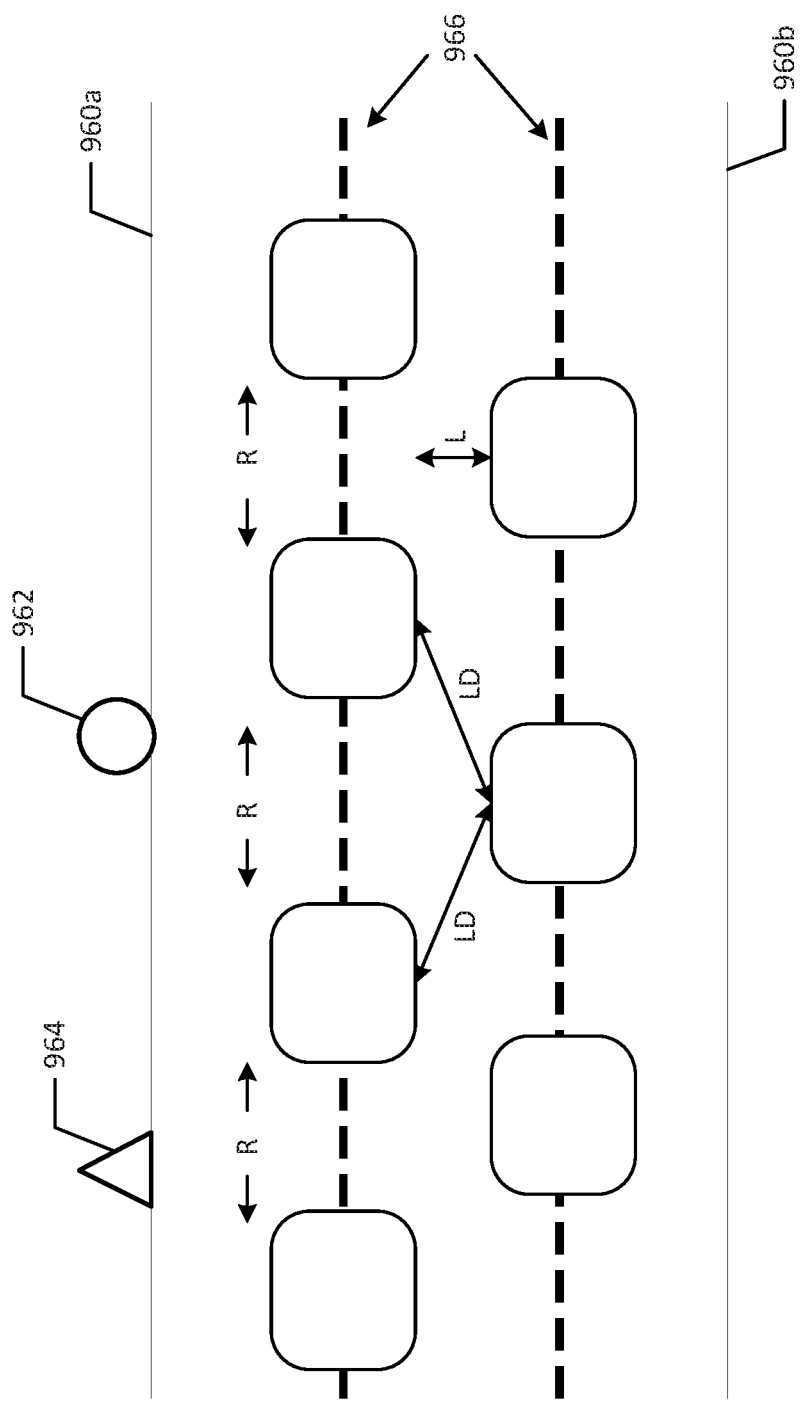
FIG. 20 illustrates example relationships between vehicles.

FIG. 20 illustrates an example of some of above example relationships between vehicles. In the illustrated example, the roadways may include roadway boundaries 960*a*-*b*. The roadway boundaries 960*a*-*b* may be a fence, wall, curb, etc. The roadways may also include a roadside beacon 962 and/or a roadside markings 964 (e.g., roadside sensor recognizable positional markings). The roadway may also include inroad positional markings 966. In the illustrated example, position (P) may be established by multiple redundant measurements. Measurements may be obtained from a downward looking camera. Additionally, the measurements may include radar to roadway boundary 960*a-b* measurements along with measurements to markings (e.g., roadside markings 964 and/or positional markings 966). Other measurements may be determined from roadside beacons 962, vehicle to vehicle communications, and/or vehicle to control system communications.

In some embodiments, a vehicle may employ one or more sensor sets so as to explore the environment at a rate, for example of 10 ms time increment for event detection.

In some embodiments, adjacent vehicle to vehicle communications may be undertaken at a rate of 100 hz. Such communications may include positioning information, including for example the number of hops that such a communication has traversed, so that vehicles that are not in the near vicinity of the originating message assign a priority to those messages, including for example disregarding them.

The set of vehicles to which one or more vehicles provide information may in part be determined by each vehicle, where for example a vehicle determines that the information may have no impact on that vehicles current operations and/or by an area controller which may set one or more specifications (for example distance/time/location and/or the like) that manages the propagation of such information. In some embodiments, the strength of the radio signal, especially as related to shorty range radio technologies such as Bluetooth, 60 Ghz Wi-Fi and the like may be used, potentially in a quantized form) to provide such propagation limitation.

For example, a vehicle that is operating a contextual synchronization and harmonization operating conditions set (CSHOCS), when that vehicle is operating a cruise profile, may for example, operate to:

maintain the value of R as 4.65 m when cruise is at 50 Kph, with a variance of ±0.5 m.

maintain L at 0.4 m plus or minus 3 cm maintain LD at an angle of Theta and a distance of N, such that L>0.4 m maintain P within plus or minus 2 cm of the trajectory (T) determined by one or more control systems and vehicle onboard navigation and positioning systems to satisfy the origin and destination (OD) parameters.

The vehicle may operate based on these parameters, and make the necessary operational determinations such that equilibrium is established when the parameters are met.

Such a situation, in some embodiments, may be maintained until the vehicle employs a different operating profile, for example a demerge profile followed by a stop profile and disembark profile.

Each of which may be implemented in any arrangement by a vehicle, including in cooperation with or under the direction of one or more control systems including area controllers. The overall prioritization of the CSHOCS may be managed by the vehicle, and/or area controller and/or common controller in any arrangement, however in some embodiments, the hierarchy of executive control and authority may be determined by a common controller.

Parameters for each vehicle (and/or set of vehicles) may be varied by a control system, such as an area controller, on a dynamic basis, including in response to another controller, for example a common controller based on scheduling or other requirements and/or another area controller to which or from which vehicles may be arriving or dispatched to.

Vehicle operations may be aligned with operating profiles of each vehicle as specified by one or more control systems, for example a vehicle journey may comprise a set of profiles to be executed by the vehicle in sequence. The parameters provided by the vehicle by be varied as needed, for example an area controller providing new parameters for each vehicle to operate within.

Each vehicle operates autonomously, such that even in the event of a complete communications failure the vehicle can navigate and position itself with sufficient accuracy to avoid other vehicles and roadway boundaries, and as far as practical complete the original journey.

Each of the control systems may also utilize cooperative operational techniques for the efficient management of one or more vehicles in any arrangement, for example through shoaling or other vehicle aggregations for example on a trunk and/or through arrangement of vehicles in boarding zones.

Area controllers and/or other authorized control systems may deploy "phantom" vehicles into a traffic flow, which may be presented to the physical vehicles making up that flow, as other vehicles to be included in the physical vehicles virtual sensor inputs. In this manner vehicles that are anticipated to join a traffic flow may be allocated logical or geo blocks, and consequently the physical vehicles comprising that traffic flow may adjust their positions or other operating parameters accordingly, for example by varying the vehicle to vehicle distance (R).

Area controllers and/or other authorized control systems may deploy additional operating strategies and parameters to operating strategies to vehicles in advance or in response to one or more situational conditions. The area controller may configure and send an information set to vehicles on the roadway for uncommon occurrences and/or conditions. For example, if ice on a roadway was an infrequent occurrence, the area controller may send an information set to vehicles on the roadway indicating the road condition where, for example, vehicle to vehicle distance may be increased and overall systems speed and capacity may be reduced based on the road condition. In other examples, operational parameters (e.g., vehicle to vehicle distance and overall system speed/capacity) may be adjusted, upon receipt of a weather forecast and/or in response to at least one vehicle encountering, through sensors (either on the vehicle or incorporated in the infrastructure), the presence of a specific condition (e.g., roadway condition) or occurrence.

The range of operations that a vehicle can undertake is limited, for example steering can vary trajectory by a certain degree, braking can reduce velocity (as can energy recovery), and propulsion can increase velocity. In combination, the parameters of these operations may be used by an operating vehicle to modify its behavior so it operates in a cooperative manner. In other embodiments, the parameters may be used to modify the behavior of a vehicle so that it operates in ways that optimize safety of the passengers. These strategies may also include derived parameters, such as "jerk" the initial impact on a human passenger from acceleration/deceleration in a short time period (usually measured in G force applied on a particular velocity vector), G Forces as experienced by a passenger (lateral or vectors determine by the direction of travel) and the like. These derived parameters, may in some embodiments, be set as operating variables, by for example a control system, such as area controller or common controller, such that a passenger is never subjected to excessive forces, except potentially in an emergency.

An area controller may appropriate a specified value for overall Origin/Destination route and vehicle will attempt to use either all or the least amount of such allocated value. For example, each section of the journey may be specified in terms of vehicle operating profiles, and each profile may have an associated set of values for use with that profile. The vehicle may create or load such a set of profiles and associated parameters at the commencement of the journey, and operate using them in a way which is intended to optimize one or more metrics of the transportation system or vehicle. In this manner, a vehicle may dynamically vary the shift form one operating profile to another in response to the operating context in which it finds itself. For example, in van a vehicle may change from cruise profile to demerge profile in advance of or after the time or location indicator for such a change in response to one or more other vehicles entering or leaving the traffic flow of which that vehicle is a part.

In some embodiments, a vehicle may operate in cooperation with other vehicles in a "shoal", using for example a set of information set profiles that in aggregate represent a journey. This designation may be created dynamically by the vehicles comprising such a shoal and/or may be designated by an area controller. Each vehicle in a shoal may also collaborate with other vehicles in the shoal to accept further vehicles, through for example creating appropriate blocks for those vehicles to enter the shoal and/or by enabling vehicles whose operating profiles do nor match that of the shoal to remove themselves from the vicinity of the shoal, for example by traversing, demerging or other maneuvers. In this manner, each vehicle and the shoal as a whole may benefit from the optimization of their operations as a shoal. In some embodiments, an area controller may not only provide the conditions for operating within shoals, but may also operate in a way to manage and optimize sets of shoals, for example when a set of vehicles is journeying to destination A (for example a sporting event) and contemporaneously another set of vehicles is journeying to destination B (for example an event at a theatre).

The AVPS, area controllers, and common controller may use deep learning techniques to create a self-learned model for the safe, secure, reliable system deployment. For example, for an operating model comprising the set of variables described herein, (R, L, LD, P etc.) combined with sensor images (radar/visible/ultrasound), where layers and hidden layers may be processed, the framework provided by the operating model may develop further safety enhancements, passenger comfort (e.g., reduction of "jerk"), optimizations and other desired outcomes for system deployments. Deep learning, and other machine learning approaches, may be applied at the control systems of the vehicle, area controller and/or common controller in any arrangement, including across one or more of these control systems.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method comprising, at a transportation system comprising a plurality of at least partially autonomous vehicles configured to operate on a system of at least partially separated interconnected roadways:
   receiving, by a management system, a request to transport from a user;
   assigning, by the management system, a first at least partially autonomous vehicle from one or more at least partially autonomous vehicles to fulfill the request, the assigning comprising:
      determining a load status of at least a portion of the transportation system;
      in accordance with the load status satisfying a first condition, selecting the first at least partially autonomous vehicle according to a first vehicle selection scheme; and
      in accordance with the load status satisfying a second condition, selecting the first at least partially autonomous vehicle according to a second vehicle selection scheme different from the first vehicle selection scheme;
   informing, by the management system, the first at least partially autonomous vehicle of the assignment; and
   providing, by the management system, an information set to the first at least partially autonomous vehicle related to the request, wherein
   the first at least partially autonomous vehicle travels along a route including one or more at least partially separated interconnected roadways according to the information set to fulfill the request; and
   during at least a portion of the travel along the route, the first at least partially autonomous vehicle communicates with a second at least partially autonomous vehicle to coordinate cooperative vehicle travel with the second at least partially autonomous vehicle.

2. The method of claim 1, further comprising, receiving, by the first at least partially autonomous vehicle, the information set from the management system, wherein the information set includes at least one of traffic flow, trip time, system capacity, and wait time.

3. The method of claim 1, further comprising, receiving, by the first at least partially autonomous vehicle, the information set from another vehicle, wherein the information set includes at least one of traffic flow, trip time, system capacity, and wait time.

4. The method of claim 1, further comprising, adjusting, by the first at least partially autonomous vehicle, at least one of vehicle velocity and vehicle headway.

5. The method of claim 1, wherein the management system includes a plurality of area controllers each having an associated geographic area, the method further comprising:
   sensing, by at least one of the plurality of the area controllers, a road condition; and
   relaying, by the at least one of the plurality of area controllers, information corresponding to the road condition to a vehicle traveling in a respectively associated geographic area.

6. The method of claim 1, wherein the management system includes a plurality of area controllers each having an associated geographic area, and wherein at least two respective associated geographic areas overlap.

7. The method of claim 1, further comprising, making an autonomous decision, by the first at least partially autonomous vehicle, based at least in part on information read from a sensor included on the first at least partially autonomous vehicle, wherein the sensor reads the information from a machine-readable marker embedded in one or more of the at least partially separated interconnected roadways.

8. The method of claim 1, wherein the first vehicle selection scheme is configured to minimize a wait time of a passenger at a start point associated with the request to transport.

9. A system comprising:
a plurality of at least partially autonomous vehicles;
a means for receiving a request to transport from a user;
a means for assigning a first vehicle of the plurality of at least partially autonomous vehicles to the request to transport, the assigning comprising:
determining a load status of at least a portion of the system;
in accordance with the load status satisfying a first condition, selecting the first vehicle according to a first vehicle selection scheme; and
in accordance with the load status satisfying a second condition, selecting the first vehicle according to a second vehicle selection scheme different from the first vehicle selection scheme;
a means for informing the first vehicle of the assignment; and
a means for providing an information set to the first vehicle related to the request, wherein
the first vehicle travels along a route including one or more at least partially separated interconnected roadways according to the information set to fulfill the request to transport; and
the first vehicle is configured to, during at least a portion of the travel along the route, communicate with a second vehicle of the plurality of at least partially autonomous vehicles to coordinate cooperative vehicle travel with the second vehicle.

10. The system of claim 9, further comprising a means for receiving the information set at the first vehicle, wherein the information set includes at least one of traffic flow, trip time, system capacity, and wait time.

11. The system of claim 9, further comprising a means for adjusting at least one of an operating status of the plurality of at least partially autonomous vehicles, a quantity of vehicles on the one or more at least partially separated interconnected roadways, and a quantity of passengers at a boarding zone based at least in part on the received request to transport.

12. The system of claim 9, further comprising:
a means for sensing a road condition; and
a means for relaying information corresponding to the road condition to a vehicle traveling in a geographic area associated with the means for sensing.

13. A system comprising:
a plurality of at least partially autonomous vehicles; and
a controller configured to:
receive a request to transport from a user;
assign a first vehicle of the plurality of at least partially autonomous vehicles to the request, the assigning comprising:
determining a load status of at least a portion of the system;
in accordance with the load status satisfying a first condition, selecting the first vehicle according to a first vehicle selection scheme; and
in accordance with the load status satisfying a second condition, selecting the first vehicle according to a second vehicle selection scheme different from the first vehicle selection scheme;
inform the first vehicle of the assignment; and
provide an information set to the first vehicle, wherein the first vehicle is configured to travel, according to the information set, along a route that includes one or more at least partially separated interconnected roadways; and
the first vehicle is configured to:
during at least a portion of the travel along the route, communicate with a second vehicle of the plurality of at least partially autonomous vehicles to coordinate cooperative vehicle travel with the second vehicle; and
cooperatively travel with the second vehicle during the portion of the travel along the route.

14. The system of claim 13, wherein the first vehicle is further configured to, during the portion of the travel along the route, communicate with a third vehicle of the plurality of at least partially autonomous vehicles to coordinate cooperative vehicle travel with the second vehicle and the third vehicle.

15. The system of claim 13, wherein:
the portion of the travel along the route is a first portion of the travel along the route; and
the first vehicle is further configured to, during at least a second portion of the travel along the route, communicate with a third vehicle of the plurality of at least partially autonomous vehicles to coordinate cooperative vehicle travel with the third vehicle.

16. The system of claim 13, wherein:
during the cooperative travel with the second vehicle, the first and the second vehicles maintain a first distance from one another; and
when the first vehicle is not cooperatively travelling with the second vehicle, the first vehicle maintains a second distance from a third vehicle, the second distance greater than the first distance.

17. The system of claim 13, wherein the first vehicle communicates the information set to the second vehicle.

18. The system of claim 13, wherein the first vehicle is configured to initiate the communication with the second vehicle in response to the first vehicle determining that the second vehicle is within a sensor range of the first vehicle.

19. The method of claim 1, wherein:
the load status satisfies the first condition if the load status is greater than a threshold system load; and
the load status satisfies the second condition if the load status is less than the threshold system load.

20. The method of claim 1, wherein:
the first vehicle selection scheme is configured to maximize throughput of a boarding zone; and
the second vehicle selection scheme is configured to minimize vehicle arrival times.

* * * * *